(12) United States Patent
Steig

(10) Patent No.: US 11,938,799 B1
(45) Date of Patent: Mar. 26, 2024

(54) REPLACEMENT ROOF TOPS AND BRACKETRY FOR TRUCKS AND OFF-ROAD VEHICLES

(71) Applicant: Putco, Inc., Des Moines, IA (US)

(72) Inventor: Evan Steig, Des Moines, IA (US)

(73) Assignee: Putco, Inc., Des Moines, IA (US)

( * ) Notice: Subject to any disclaimer, the term of this patent is extended or adjusted under 35 U.S.C. 154(b) by 0 days.

(21) Appl. No.: 18/307,470

(22) Filed: Apr. 26, 2023

(51) Int. Cl.
*B60J 7/11* (2006.01)

(52) U.S. Cl.
CPC ........................................ *B60J 7/11* (2013.01)

(58) Field of Classification Search
CPC ............................................................. B60J 7/11
USPC ............................................................ 296/218
See application file for complete search history.

(56) References Cited

U.S. PATENT DOCUMENTS

| | | | |
|---|---|---|---|
| 2,946,624 A | | 7/1960 | Barenyi |
| 4,095,841 A | | 6/1978 | Thompson et al. |
| 4,330,150 A | * | 5/1982 | Dunchock ............... B60J 7/11 296/218 |
| 4,541,665 A | * | 9/1985 | Draper ................. B60J 7/1642 296/218 |
| 5,205,607 A | | 4/1993 | Takeuchi |
| D381,953 S | | 8/1997 | Collins et al. |
| 6,851,739 B2 | | 2/2005 | Morley |
| D678,173 S | | 3/2013 | McIntire |
| 8,424,961 B2 | | 4/2013 | Carsley et al. |
| 8,622,457 B1 | | 1/2014 | McIntire |
| 9,440,683 B1 | | 9/2016 | Donabedian |
| D817,255 S | | 5/2018 | Volpicelli |
| 9,963,022 B2 | | 5/2018 | Bowles |
| D828,225 S | | 9/2018 | Zhang et al. |
| D832,185 S | | 10/2018 | McIntire |
| D847,078 S | | 4/2019 | Rolfs et al. |
| 10,421,262 B2 | | 9/2019 | Schultz et al. |
| D886,014 S | | 6/2020 | Zeng |
| 10,773,579 B2 | | 9/2020 | Willard et al. |
| 10,857,860 B2 | | 12/2020 | Janssen |
| 11,148,733 B2 | | 10/2021 | Mar |
| 11,571,954 B2 | | 2/2023 | Prather |
| 11,584,206 B2 | | 2/2023 | Boyle et al. |
| 2014/0097636 A1 | * | 4/2014 | Snider ................... B60J 1/001 296/97.8 |
| 2022/0017158 A1 | * | 1/2022 | Mar ........................ B60J 7/106 |
| 2023/0070479 A1 | | 3/2023 | Snider et al. |

FOREIGN PATENT DOCUMENTS

| | | |
|---|---|---|
| CN | 2294865 Y | 10/1998 |
| CN | 205930918 U | 2/2017 |
| CN | 210680930 U | 6/2020 |

\* cited by examiner

*Primary Examiner* — Dennis H Pedder
(74) *Attorney, Agent, or Firm* — McKee, Voorhees & Sease, PLC

(57) ABSTRACT

A replacement roof top and bracketry for use with a vehicle includes a transparent panel having a generally flat middle portion and curved outer portion(s). The panel comprises one or more attachment mechanisms to facilitate attachment of the assembly to a vehicle. The assembly provides UV protection and is insulated such that the heat from the sun is minimized. The assembly is durable and can withstand temperatures ranging from −200 degrees Fahrenheit to 150 degrees Fahrenheit as well as withstand hurricane-like wind speeds. The panel is configured to fit snugly with the vehicle such that the assembly is weather-resistant.

20 Claims, 50 Drawing Sheets

REPLACEMENT ROOF TOPS AND BRACKETRY FOR TRUCKS AND OFF-ROAD VEHICLES

FIELD OF THE INVENTION

The present invention relates generally to an apparatus, system, and/or a corresponding method of use, manufacture, and/or installation having applications in at least the automobile, automobile accessory, off-road vehicle, and/or off-road vehicle accessory industries. More particularly, but not exclusively, the present invention relates to a roof top and bracketry for vehicles.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Replaceable vehicle roofs and/or vehicle coverings have been desirable products for consumers for many years. Consumers often wish to replace the factory roof of their vehicles for a multitude of reasons such as aesthetic value, functional value, as well as many other reasons. Thus, different kinds of replaceable vehicle roofs and/or vehicle coverings have been available in the prior art.

Existing replaceable vehicle roofs often have problems and/or lack particular characteristics. For example, existing replaceable vehicle roofs often lack proper fitment with the vehicle such that the roofs are not weather-proof. Existing replaceable vehicle roofs also often lack insulation to regulate temperature in the vehicle. Additionally, existing replaceable vehicle roofs often fail to protect against ultraviolet (UV) rays from the sun, fail to provide any blockage of visible light transmission (VTL), fail to provide reduction of heat from the sun, and fail to block infrared radiation/light. Existing replaceable vehicle roofs also often fail to minimize road noise, wind noise, and/or water intrusion. Further, existing replaceable vehicle roofs often lack durability and are prone to sustaining damage such as cracking, shattering, deteriorating, and the like. Existing replaceable vehicle roofs also often fail to withstand particular weather conditions such as extreme temperatures or high wind speeds. Existing replaceable roofs also often fail to provide a vibrant, high-clarity view through the roof. Additionally, existing replaceable roofs often are time-consuming to install on and/or uninstall from a vehicle.

Thus, there exists a need in the art for an improved replaceable vehicle roof and method of use, installation, and/or manufacture of said roof. There exists a need in the art for a replaceable vehicle roof that provides a snug, proper, and tight fitment with a vehicle to ensure that the apparatus is weather-proof. There exists a need in the art for a replaceable vehicle roof that includes insulation to provide temperature regulation for the vehicle to which it is attached. There exists a need in the art for a replaceable vehicle roof that is capable of keeping a vehicle warm when experiencing cold ambient temperature and cool when experiencing hot ambient temperature. There exists a need in the art for a replaceable vehicle roof that provides UV protection, provides blockage of VTL, provides reduction of heat from the sun, and/or provides blockage of infrared radiation/light. There exists a need in the art for a replaceable vehicle roof that minimizes road noise, wind noise, and/or water intrusion. There exists a need in the art for a replaceable vehicle roof that is durable. There exists a need in the art for a replaceable vehicle roof that can withstand extreme weather conditions such as extreme temperatures and/or high wind speeds. There exists a need in the art for a replaceable vehicle roof that provides a vibrant, high-clarity view through the roof. There exists a need in the art for a replaceable vehicle roof that can easily and quickly be installed and/or uninstalled.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further primary object, feature, and/or advantage of the present invention to provide a replaceable vehicle roof and bracketry to be attached to a vehicle.

It is a further primary object, feature, and/or advantage of the present invention to provide a method of use, installation, and/or manufacture of a replaceable vehicle roof and bracketry to be attached to a vehicle.

It is a further primary object, feature, and/or advantage of the present invention to provide a system to serve as a replaceable vehicle roof and bracketry to be attached to a vehicle.

It is a further primary object, feature, and/or advantage of the present invention to provide an original equipment manufacturer (OEM) direct replacement roof assembly.

It is a further object, feature, and/or advantage of the present invention to provide a snug, proper, and tight fitment between a replaceable roof and a vehicle to ensure that the apparatus is weather-proof.

It is a further object, feature, and/or advantage of the present invention to provide a replaceable vehicle roof that includes insulation to provide temperature regulation. For example, the replaceable vehicle roof can keep the vehicle warm when experiencing cold ambient temperature and cool when experiencing hot ambient temperature.

It is a further object, feature, and/or advantage of the present invention to provide a replaceable vehicle roof that provides UV protection, provides blockage of VTL, provides reduction of heat from the sun, and/or provides blockage of infrared radiation/light.

It is a further object, feature, and/or advantage of the present invention to provide a replaceable vehicle roof that minimizes road noise, wind noise, and/or water intrusion.

It is a further object, feature, and/or advantage of the present invention to provide a replaceable vehicle roof that is durable.

It is a further object, feature, and/or advantage of the present invention to provide a replaceable vehicle roof that can withstand extreme weather conditions such as extreme temperatures and/or high wind speeds such as hurricane-speed winds.

It is a further object, feature, and/or advantage of the present invention to provide a replaceable vehicle roof that provides a vibrant, high-clarity view through the roof.

It is still yet a further object, feature, and/or advantage of the present invention to provide a replaceable vehicle roof that can be easily and quickly installed and/or uninstalled.

The apparatus(es), system(s), and/or method(s) disclosed herein can be used in a wide variety of applications. For example, the disclosed replaceable vehicle roof assembly, and methods of use, installation, and/or manufacture thereof, includes many different embodiments, arrangements, and/or components. Additionally, the disclosed apparatus(es), system(s), and/or method(s) can be used with a variety of vehicles.

It is preferred the apparatus(es), system(s), and/or method(s) be safe, cost effective, and durable. For example, the apparatus(es) can be adapted to resist thermal transfer, electric conductivity, and/or failure (e.g. cracking, crumbling, shearing, creeping, shattering) due to excessive and/or prolonged exposure to tensile, compressive, and/or balanced forces acting on the apparatus.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and/or repair of apparatus(es) and/or system(s) which accomplish some or all of the previously stated objectives.

The replacement vehicle roof assembly and/or bracketry can be incorporated into systems which accomplish some or all of the previously stated objectives. Additionally, disclosed systems can be incorporated into larger designs which accomplish some or all of the previously stated objectives.

According to some aspects of the present disclosure, a roof top assembly for use with a vehicle comprises a transparent panel having a generally flat middle portion and a plurality of curved outer portions; and a plurality of attachment mechanisms located at or near a bottom of the panel configured to attach the panel to the vehicle; wherein the panel is configured to fit snugly with the vehicle such that the assembly is weather-resistant; wherein the assembly is configured to provide ultra-violet (UV) protection, is configured to provide for visible light transmission of less than 100%, and is configured to be insulated.

According to at least some aspects of the present disclosure, the roof top assembly further comprises one or more connection strips and one or more weather-proof seals to facilitate attachment and/or fitment of the panel to the vehicle.

According to at least some aspects of the present disclosure, the assembly can withstand temperatures ranging from −200 degrees Fahrenheit to 150 degrees Fahrenheit.

According to at least some aspects of the present disclosure, the assembly is configured to withstand hurricane-like wind speeds.

According to at least some aspects of the present disclosure, the generally flat middle portion of the panel comprises one or more projections.

According to at least some aspects of the present disclosure, the panel provides a vibrant, high-clarity view.

According to at least some aspects of the present disclosure, the plurality of attachment mechanisms includes a plurality of folding clamps and a plurality of turn latches.

According to at least some aspects of the present disclosure, the panel further comprises a roof brace mounted to the bottom of the panel wherein at least one of the plurality of attachment mechanisms are mounted on the roof brace.

According to at least some aspects of the present disclosure, the assembly further comprises a rear panel that comprises a rear roof brace.

According to at least some aspects of the present disclosure, the rear roof brace provides support and stability for the panel, and/or components thereof, and/or for the rear panel.

According to at least some aspects of the present disclosure, a roof top assembly to serve as at least a partial roof of a vehicle comprises a transparent panel having a generally flat middle portion and one or more curved outer portions; and a plurality of attachment mechanisms mounted at or near a bottom of the panel configured to attach the panel to the vehicle; wherein the panel is configured to fit snugly with the vehicle such that the assembly is weather-resistant; wherein the assembly is configured to provide complete ultra-violet (UV) protection.

According to at least some aspects of the present disclosure, the generally flat middle portion of the panel comprises one or more projections.

According to at least some aspects of the present disclosure, the plurality of attachment mechanisms includes a plurality of folding clamps and a plurality of turn latches.

According to at least some aspects of the present disclosure, the assembly further comprises at least one seal and at least one nut plate to facilitate attachment and fitment of the panel to the vehicle.

According to at least some aspects of the present disclosure, the assembly further comprises at least one bolt and at least one washer to facilitate attachment and fitment of the panel to the vehicle.

According to at least some aspects of the present disclosure, a method of attaching a roof top assembly to a vehicle comprises attaching one or more connection strips to the vehicle; fitting one or more weather-proof seals on each of the one or more connection strips; snugly fitting a panel onto the vehicle such that it is in contact, or nearly in contact, with the one or more weather-proof seals, wherein the panel comprises one or more attachment mechanisms; and manipulating each of the one or more attachment mechanisms to secure the panel to the vehicle.

According to at least some aspects of the present disclosure, the method further comprises arranging the panel such that it is supported by a roof brace.

According to at least some aspects of the present disclosure, each of the one or more attachment mechanisms comprise a folding clamp and/or a turn latch.

According to at least some aspects of the present disclosure, the method further comprises mounting at least one of the one or more attachment mechanisms on a roof brace.

According to at least some aspects of the present disclosure, when the panel is snugly fit onto the vehicle, the roof top assembly is rendered weather-resistant.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
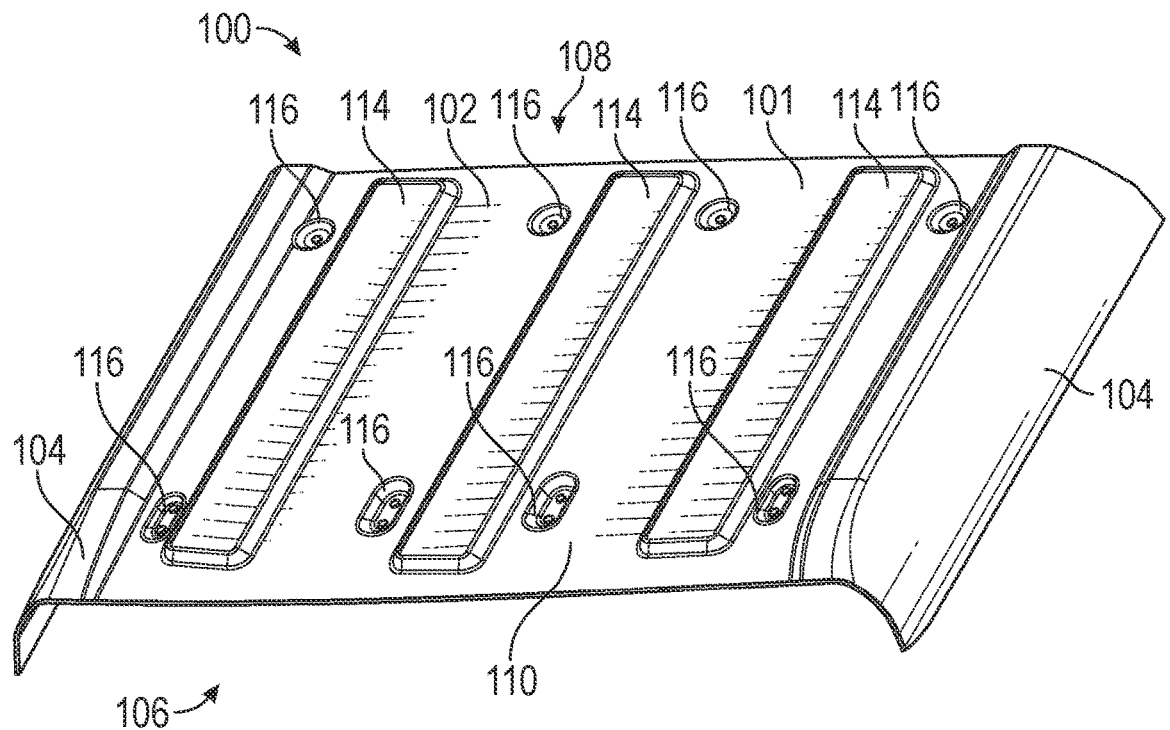
FIG. 1 shows a top, front, perspective view of a vehicle roof assembly according to some aspects.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the figures, FIGS. 1-16 show a vehicle roof assembly 100, and installation thereof, according to some embodiments. The roof assembly 100 can be an original equipment manufacturer (OEM) direct replacement part. The embodiment of the vehicle roof assembly 100 of FIGS. 1-16 includes a roof panel 101 comprising a front 106, rear 108, top 110, and bottom 112. The roof panel 101 of FIGS. 1-16 further comprises a generally flat middle portion 102 and two curved outer portions 104 on each side of the panel 101. While only two sides of the panel 101 of the embodiment of FIGS. 1-16 are curved, any number of sides and/or any portion of the panel 101 could be curved according to some embodiments.

According to some embodiments, the panel 101 can be generally hard such that it is generally rigid and generally keeps its shape. The panel 101 can also be transparent such that the panel 101 has certain characteristics of a window in that a person can see through it. The panel 101 can include a tint according to some embodiments. For example, the embodiment of FIGS. 1-16 includes a panel 101 having a polycarbonate dark gray tint. While the panel 101 of the embodiment of FIGS. 1-16 includes a polycarbonate dark gray tint, the tint could be of any material and/or color. The panel 101 provides for vibrant and high-quality views when a person looks through the panel 101. The panel also provides complete (100%) ultra-violet (UV) protection for occupants of the vehicle to which the panel 101 is attached. The panel 101 also blocks up to 82% of visible light transmission (VTL). While the panel 101 can block up to 82% of VTL, the panel 101 could block any other percentage lower than 82% according to some embodiments. The panel 101 also reduces heat from the sun by an average of 65% versus un-tinted tops or topless configurations according to some embodiments. According to some embodiments, the panel 101 is configured to block up to 46% of infrared radiation/light. While the panel 101 can block up to 46% of infrared radiation/light, the panel 101 could block any other percentage lower than 46% according to some embodiments. The panel 101 is also configured to be scratch-resistant. The panel 101 is also configured to have a fade-resistant finish.

Figure 2:
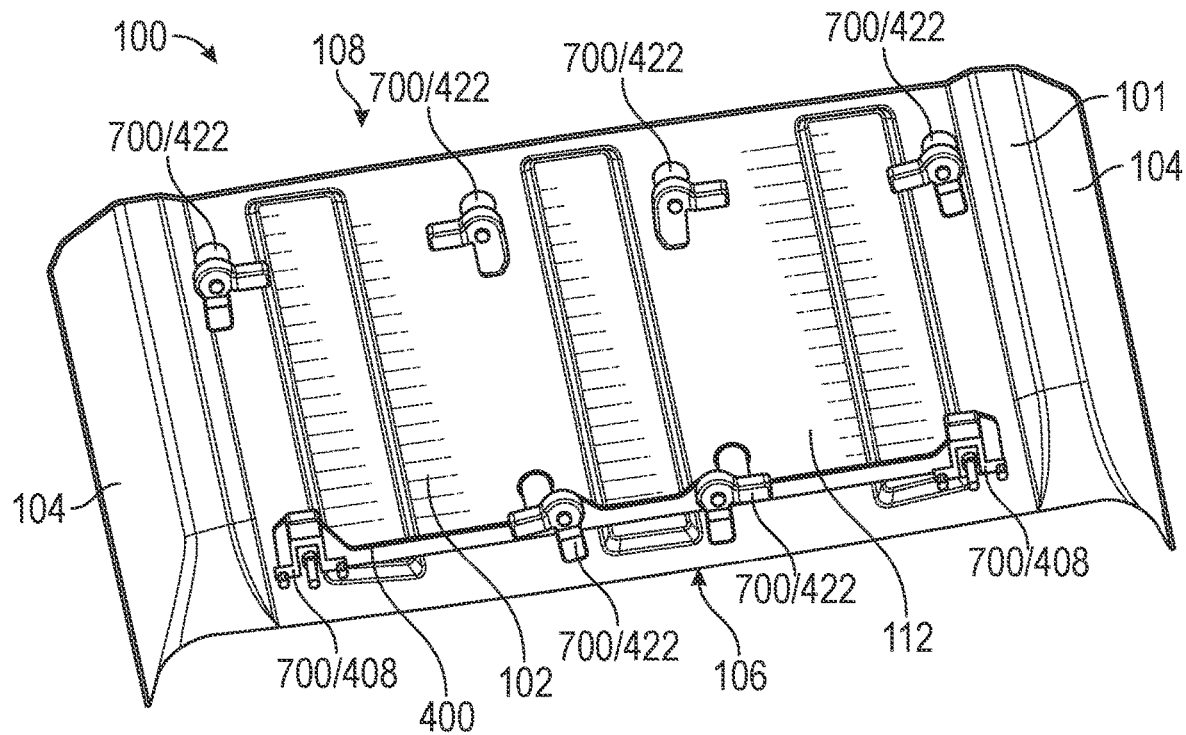
FIG. 2 shows a bottom perspective view of the vehicle roof assembly of FIG. 1.

As seen in FIG. 2, the bottom 112 of the panel 101 can comprise zero or more attachment mechanisms 700. While the embodiment of FIGS. 1-16 includes eight attachment mechanisms 700 located on the bottom 112 of the panel 101 in two generally straight lines, wherein one line is near the front 106 and the other line is near the rear 108 of the panel 101, according to some embodiments, number and arrangement of the attachment mechanisms 700 can vary. For example, the number of attachment mechanisms 700 can range from zero to N where N is any number greater than zero. Additionally, any arrangement and/or formation of the attachment mechanisms 700 can be used including arranging the attachment mechanisms 700 in lines, in circular formation, in random formation, and/or in any other suitable formation. Additionally, while six of the attachment mechanisms 700 in the embodiment of FIGS. 1-16 are turn latches 422 and two of the attachment mechanisms 700 are folding clamps 408, any of the attachment mechanisms 700 could be turn latches 422, folding clamps 408, and/or any other type of attachment mechanism including, but not limited to, any kind of clamp, latch, cinch, bracket, grip, lock, hold, connector, screw, nut and bolt, and the like.

Figure 4:
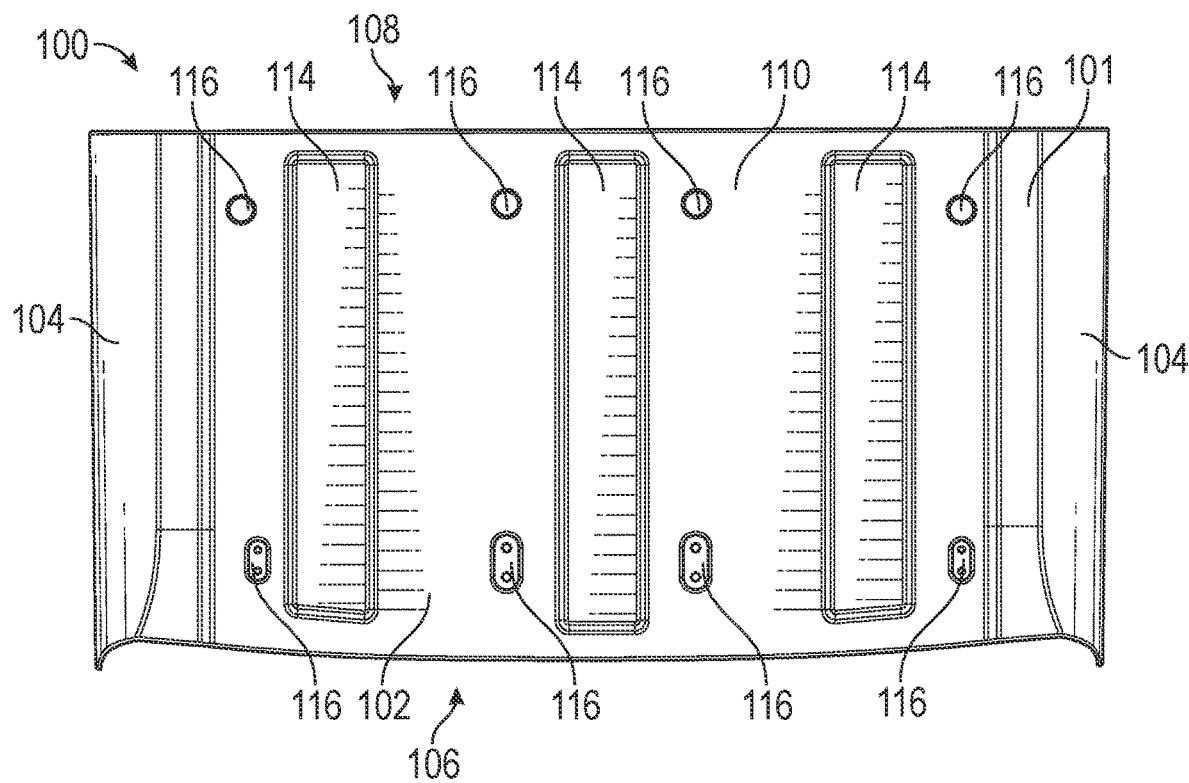
FIG. 4 shows a top elevation view of the vehicle roof assembly of FIGS. 1-3.
Figure 5:
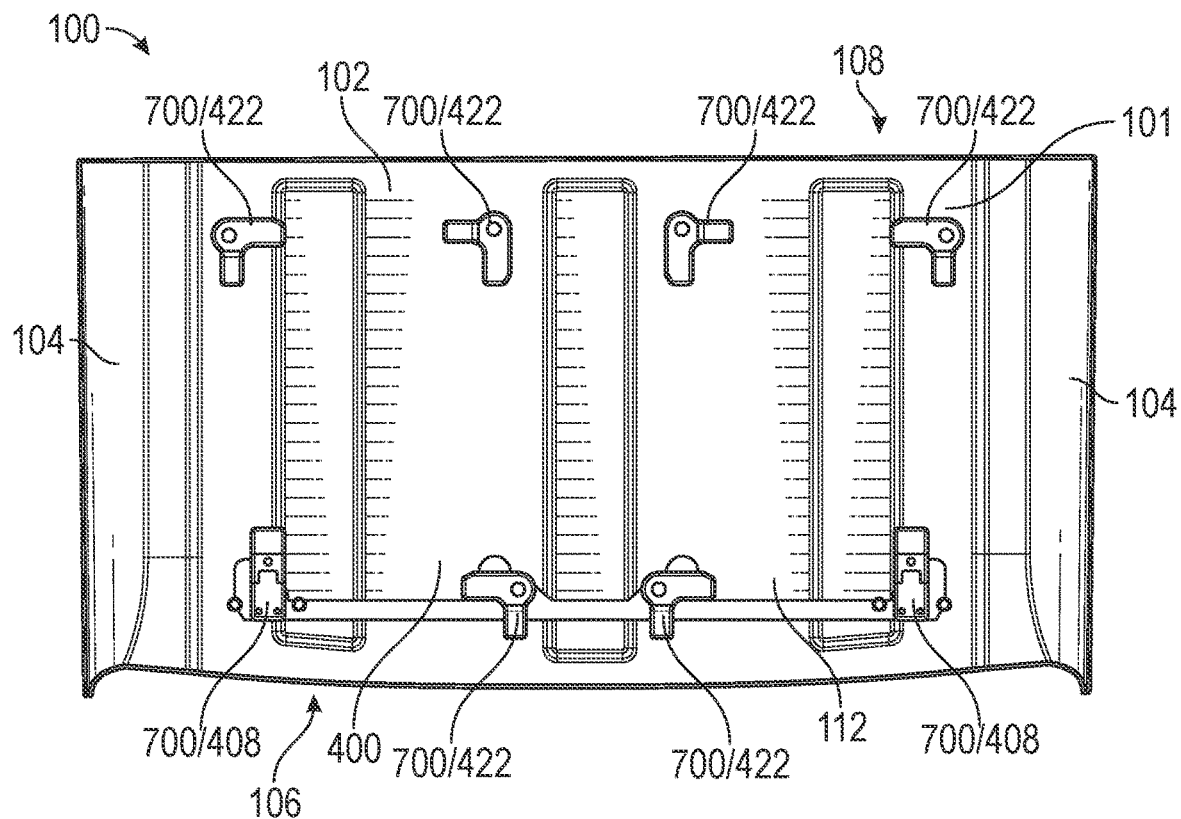
FIG. 5 shows a bottom elevation view of the vehicle roof assembly of FIGS. 1-4.
Figure 6:
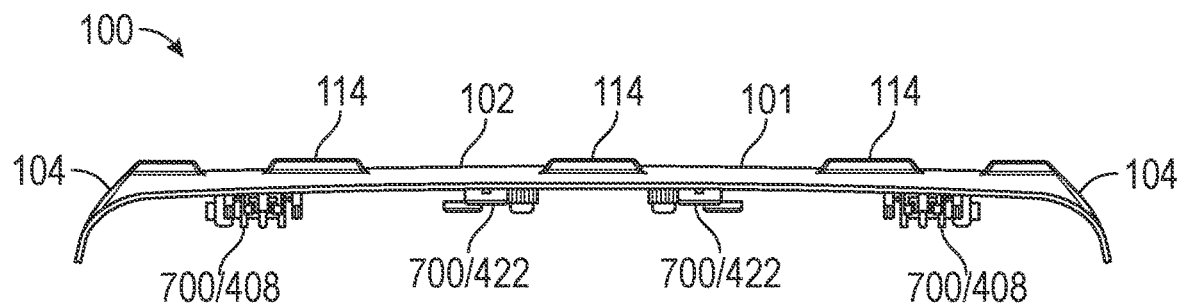
FIG. 6 shows a front elevation view of the vehicle roof assembly of FIGS. 1-5.
Figure 7:
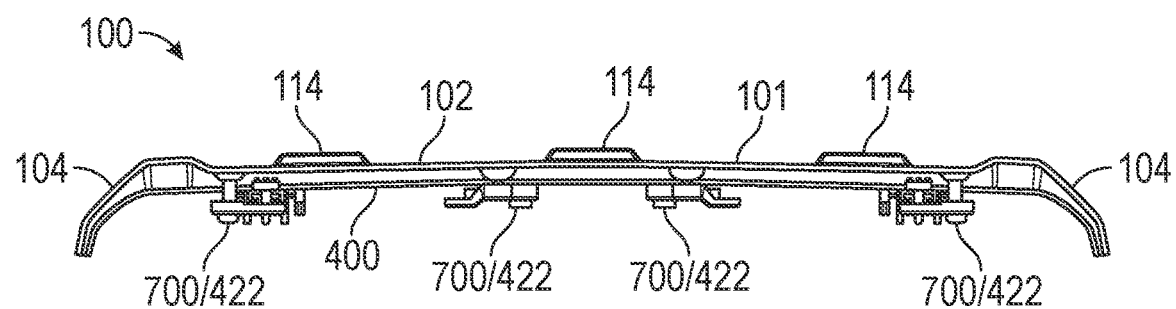
FIG. 7 shows a rear elevation view of the vehicle roof assembly of FIGS. 1-6.

As seen in at least FIGS. 2, 5, and 7, the embodiment of FIGS. 1-16 can also include a front roof brace 400. While one front roof brace 400 is used in the embodiment of FIGS. 1-16, any number of front roof braces 400 ranging from zero to N could be included where N is any number greater than zero. The embodiment of FIGS. 1-16 shows that four of the attachment mechanisms 700 are mounted on the front roof brace 400 wherein the front roof brace 400 is mounted to the bottom 112 of the panel 101. According to some embodiments, any number of attachment mechanisms 700 ranging from zero to N where N is any number greater than zero can be mounted to the front roof brace 400 or any other roof brace.

The front roof brace 400 provides stability and structure to the panel 101. The front roof brace 400 also provides for proper mounting of attachment mechanisms 700 wherein attachment mechanisms can be mounted on the front roof brace 400.

Figure 3:
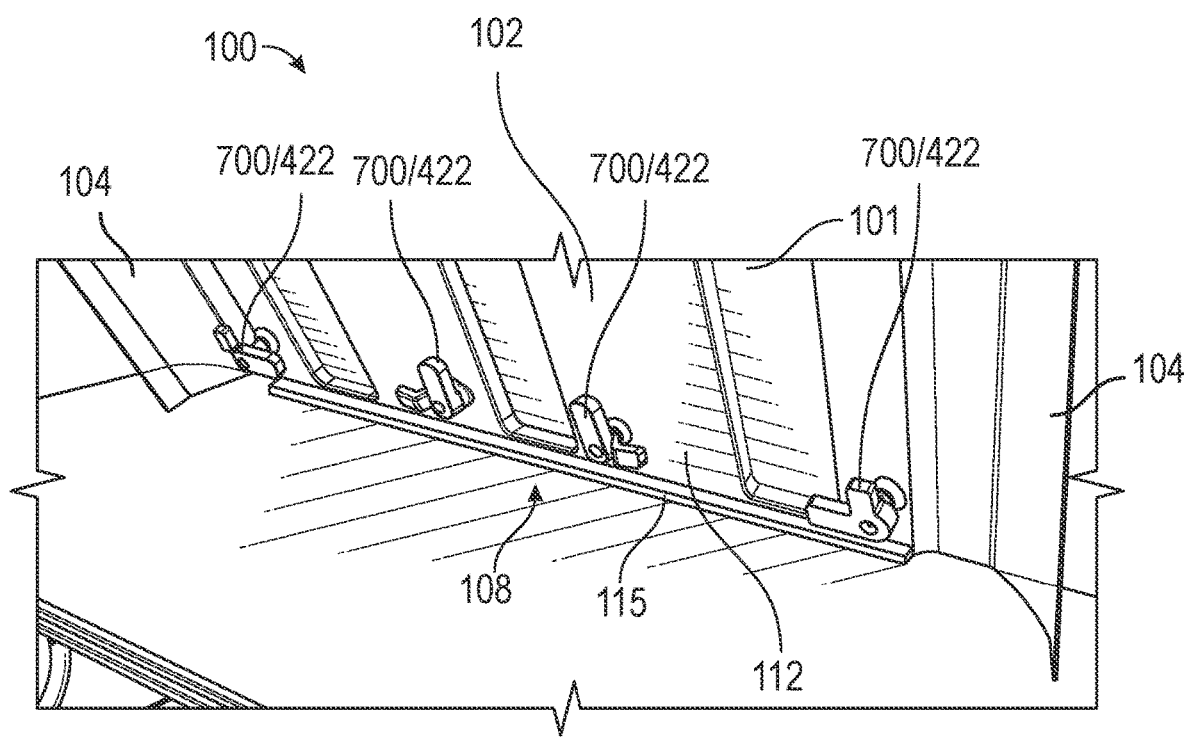
FIG. 3 shows a partial bottom perspective view of the vehicle roof assembly of FIGS. 1 and 2 wherein the assembly includes a seal strip.

As shown in FIG. 3, some embodiments can include a seal strip 115 located at or near the rear 108 of the bottom 112 of the panel 101. While the seal strip 115 is not shown in any of the other figures of the embodiment of FIGS. 1-16, it could be included. The seal strip 115 is configured to provide sealing for the panel 101 such that the assembly 100 is rendered weather-proof when installed on a vehicle. The seal strip 115 can operate in a similar manner as the seal(s) 122 (discussed below) wherein the seal strip 115 can be a foam, weather-tight seal to ensure snug, weather-tight, and proper fitment between the assembly 100 and a vehicle. The seal strip 115 also helps provide for temperature regulation. The seal strip 115 also provides cushion for the rear 108 of the panel 101 which serves to minimize and/or eliminate any potential damage that may be suffered by the panel 101 or the vehicle during installation, during uninstallation, and/or after being installed.

As seen in at least FIGS. 1 and 4, the panel 101 includes a plurality of mounts 116. Each mount 116 can comprise an indentation in the top 110 of the panel 101 and a protrusion on the bottom 112 of the panel 101. Each mount 116 can serve to facilitate attachment of a component to be mounted on the bottom 112 of the panel 101. For example, in the embodiment of FIGS. 1-16 the front roof brace 400 is mounted at four different places on the brace 400 to four different mounts 116 and four attachment mechanisms 700 are mounted directly to four mounts 116.

As seen in at least FIGS. 1, 4, 6, and 7, the panel 101 includes a plurality of projections 114. While the embodiment of FIGS. 1-16 includes three projections 114 located on the generally flat middle portion 102 of the panel 101, according to some embodiments the panel 101 can include any number of projections 114 ranging from zero to N where N is any number greater than zero. The projections 114 can also be of any suitable size and/or arranged in any suitable formation. The projections 114 serve to make the assembly 100 more aerodynamic when attached to a vehicle.

Figure 8:
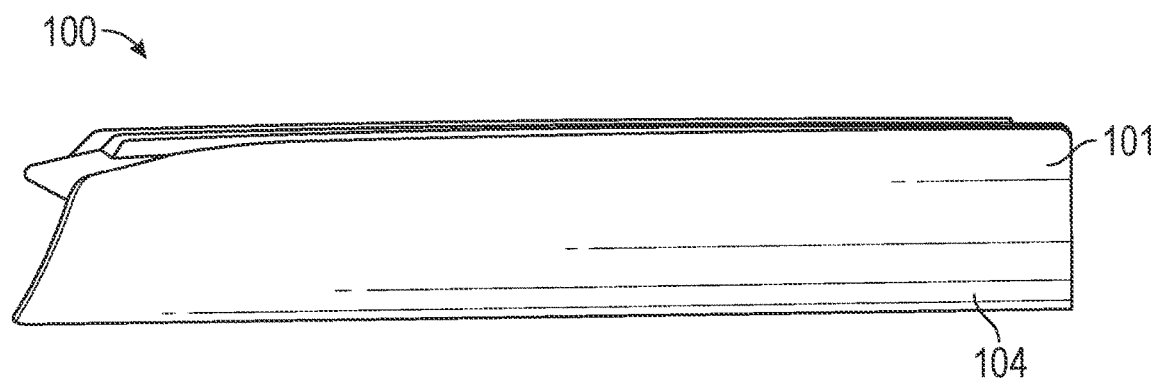
FIG. 8 shows a side elevation view of the vehicle roof assembly of FIGS. 1-7.

FIG. 8 shows a side view of the panel 101 wherein one of the curved outer portions 104 is visible. The curved outer portions 104 serve to emulate the curvature and/or shape of the vehicle to which the assembly 100 will be attached. Thus, the panel 101, including its curved outer portions 104, provides a snug, tight, and proper fitment of the assembly 100 to a vehicle.

Figure 9:
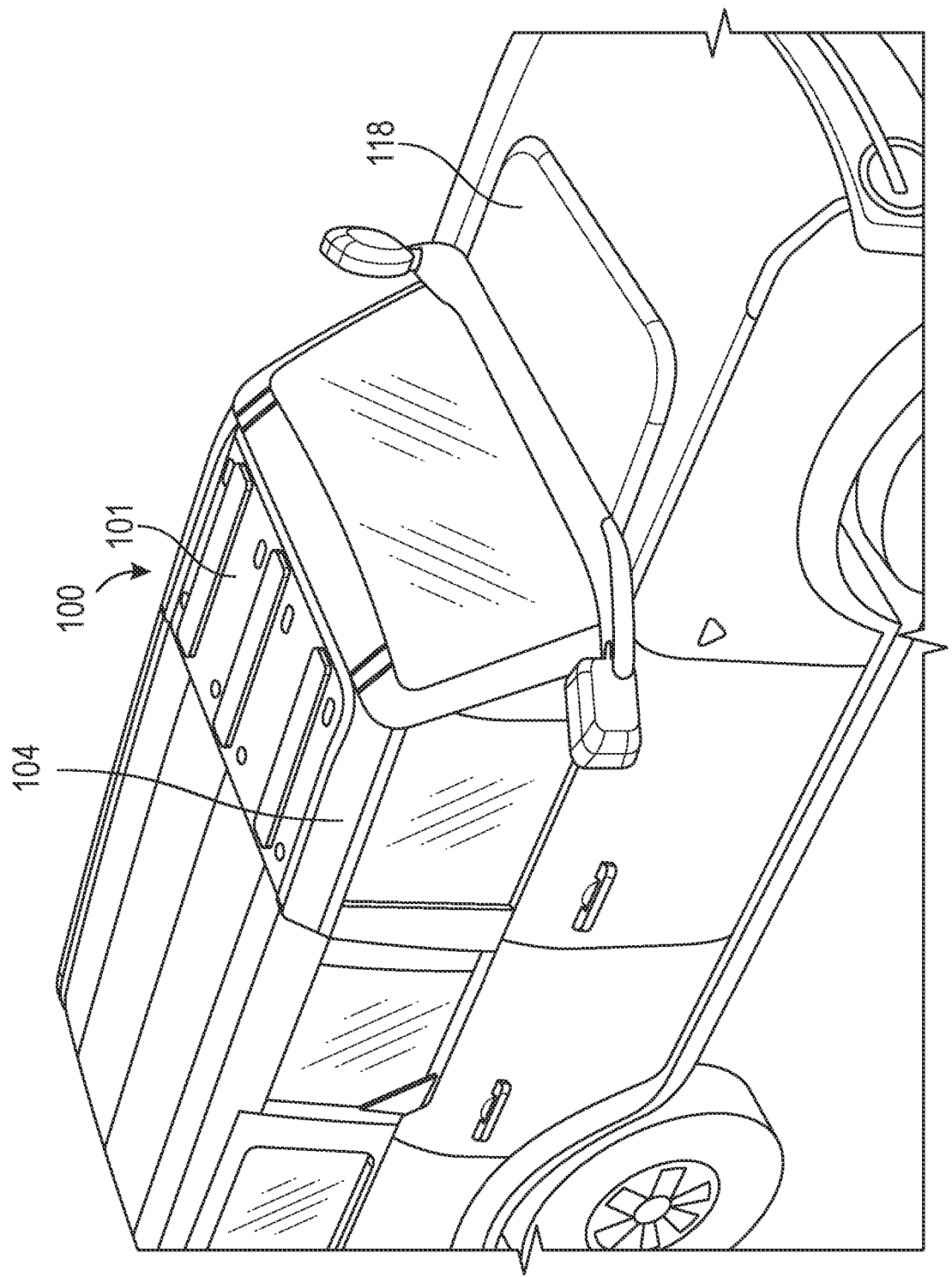
FIG. 9 shows a perspective view of a vehicle comprising the vehicle roof assembly of FIGS. 1-8.

FIG. 9 shows a perspective view of a vehicle 118 wherein the assembly 100 and/or panel 101 is attached to the vehicle 118. As shown in FIG. 9, the assembly 100 and/or panel 101 can be attached to the top of the vehicle 118 such that an occupant of the vehicle 118 can look up to see a sky view through the panel 101 and/or assembly 100.

Figure 10:
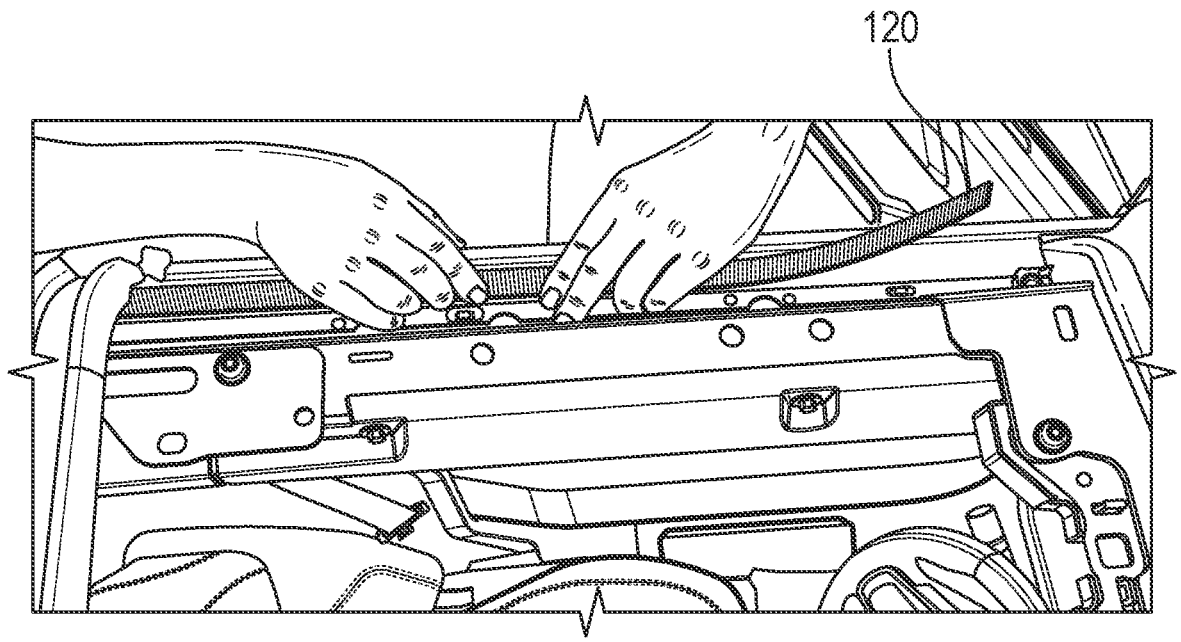
FIG. 10 shows a perspective view of the installation of a connection strip to be used with the vehicle roof assembly of FIGS. 1-9 according to some aspects.

FIGS. 10-16 illustrate installation of the assembly 100. The assembly 100 can further comprise one or more connection strips 120 and/or one or more seals 122. Each of the one or more connection strips 120 can comprise any kind of fastener such as an adhesive fastener, a hook and loop fastener, and/or any other suitable means of connecting and/or securing a seal to the frame of the vehicle 118. FIG. 10 shows a connection strip 120 being installed on the frame of the vehicle 118. The connection strip 120 utilized in the example embodiment shown in FIG. 10 is a hook and loop strip. Each of the one or more connection strips 120 can be placed along the sides of the top frame of the vehicle 118 where each of the curved outer portions 104 come in contact, or nearly in contact, with the vehicle 118. The method of installation shown in FIGS. 10-16 includes two connection strips 120, wherein one connection strip 120 is attached to the top frame of the vehicle 118 on the driver side (at or near the vehicle frame just above the front driver-side window) and the other connection strip 120 is attached to the top frame of the vehicle 118 on the passenger side (at or near the vehicle frame just above the front passenger-side window). However, according to some embodiments, any number of connection strips 120 in any suitable location on the vehicle 118 and/or assembly 100 could be used. Additionally, after installation of the two connection strips 120 of the method of installation of FIGS. 10-16, any top could be used with the vehicle 118. In other words, the connection strips 120 do not interfere with attachment of any sort of top to the vehicle.

Figure 11:
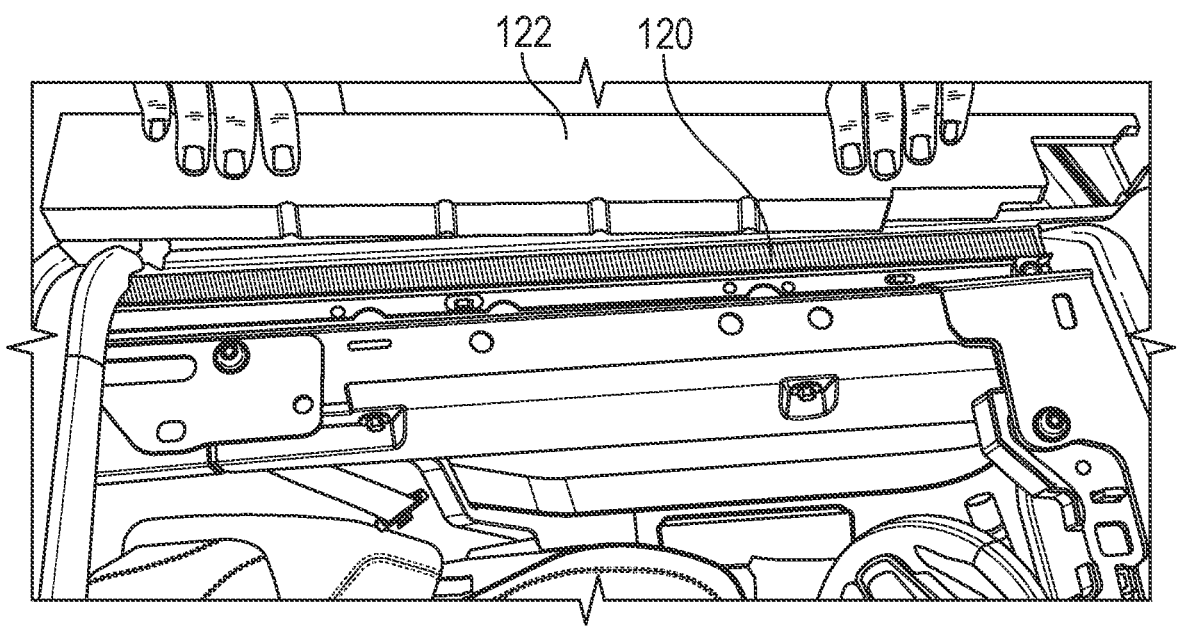
FIG. 11 shows a perspective view of the installation of a seal to be used with the vehicle roof assembly of FIGS. 1-9 according to some aspects.
Figure 12:
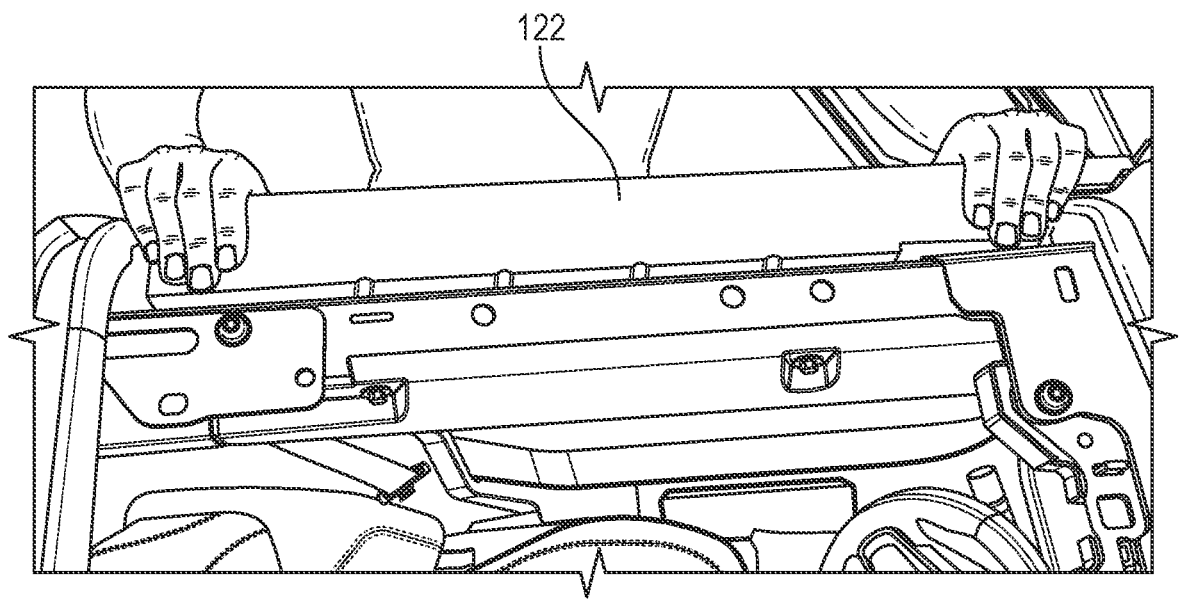
FIG. 12 shows another perspective view of the installation of the seal of FIG. 11.

As shown in FIGS. 11 and 12, once connection strip(s) 120 are attached to the frame of the vehicle 118 at the proper location(s), a seal 122 can be placed on each connection strip 120 such that each seal is secured and/or adhered in place via the connection strip 120. Each seal 122 can be a foam, weather-tight seal to ensure snug, weather-tight, and proper fitment between the assembly 100 and the vehicle 118. While the embodiment of FIGS. 1-16 uses foam, weather-tight seals, any suitable type of seal, sealant, and/or sealing member could be used. In the method of installation of FIGS. 10-16 two seals 122 are used. A seal 122 is placed on each connection strip 120. However, any number of connection strips 120 and/or seals 122 could be used.

Figure 13:
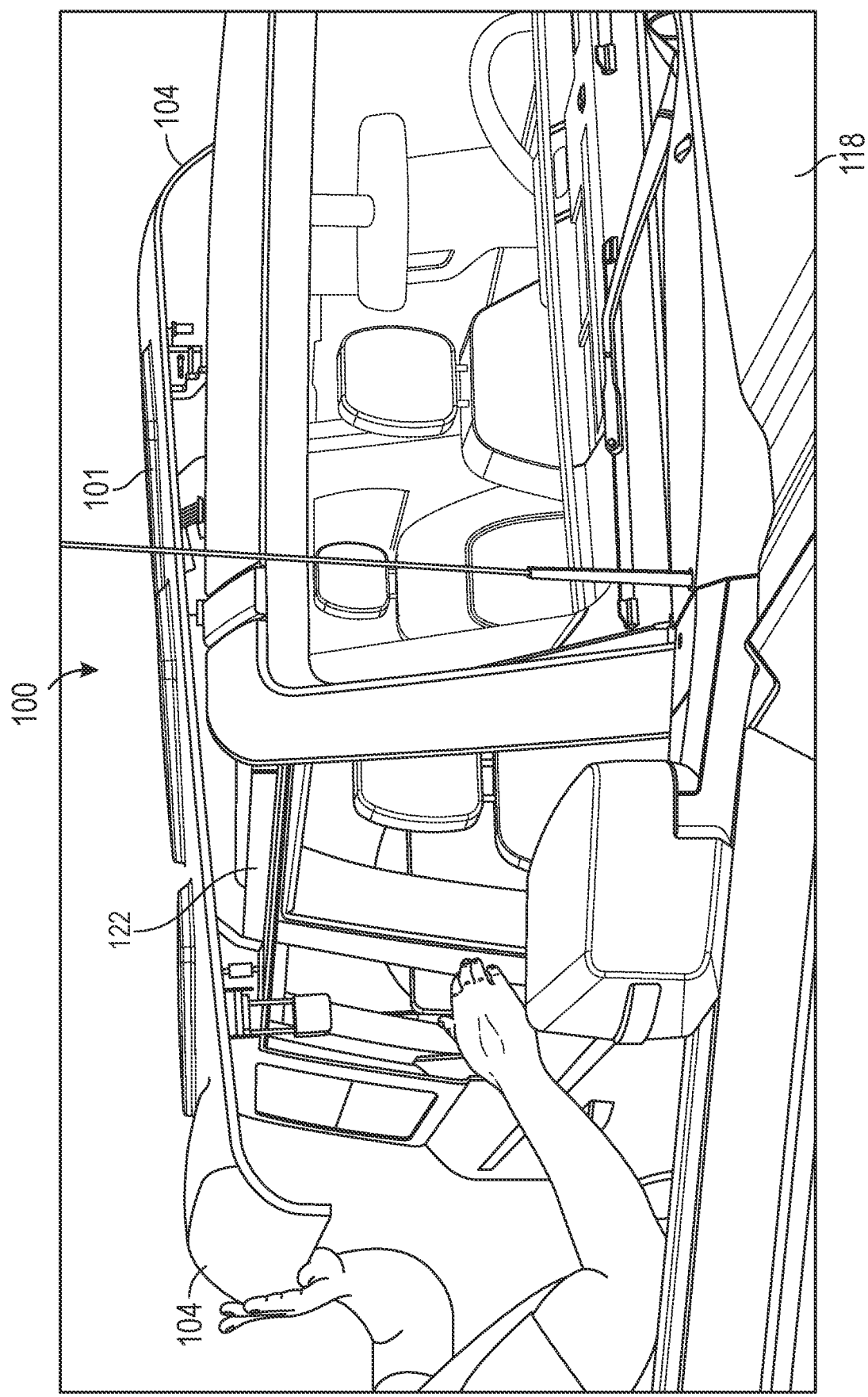
FIG. 13 shows a perspective view of the installation of a roof panel of the vehicle roof assembly of FIGS. 1-9 according to some aspects.
Figure 14:
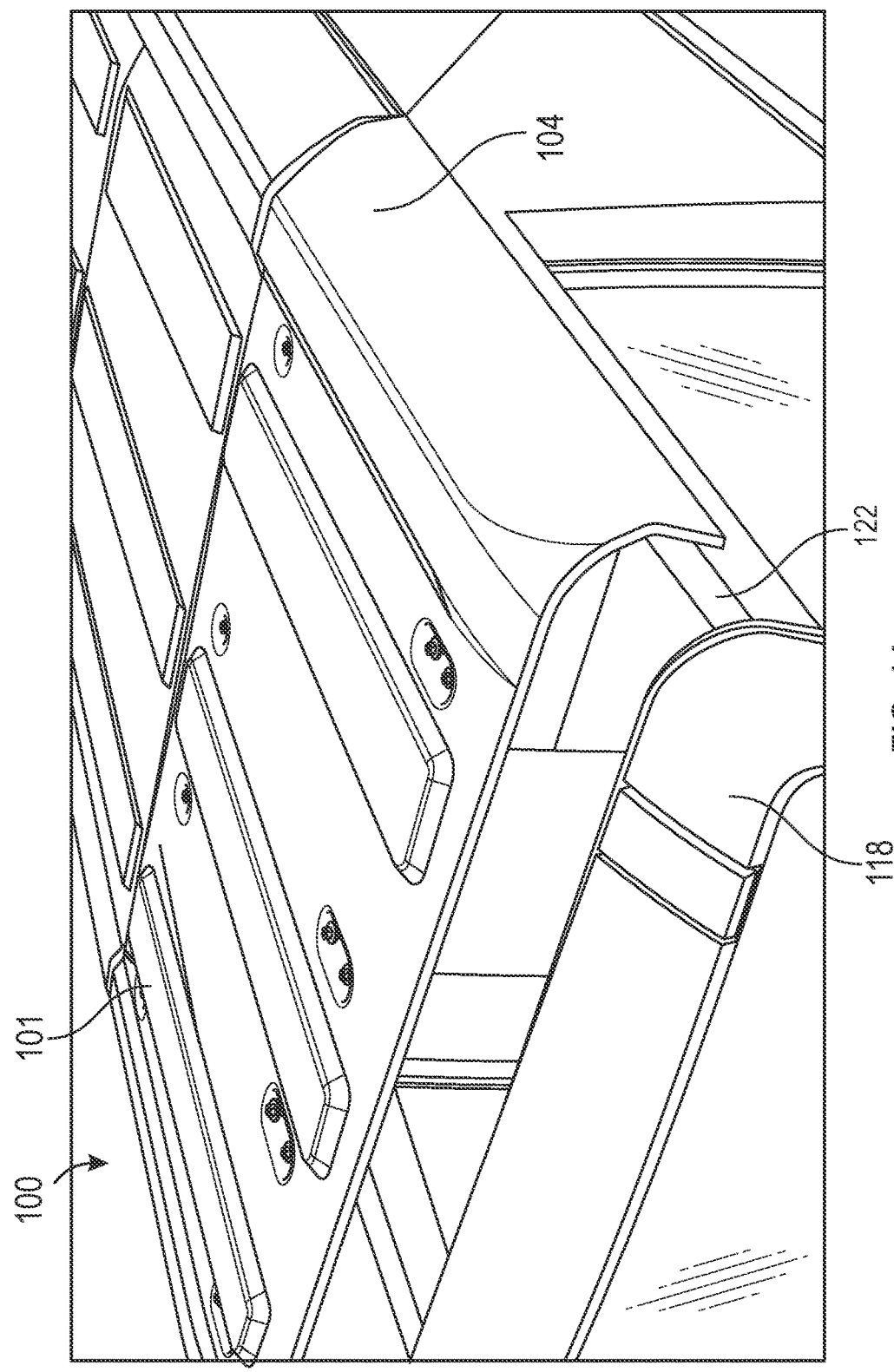
FIG. 14 shows another perspective view of the installation of the roof panel of FIG. 13.
Figure 15:
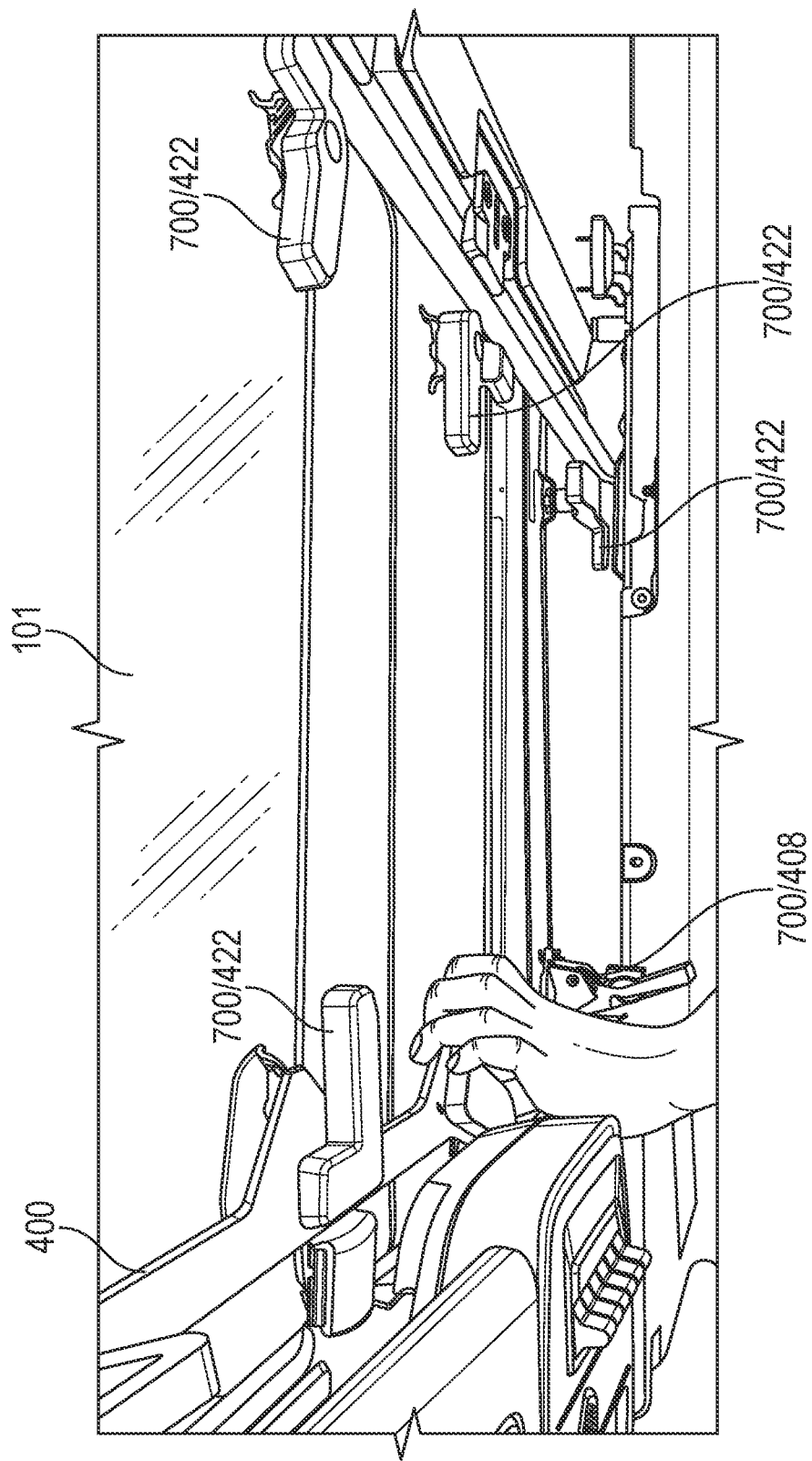
FIG. 15 shows another perspective view of the installation of the roof panel of FIGS. 13 and 14.

As shown in FIGS. 13 and 14, the panel 101 can then be placed on the vehicle 118 such that the curved outer portions 104 of the panel 101 rest on each of the seals 122. As shown in FIG. 15, the various attachment mechanisms 700 located on the panel 101 can then be clasped, closed, turned, latched, clamped, and/or otherwise manipulated to secure attachment of the panel 101 to the vehicle 118. According to the embodiment shown in FIGS. 1-16 that includes the eight attachment mechanisms 700 shown in at least FIG. 2, a user can first turn/close the two front turn latches 422, then close the two folding clamps 408, then turn/close the two rear, central turn latches 422, and then turn/close the two rear, outer turn latches 422.

Figure 16:
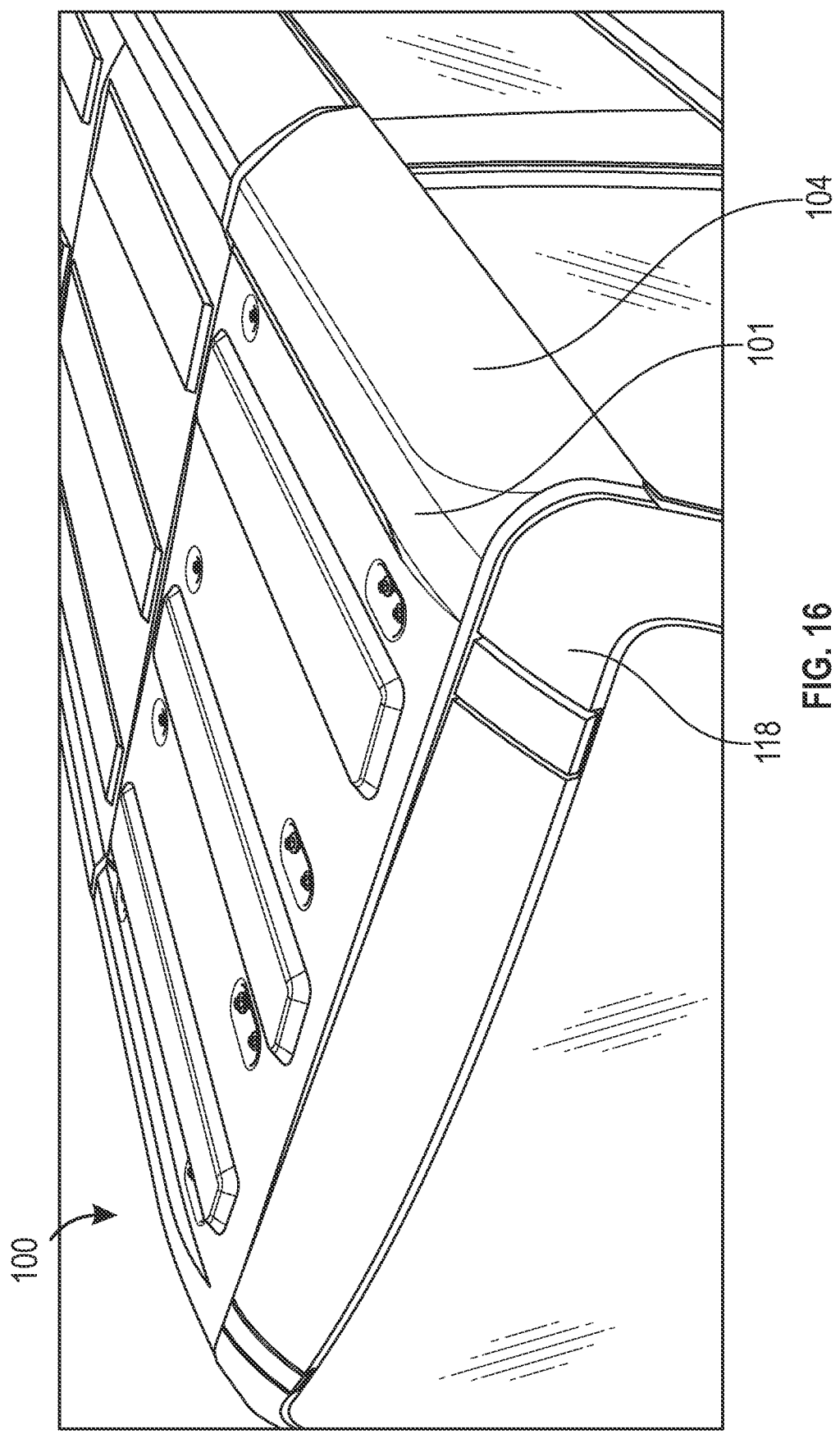
FIG. 16 shows a perspective view of the fully installed roof panel of FIGS. 13-15.

FIG. 16 shows the fully installed panel 101/assembly 100 on the vehicle 118 wherein the assembly 100 creates a weather-proof, aerodynamic, and structurally sound attachment with the vehicle 118. As shown in FIG. 16, the curvature of the panel 101/assembly 100 matches that of the vehicle 118 such that the vehicle retains its aerodynamic nature and retains its shape when the panel 101/assembly 100 is installed.

The assembly 100 is configured to provide for the panel 101 to fit snugly, tightly, and properly to a vehicle such that the assembly 100 is weather-proof. The panel 101 can be attached to the top portion of the frame of the vehicle such that the front 106 of the panel 218 faces forward and the rear 108 of the panel 101 faces rearward. The panel 101 is also configured to absorb sound. Thus, when attached to a vehicle, the assembly 100 is water-tight and can minimize road noise and/or wind noise. The assembly 100 is configured to withstand extreme weather conditions including, but not limited to, extreme temperatures and/or extreme wind. For example, the assembly 100 is configured to withstand temperatures ranging from −200 degrees Fahrenheit to 150 degrees Fahrenheit. The assembly 100 is further configured to withstand hurricane-like wind speeds. When secured to a vehicle, the assembly 100 is configured to protect the vehicle, including its occupants and/or contents from weather and/or ambient conditions. The assembly 100 includes insulation such that it is capable of regulating temperature in any vehicle to which it is attached. For example, the assembly 100 keeps the vehicle warm when experiencing cold ambient temperatures and cool when experiencing hot ambient temperatures. Additionally, the assembly 100 allows for easy and quick installation on and/or uninstallation from a vehicle. Further, the assembly 100 increases visibility for occupants in the vehicle and allows for more natural light to enter the vehicle making it easier to navigate trails with reduced sun exposure and/or obstacles such as branches or debris versus using a topless vehicle.

Figure 17:
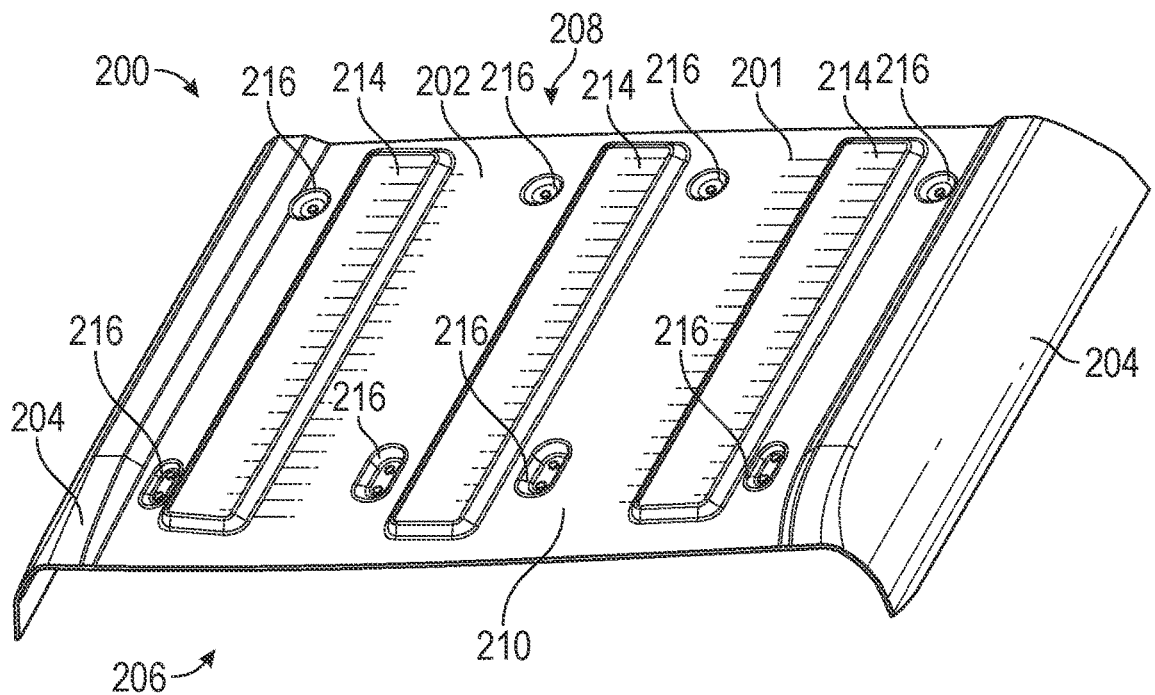
FIG. 17 shows a top, front, perspective view of a front panel of a vehicle roof assembly according to some aspects.

FIGS. 17-31 show another embodiment of a vehicle roof assembly 200, that includes a front roof panel 201 and a rear roof panel 218. The roof assembly 200 can be an original equipment manufacturer (OEM) direct replacement part. According to some embodiments, the front panel 201 is identical to the roof panel 101 of the embodiment of FIGS. 1-16. Additionally, some or all of the description included above regarding the panel 101 can apply to the front panel 201, depending on the embodiment. FIG. 17 shows a top perspective view of the front panel 201 that includes a generally flat middle portion 202 and two curved outer portions 204 on each side of the front panel 201. While only two sides of the front panel 201 of the embodiment of FIGS. 17-31 are curved, any number of sides and/or any portion of the panel 201 could be curved according to some embodiments. As seen in FIG. 17, the front panel 201 also includes a front 206, a rear 208, and a top 210.

According to some embodiments, the front panel 201 can be generally hard such that it is generally rigid and generally keeps its shape. The front panel 201 can also be transparent such that the front panel 201 has certain characteristics of a window in that a person can see through it. The front panel 201 can include a tint according to some embodiments. For example, the embodiment of FIGS. 17-31 includes a front panel 201 having a polycarbonate dark gray tint. While the front panel 201 of the embodiment of FIGS. 17-31 includes a polycarbonate dark gray tint, the tint could be of any material and/or color. The front panel 201 provides for vibrant and high-quality views when a person looks through the front panel 201. The front panel 201 also provides complete (100%) ultra-violet (UV) protection for occupants of the vehicle to which the front panel 201 is attached. The front panel 201 also blocks up to 82% of visible light transmission (VTL). While the front panel 201 can block up to 82% of VTL, the front panel 201 could block any other percentage lower than 82% according to some embodiments. The front panel 201 also reduces heat from the sun by an average of 65% versus un-tinted tops or topless configurations according to some embodiments. According to some embodiments, the front panel 201 is configured to block up to 46% of infrared radiation/light. While the front panel 201 can block up to 46% of infrared radiation/light, the front panel 201 could block any other percentage lower than 46% according to some embodiments. The front panel 201 is also configured to be scratch-resistant. The front panel 201 is also configured to have a fade-resistant finish.

Figure 18:
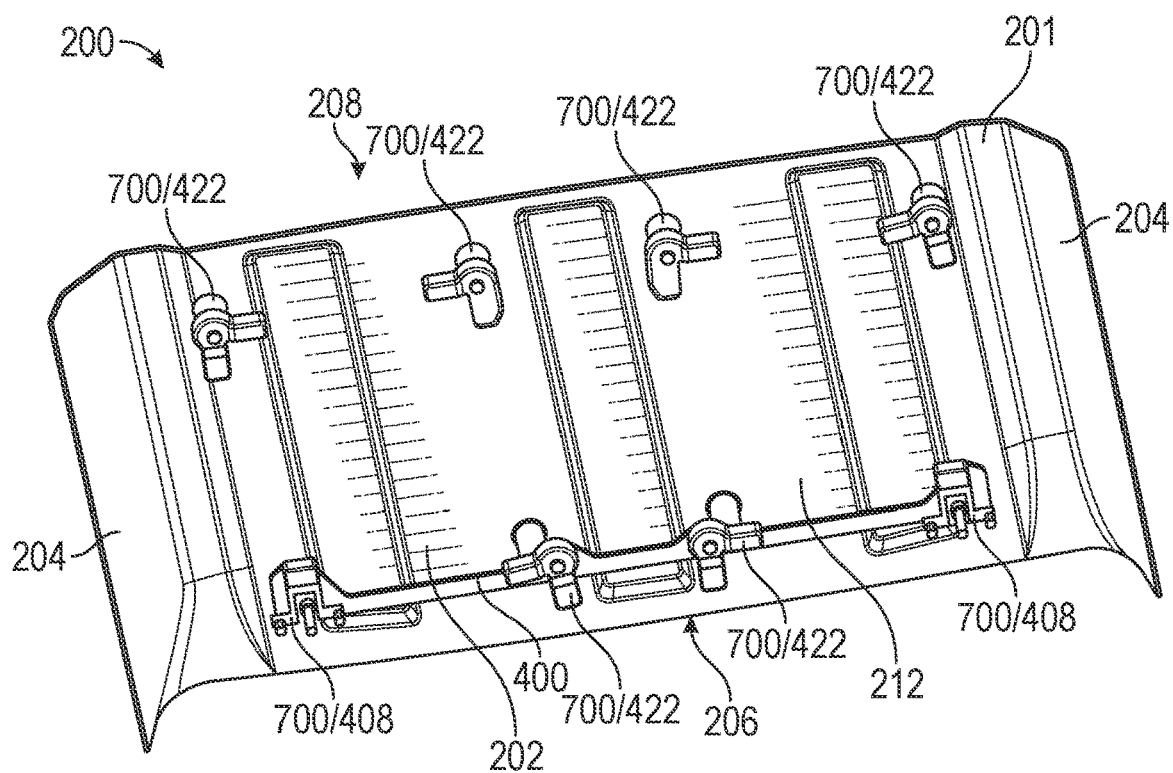
FIG. 18 shows a bottom perspective view of the front panel of the vehicle roof assembly of FIG. 17.

As seen in FIG. 18, the panel 201 includes a bottom 212, wherein the bottom 212 can comprise zero or more attachment mechanisms 700. While the embodiment of FIGS. 17-31 includes eight attachment mechanisms 700 located on the bottom 212 of the front panel 201 in two generally straight lines, wherein one line is near the front 206 and the other line is near the rear 208 of the front panel 201, according to some embodiments, the number and arrangement of the attachment mechanisms 700 can vary. For example, the number of attachment mechanisms 700 can range from zero to N where N is any number greater than zero. Additionally, any arrangement and/or formation of the attachment mechanisms 700 can be used including arranging the attachment mechanisms 700 in lines, in circular formation, in random formation, and/or in any other suitable formation. Additionally, while six of the attachment mechanisms 700 in the embodiment of FIGS. 17-31 are turn latches 422 and two of the attachment mechanisms 700 are folding clamps 408, any of the attachment mechanisms 700 could be turn latches 422, folding clamps 408, and/or any other type of attachment mechanism including, but not limited to, any kind of clamp, latch, cinch, bracket, grip, lock, hold, connector, screw, nut and bolt, and the like.

Figure 20:
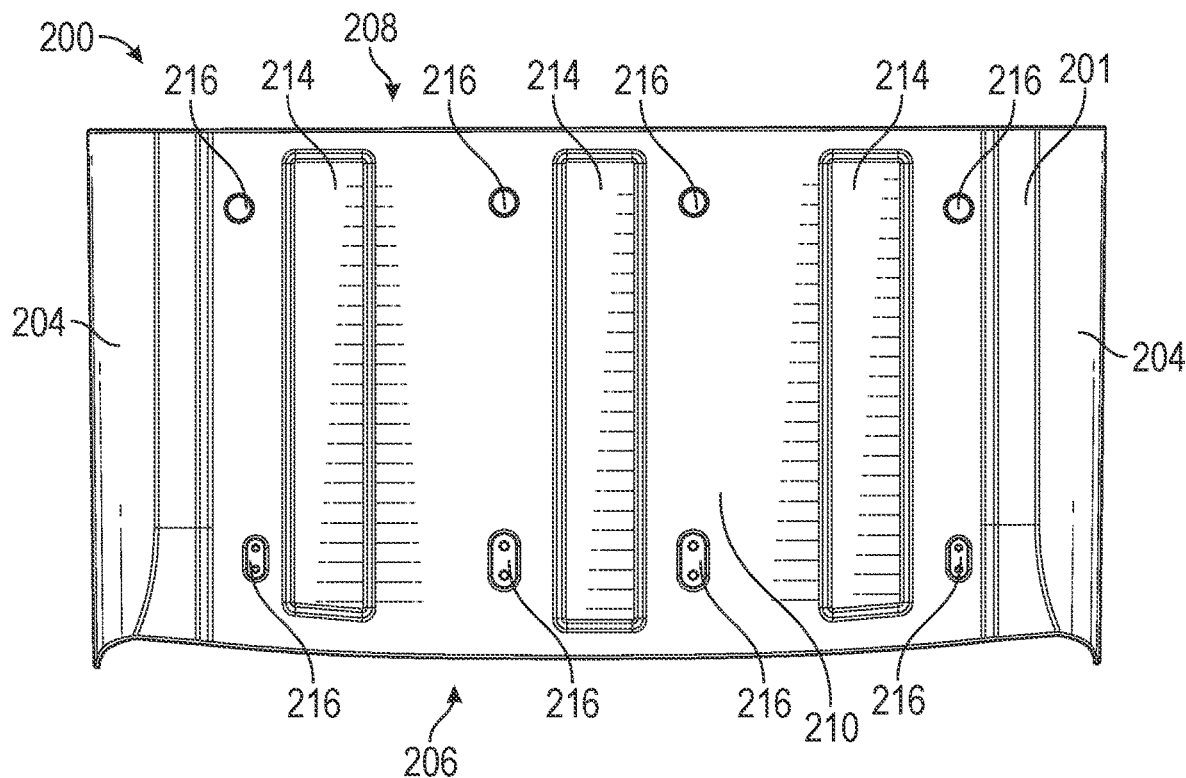
FIG. 20 shows a top elevation view of the front panel of the vehicle roof assembly of FIGS. 17-19.
Figure 21:
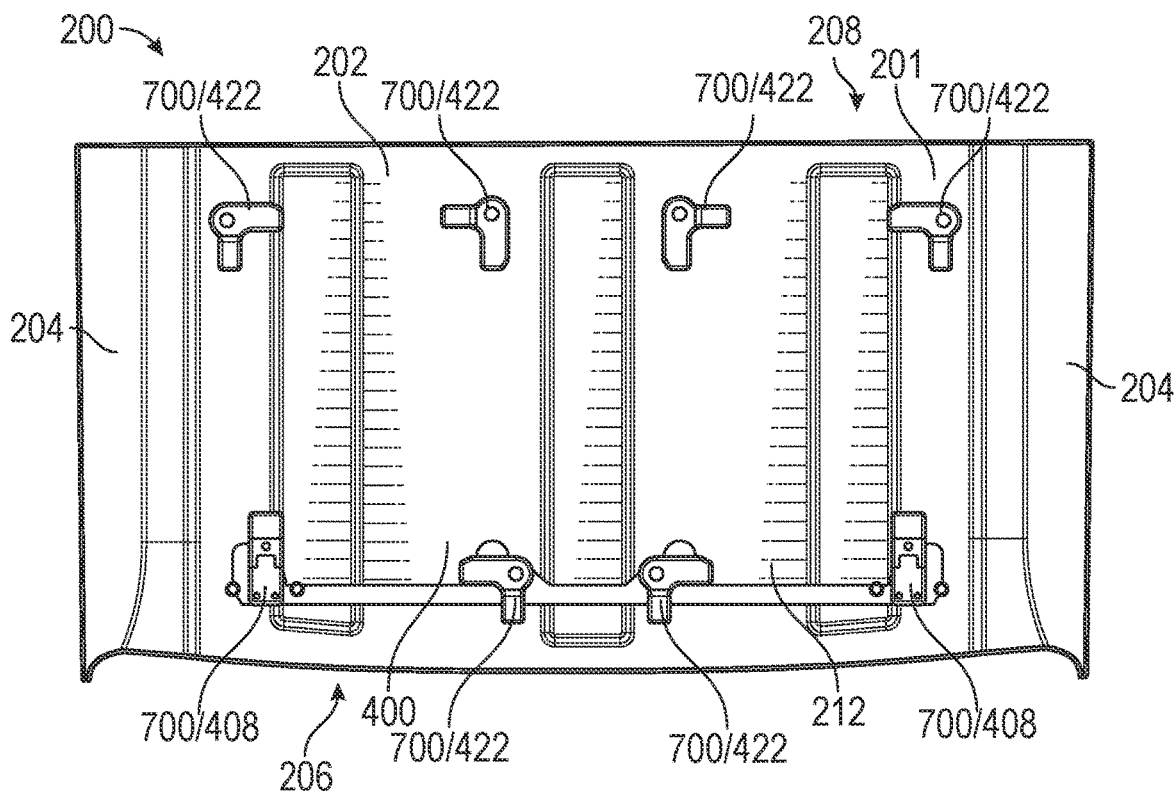
FIG. 21 shows a bottom elevation view of the front panel of the vehicle roof assembly of FIGS. 17-20.
Figure 22:
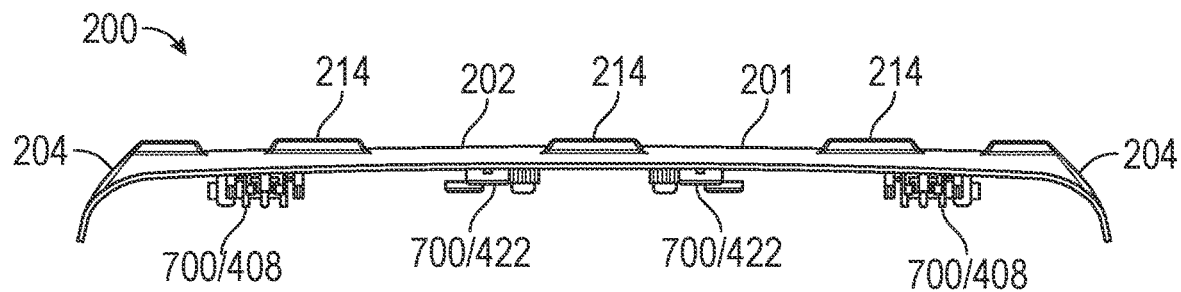
FIG. 22 shows a front elevation view of the front panel of the vehicle roof assembly of FIGS. 17-21.
Figure 23:
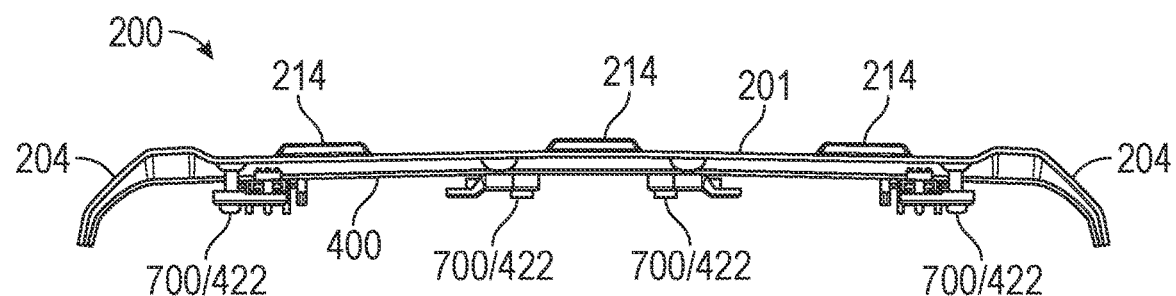
FIG. 23 shows a rear elevation view of the front panel vehicle roof assembly of FIGS. 17-22.

As seen in at least FIGS. 18, 21, and 23, the embodiment of FIGS. 17-31 can also include a front roof brace 400. While one front roof brace 400 is used in the embodiment of FIGS. 17-31, any number of front roof braces 400 ranging from zero to N could be included where N is any number greater than zero. The embodiment of FIGS. 17-31 shows that four of the attachment mechanisms 700 are mounted on the front roof brace 400 wherein the front roof brace 400 is mounted to the bottom 212 of the front panel 201. According to some embodiments, any number of attachment mechanisms 700 ranging from zero to N where N is any number greater than zero can be mounted to the front roof brace 400 of any other roof brace.

The front roof brace 400 provides stability and structure to the front panel 201. The front roof brace 400 also provides for proper mounting of attachment mechanisms 700 wherein attachment mechanisms can be mounted on the front roof brace 400.

Figure 19:
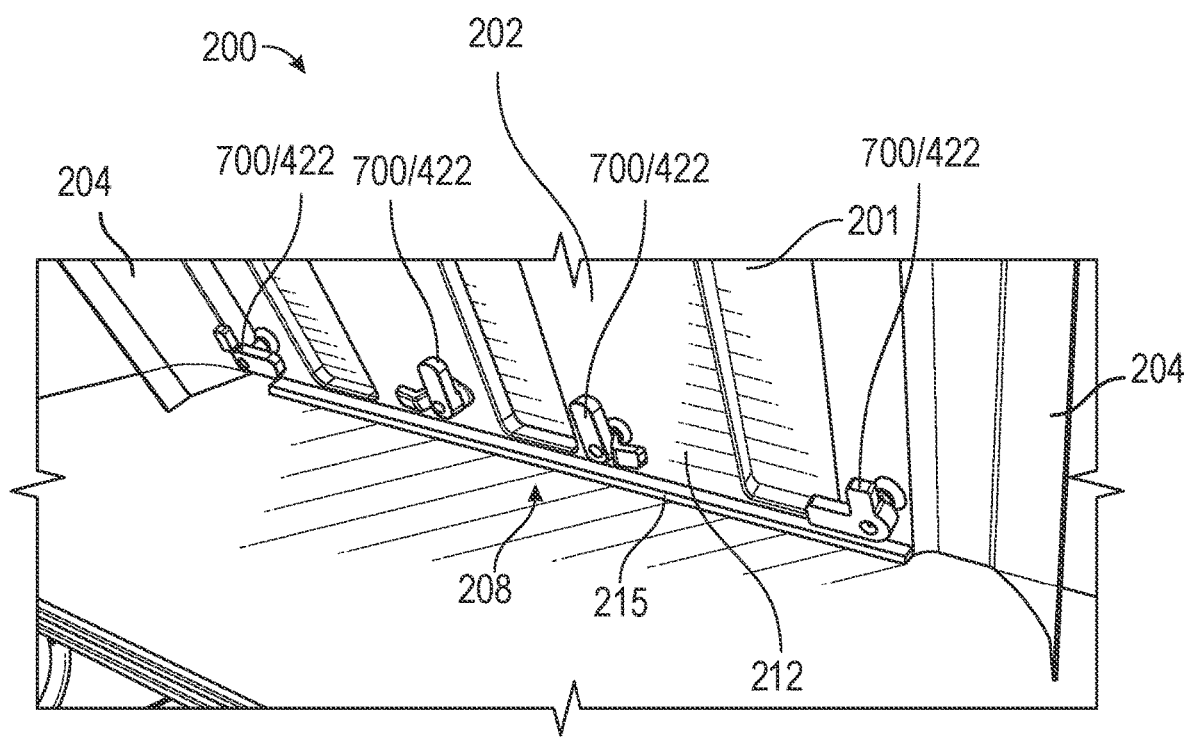
FIG. 19 shows a partial bottom perspective view of the front panel of the vehicle roof assembly of FIGS. 17 and 18 wherein the front panel includes a seal strip.

As shown in FIG. 19, some embodiments can include a seal strip 215 located at or near the rear 208 of the bottom 212 of the panel 201. While the seal strip 215 is not shown in any of the other figures of the embodiment of FIGS. 17-31, it could be included. The seal strip 215 is configured to provide sealing for the panel 201 such that the assembly 200 is rendered weather-proof when installed on a vehicle. The seal strip 215 can operate in a similar manner as the seal(s) 122 wherein the seal strip 215 can be a foam, weather-tight seal to ensure snug, weather-tight, and proper fitment between the assembly 200 and a vehicle. The seal strip 215 also helps provide for temperature regulation. The seal strip 215 also provides cushion for the rear 208 of the panel 201 which serves to minimize and/or eliminate any potential damage that may be suffered by the panel 201 or the vehicle during installation, during uninstallation, and/or after being installed.

As seen in at least FIGS. 17 and 20, the front panel 201 includes a plurality of mounts 216. Each mount 216 can comprise an indentation in the top 210 of the front panel 201 and a protrusion on the bottom 212 of the front panel 201. Each mount 216 can serve to facilitate attachment of a component to be mounted on the bottom 212 of the front panel 201. For example, in the embodiment of FIGS. 17-31 the front roof brace 400 is mounted at four different places on the brace 400 to four different mounts 216 and four attachment mechanisms 700 are mounted directly to four mounts 216.

As seen in at least FIGS. 17, 20, 22, and 23, the front panel 201 includes a plurality of projections 214. While the front panel 201 of the embodiment of FIGS. 17-31 includes three projections 214 located on the generally flat middle portion 202 of the front panel 201, according to some embodiments the front panel 201 can include any number of projections 214 ranging from zero to N where N is any number greater than zero. The projections 214 can also be of any suitable size and/or arranged in any suitable formation. The projections 214 serve to make the assembly 200 more aerodynamic when attached to a vehicle.

Figure 24:
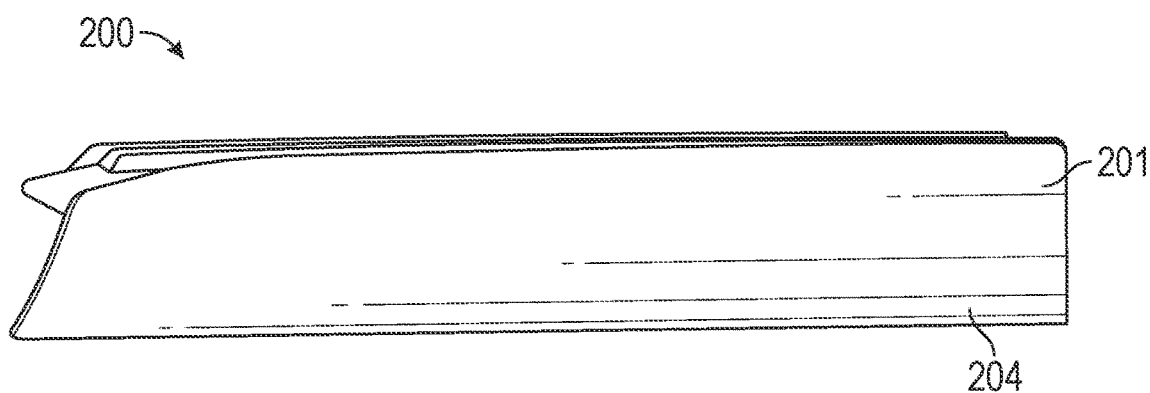
FIG. 24 shows a side elevation view of the front panel of the vehicle roof assembly of FIGS. 17-23.

FIG. 24 shows a side view of the front panel 201 wherein one of the curved outer portions 204 is visible. The curved outer portions 204 serve to emulate the curvature and/or shape of the vehicle to which the assembly 200 will be attached. Thus, the front panel 201, including its curved outer portions 204, provides a snug, tight, and proper fitment of the assembly 200 to a vehicle.

The front panel 201 can be installed in the same manner as the panel 101 as described above and as shown in FIGS. 10-16. For example, installation of the front panel 201 can include the use of connection strip(s) 120 and/or seal(s) 122.

Figure 25:
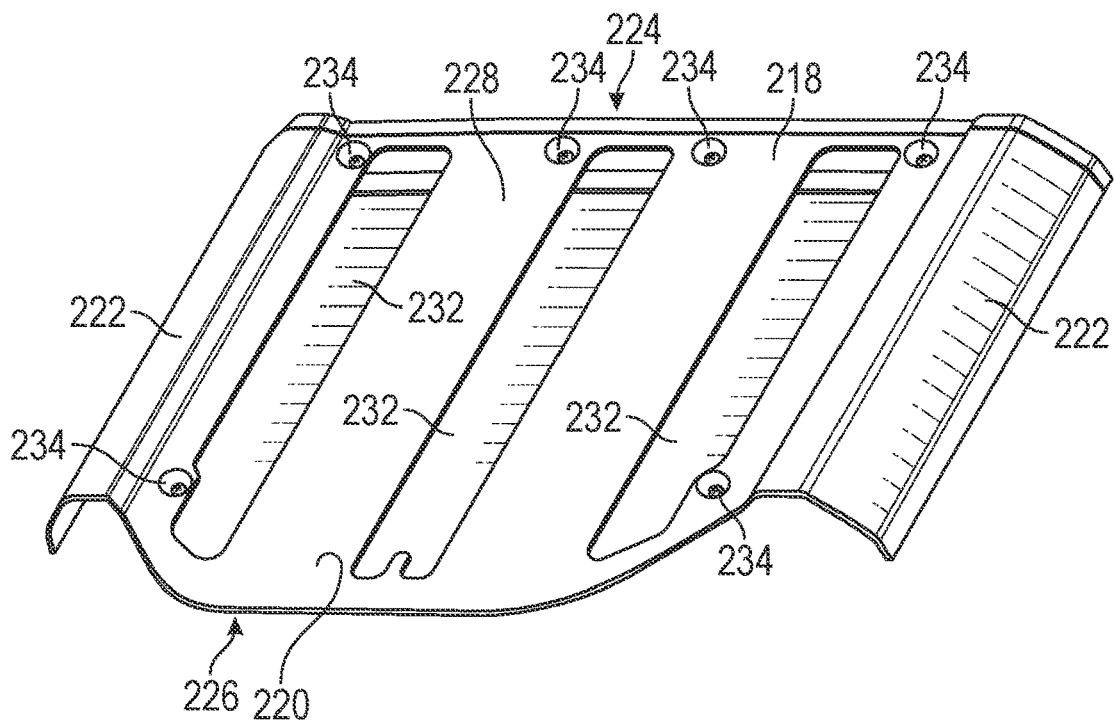
FIG. 25 is a top perspective view of a rear panel of the vehicle roof assembly of FIGS. 17-24 according to some aspects.
Figure 26:
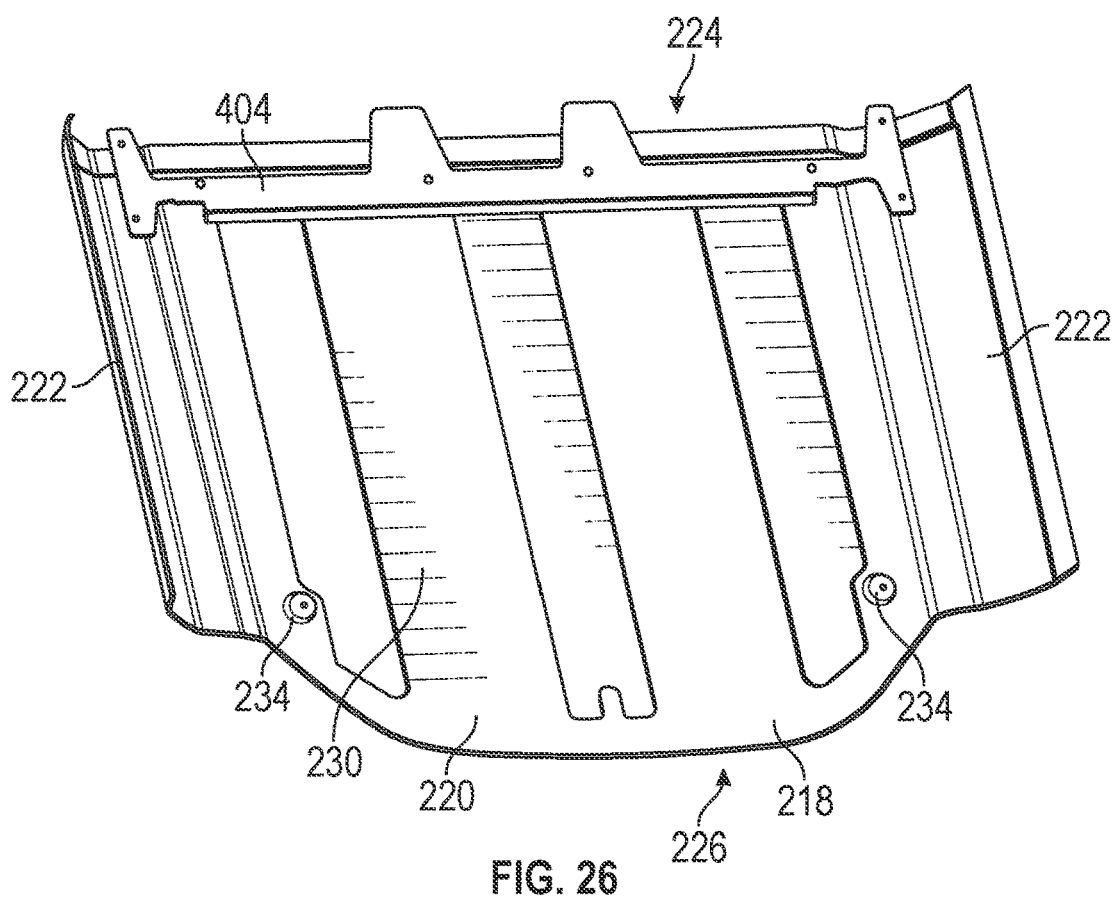
FIG. 26 shows a bottom perspective view of the rear panel of the vehicle roof assembly of FIGS. 17-25.

As shown in FIGS. 25-31, the embodiment of FIGS. 17-31 also includes a rear roof panel 218. According to some embodiments, the rear panel 218 can have the same characteristics and/or qualities as the panel 101 and/or the front panel 201. Additionally, some or all of the description included above regarding the panel 101 and/or the front panel 201 can apply to the rear panel 218, depending on the embodiment. FIG. 32 shows a top perspective view of the rear panel 218 that includes a generally flat middle portion 220 and two curved outer portions 222 on each side of the rear panel 218. While only two sides of the rear panel 218 of the embodiment of FIGS. 17-31 are curved, any number of sides and/or any portion of the rear panel 218 could be curved according to some embodiments. As seen in FIG. 25, the rear panel 218 also includes a front 224, a rear 226, and a top 228.

According to some embodiments, the rear panel 218 can be generally hard such that it is generally rigid and generally keeps its shape. The rear panel 218 can also be transparent such that the rear panel 218 has certain characteristics of a window in that a person can see through it. The rear panel 218 can include a tint according to some embodiments. For example, the embodiment of FIGS. 17-31 includes a rear panel 218 having a polycarbonate dark gray tint. While the rear panel 218 of the embodiment of FIGS. 17-31 includes a polycarbonate dark gray tint, the tint could be of any material and/or color. The rear panel 218 provides for vibrant and high-quality views when a person looks through the rear panel 218. The rear panel 218 also provides complete (100%) ultra-violet (UV) protection for occupants of the vehicle to which the rear panel 218 is attached. The rear panel 218 also blocks up to 82% of visible light transmission (VTL). While the rear panel 218 can block up to 82% of VTL, the rear panel 218 could block any other percentage lower than 82% according to some embodiments. The rear panel 218 also reduces heat from the sun by an average of 65% versus un-tinted tops or topless configurations according to some embodiments. According to some embodiments, the rear panel 218 is configured to block up to 46% of infrared radiation/light. While the rear panel 218 can block up to 46% of infrared radiation/light, the rear panel 218 could block any other percentage lower than 46% according to some embodiments. The rear panel 218 is also configured to be scratch-resistant. The rear panel 218 is also configured to have a fade-resistant finish.

As seen in at least FIGS. 26, 28, 29, and 30, the rear panel 218 of the embodiment of FIGS. 17-31 can also include a rear roof brace 404. While one rear roof brace 404 is used in the embodiment of FIGS. 17-31, any number of rear roof braces 404 ranging from zero to N could be included where N is any number greater than zero. The embodiment of FIGS. 17-31 shows that the rear roof brace 404 is mounted to the bottom 230 of the rear panel 218.

The rear roof brace 404 provides stability and structure to the front panel 201 and the rear panel 218. The rear roof brace 404 also provides for proper mounting of attachment mechanisms 700 wherein attachment mechanisms can be mounted on the rear roof brace 404.

As seen in at least FIGS. 25-28, the rear panel 218 includes a plurality of mounts 234. Each mount 234 can comprise an indentation in the top 228 of the rear panel 218 and a protrusion on the bottom 230 of the rear panel 218. Each mount 234 can serve to facilitate attachment of a component to be mounted on the bottom 230 of the rear panel 218. For example, in the embodiment of FIGS. 17-31 the rear roof brace 404 is mounted at four different places on the brace 404 to four different mounts 234. According to some embodiments, the rear panel 218 can include any suitable number of mounts 234 arranged in any suitable formation. Additionally, while no attachment mechanisms 700 are shown on the rear panel 218 in any of FIGS. 25-31, any number of attachment mechanisms 700 could be mounted on the bottom 230 of the rear panel 218 and/or mounted on the rear roof brace 404. According to some embodiments, attachment mechanisms 700 can be mounted to the rear panel 218 via the mounts 234 wherein one attachment mechanism is mounted to each mount 234. In an example embodiment, four attachment mechanisms 700 could be mounted to the rear roof brace 404 and an attachment mechanism 700 could be mounted to each of the two mounts 234 near the rear 226 of the rear panel 218.

Figure 27:
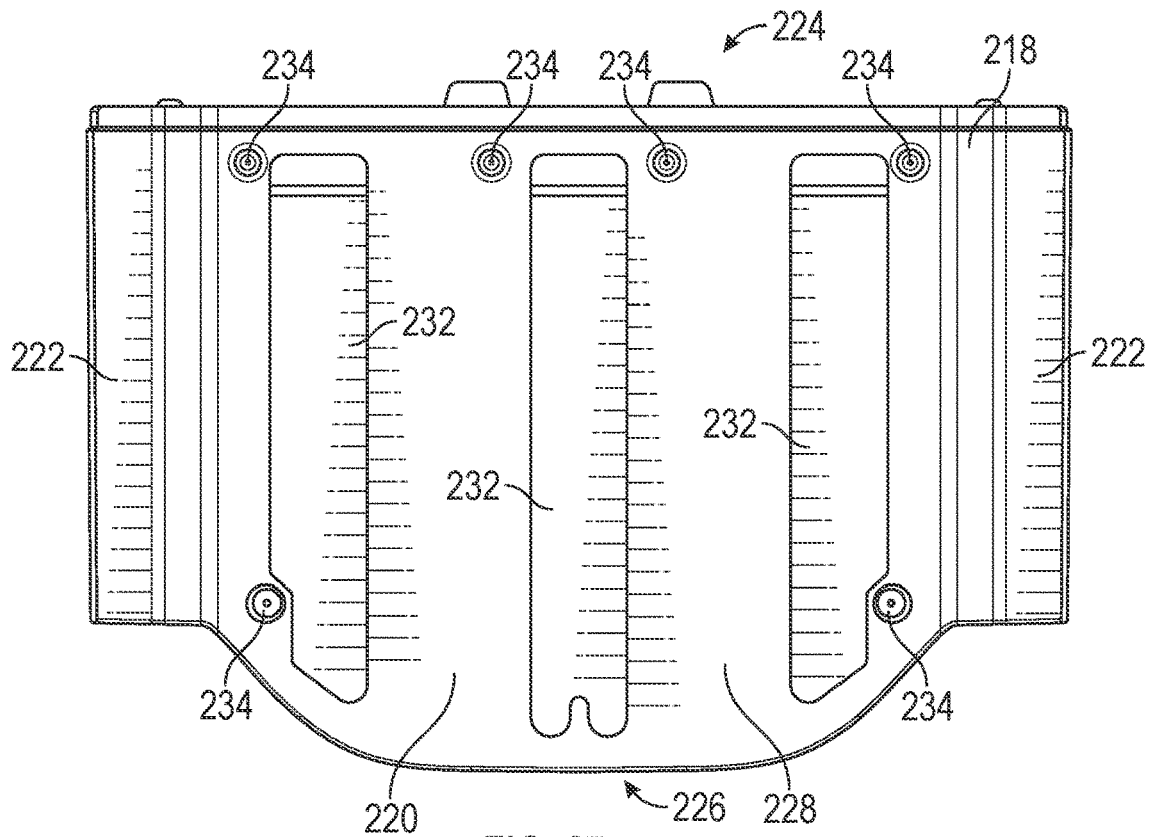
FIG. 27 shows a top elevation view of the rear panel of the vehicle roof assembly of FIGS. 17-26.
Figure 28:
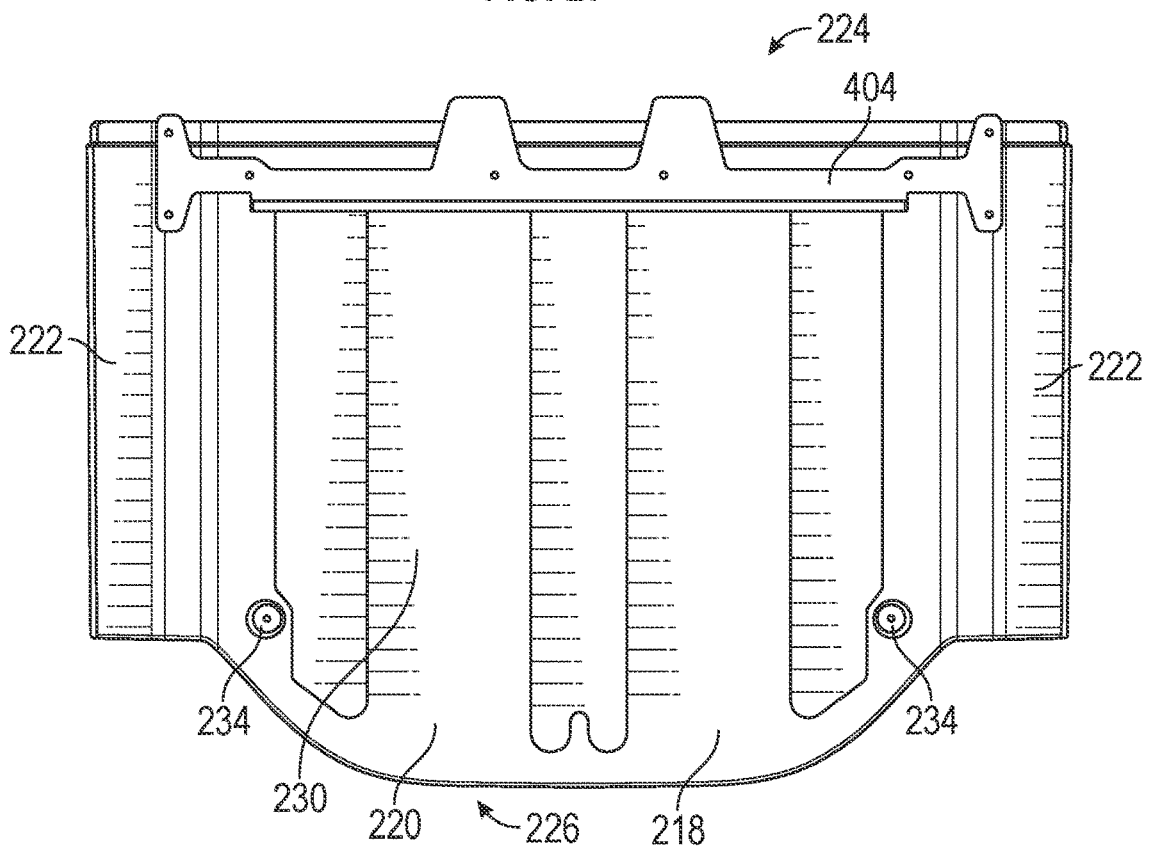
FIG. 28 shows a bottom elevation view of the rear panel of the vehicle roof assembly of FIGS. 17-27.
Figure 29:
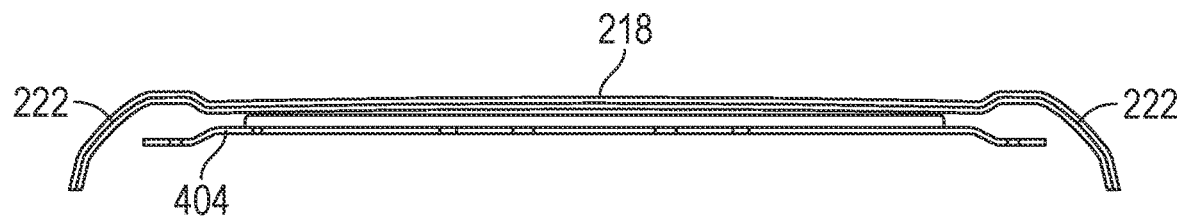
FIG. 29 shows a front elevation view of the rear panel of the vehicle roof assembly of FIGS. 17-28.
Figure 30:
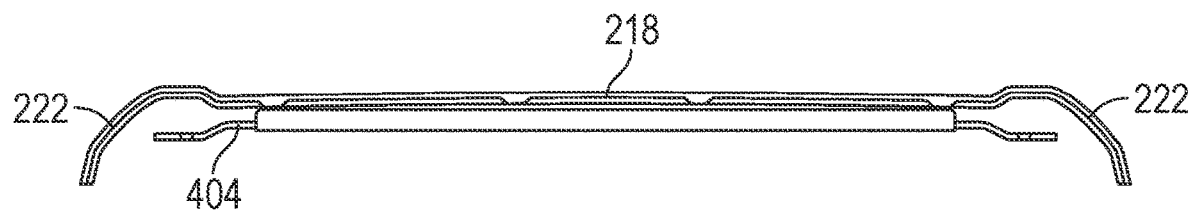
FIG. 30 shows a rear elevation view of the rear panel of the vehicle roof assembly of FIGS. 17-29.

As seen in at least FIGS. 25 and 27, the rear panel 218 includes a plurality of projections 232. While the rear panel 218 of the embodiment of FIGS. 17-31 includes three projections 232 located on the generally flat middle portion 220 of the rear panel 218, according to some embodiments the rear panel 218 can include any number of projections 232 ranging from zero to N where N is any number greater than zero. The projections 232 can also be of any suitable size and/or arranged in any suitable formation. The projections 232 serve to make the assembly 200 more aerodynamic when attached to a vehicle. According to some embodiments, the projections 232 can be openings, holes, and/or slots in the rear panel 218.

Figure 31:
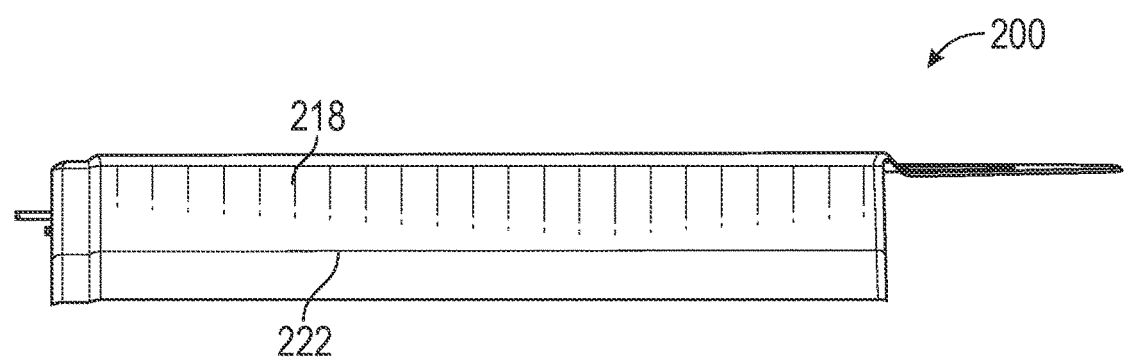
FIG. 31 shows a side elevation view of the rear panel of the vehicle roof assembly of FIGS. 17-30.
Figure 32:
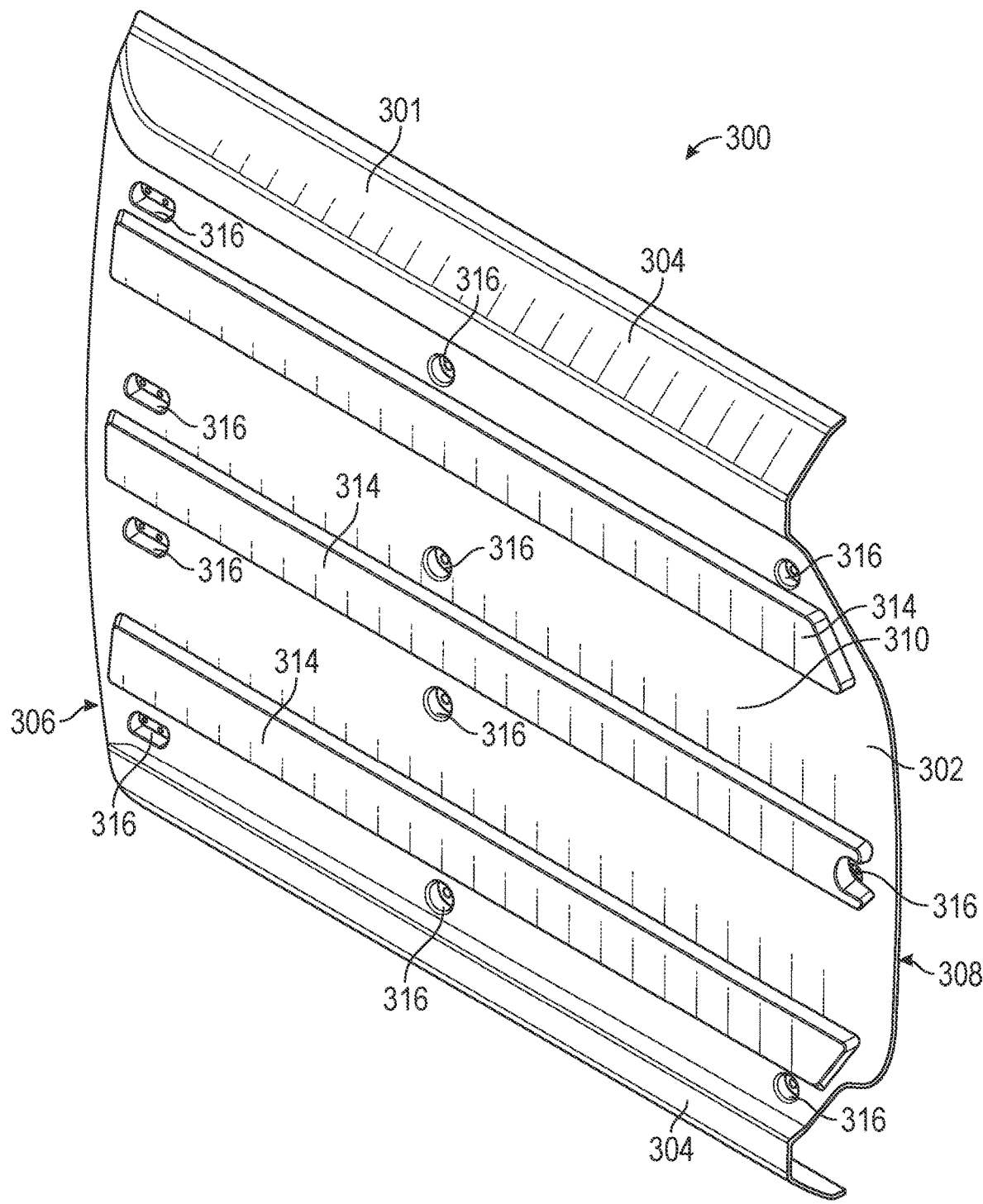
FIG. 32 shows a top perspective view of a vehicle roof assembly according to some aspects.
Figure 33:
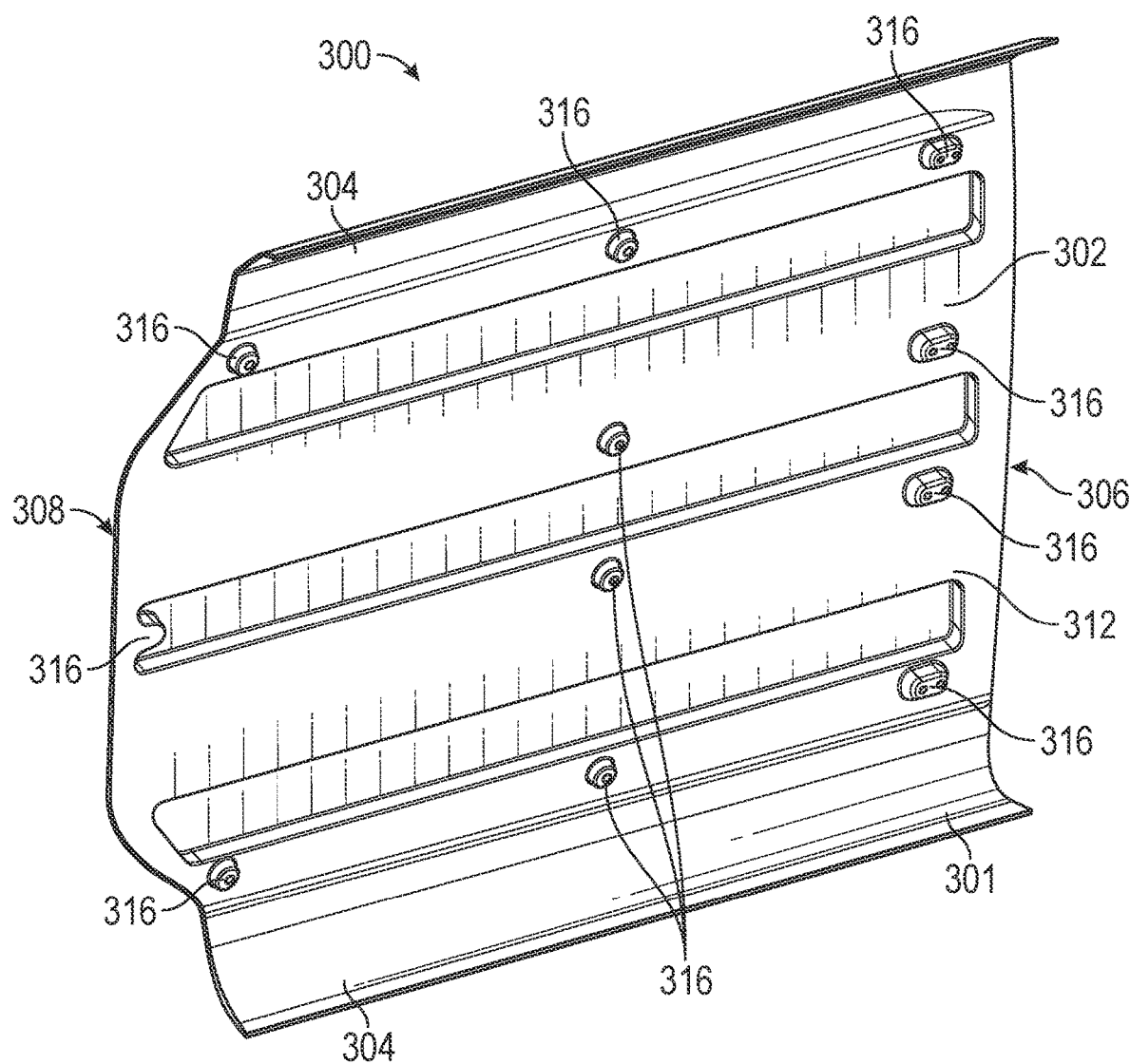
FIG. 33 shows a bottom perspective view of the vehicle roof assembly of FIG. 32.
Figure 34:
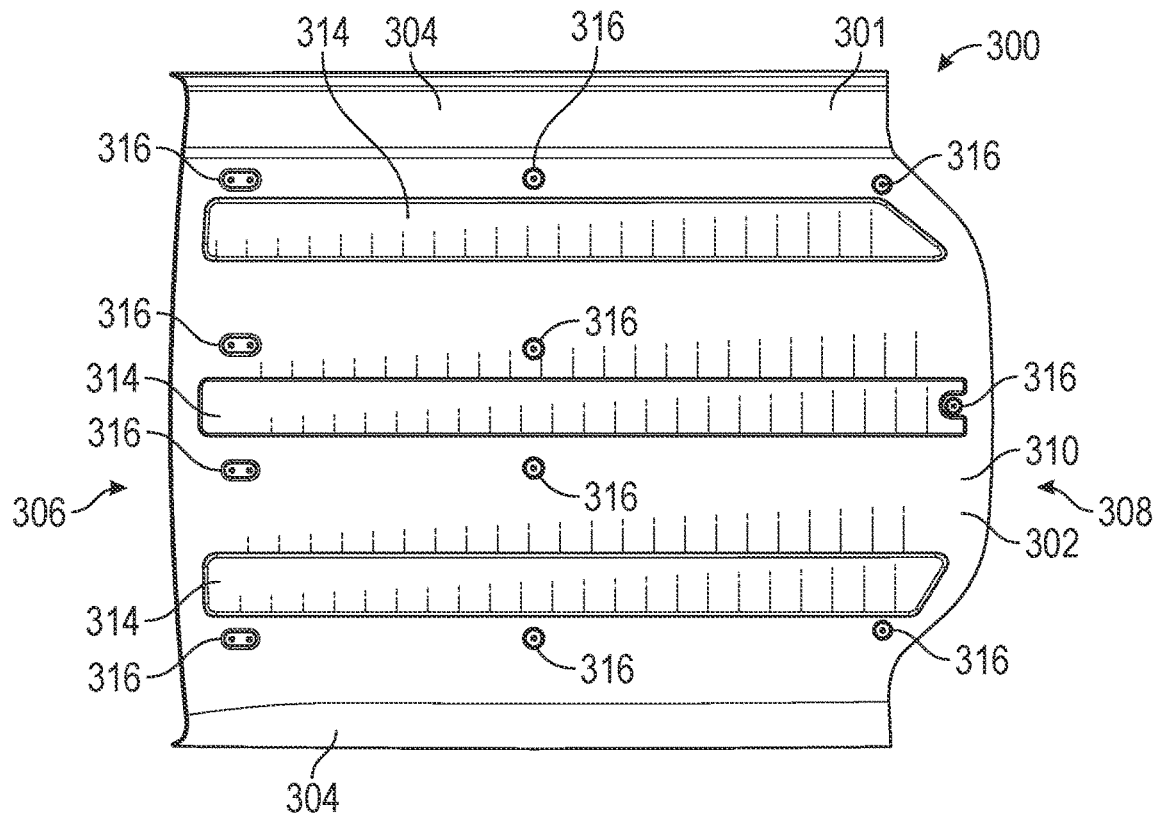
FIG. 34 shows a top elevation view of the vehicle roof assembly of FIGS. 32 and 33.
Figure 35:
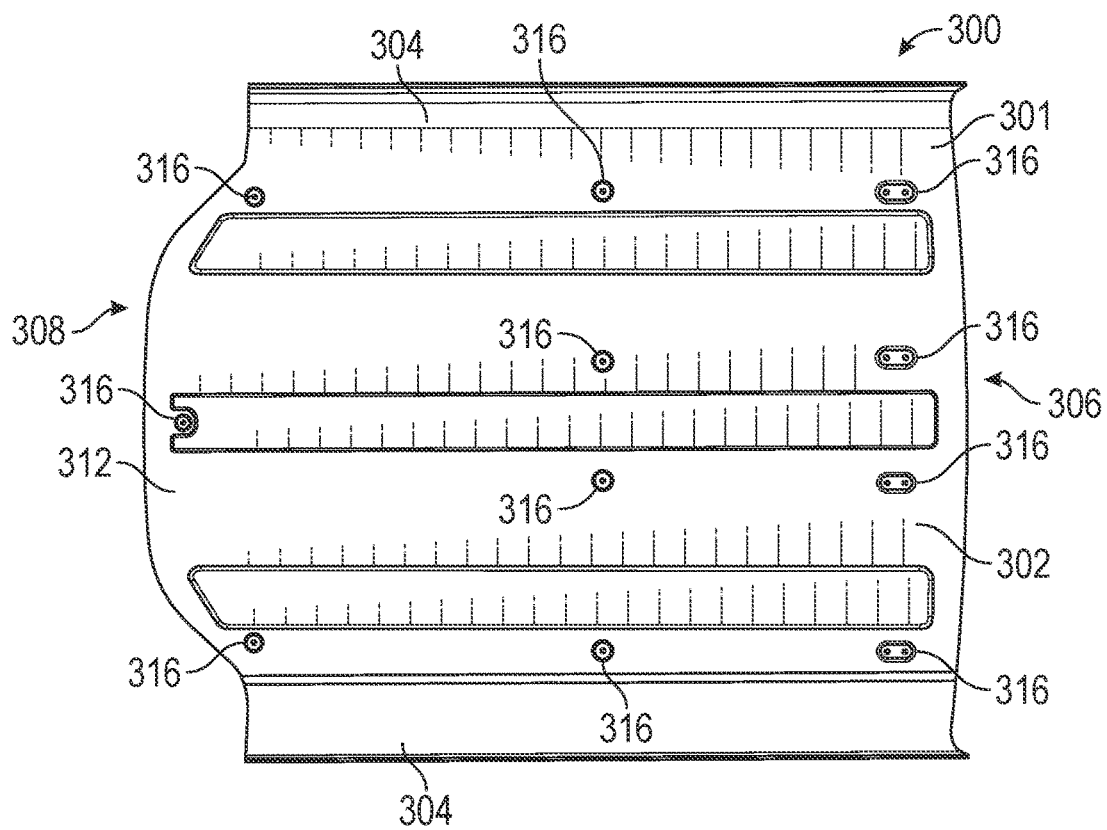
FIG. 35 shows a bottom elevation view of the vehicle roof assembly of FIGS. 32-34.
Figure 36:
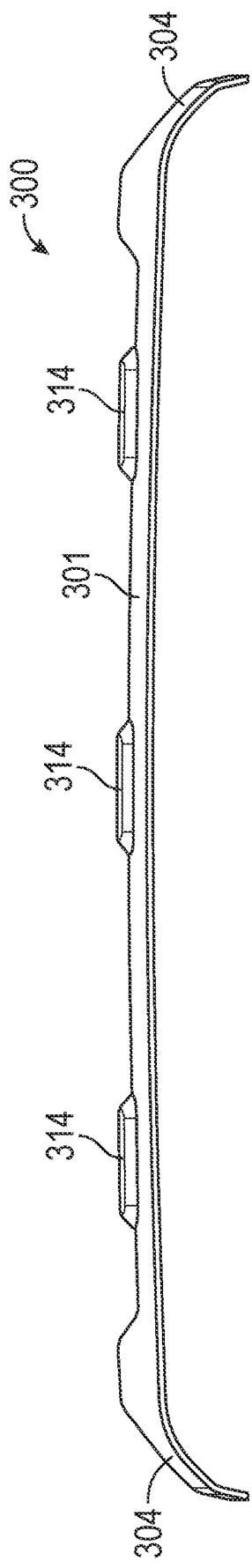
FIG. 36 shows a front elevation view of the vehicle roof assembly of FIGS. 32-35.
Figure 37:
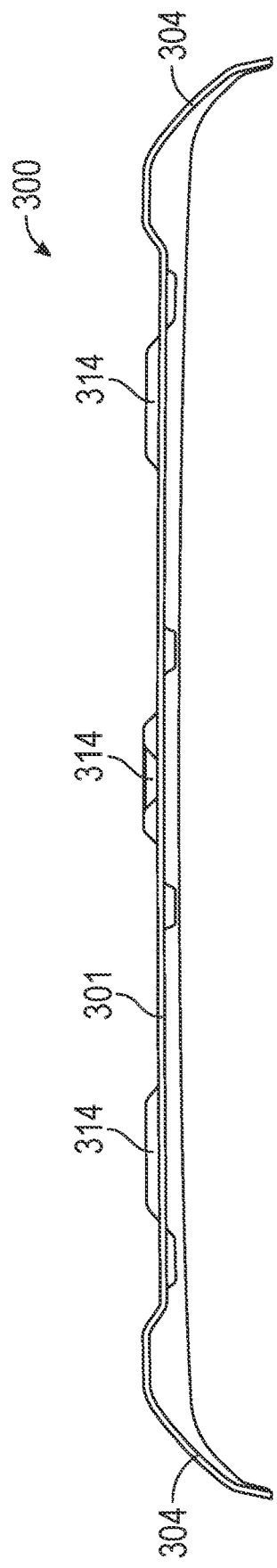
FIG. 37 shows a rear elevation view of the vehicle roof assembly of FIGS. 32-36.

FIG. 31 shows a side view of the rear panel 218 wherein one of the curved outer portions 222 is visible. The curved outer portions 222 serve to emulate the curvature and/or shape of the vehicle to which the assembly 200 will be attached. Thus, the rear panel 218, including its curved outer portions 222, provides a snug, tight, and proper fitment of the assembly 200 to a vehicle.

The rear panel 218 can be installed in a similar manner as the panel 101 and/or the front panel 201 as described above and as shown in FIGS. 10-16. For example, installation of the rear panel 218 can include the use of connection strip(s) 120 and/or seal(s) 122.

The assembly 200 is configured to provide for the front panel 201 and rear panel 218 to fit snugly, tightly, and properly to a vehicle such that the assembly 200 is weather-proof. The front panel 201 can be attached to the front, top portion of the frame of the vehicle with the front 206 of the front panel 201 facing forward and the rear 208 of the front panel 201 facing rearward. The rear panel 218 can be attached to the top portion of the frame of the vehicle just behind the front panel 201, wherein the front 224 of the rear panel 218 faces forward and the rear 226 of the rear panel 218 faces rearward. The front and rear panels 201/218 can be in contact and/or nearly in contact when installed on a vehicle. The front panel 201 and rear panel 218 are also configured to absorb sound. Thus, when attached to a vehicle, the assembly 200 is water-tight and can minimize road noise and/or wind noise. The assembly 200 is configured to withstand extreme weather conditions including, but not limited to, extreme temperatures and/or extreme wind. For example, the assembly 200 is configured to withstand temperatures ranging from −200 degrees Fahrenheit to 150 degrees Fahrenheit. The assembly 200 is further configured to withstand hurricane-like wind speeds. When secured to a vehicle, the assembly 200 is configured to protect the vehicle, including its occupants and/or contents from weather and/or ambient conditions. The assembly 200 includes insulation such that it is capable of regulating temperature in any vehicle to which it is attached. For example, the assembly 200 keeps the vehicle warm when experiencing cold ambient temperatures and cool when experiencing hot ambient temperatures. Additionally, the assembly 200 allows for easy and quick installation on and/or uninstallation from a vehicle. Further, the assembly 200 increases visibility for occupants in the vehicle and allows for more natural light to enter the vehicle making it easier to navigate trails with reduced sun exposure and/or obstacles such as branches or debris versus using a topless vehicle.

FIGS. 32-38 show another embodiment of a vehicle roof assembly 300, that includes a roof panel 301. The roof assembly 300 can be an original equipment manufacturer (OEM) direct replacement part. According to some embodiments, the panel 301 can have the same characteristics and/or qualities as the panel 101, the front panel 201, and/or the rear panel 218. Additionally, some or all of the description included above regarding the panel 101, the front panel 201, and/or the rear panel 218 can apply to the panel 301, depending on the embodiment. FIG. 32 shows a top perspective view of the panel 301 that includes a generally flat middle portion 302 and two curved outer portions 304 on each side of the panel 301. While only two sides of the panel 301 of the embodiment of FIGS. 32-38 are curved, any number of sides and/or any portion of the panel 301 could be curved according to some embodiments. As seen in FIG. 32, the panel 301 also includes a front 306, a rear 308, and a top 310.

According to some embodiments, the panel 301 can be generally hard such that it is generally rigid and generally keeps its shape. The panel 301 can also be transparent such that the panel 301 has certain characteristics of a window in that a person can see through it. The panel 301 can include a tint according to some embodiments. For example, the embodiment of FIGS. 32-38 includes a panel 301 having a polycarbonate dark gray tint. While the panel 301 of the embodiment of FIGS. 32-38 includes a polycarbonate dark gray tint, the tint could be of any material and/or color. The panel 301 provides for vibrant and high-quality views when a person looks through the panel 301. The panel 301 also provides complete (100%) ultra-violet (UV) protection for occupants of the vehicle to which the panel 301 is attached. The panel 301 also blocks up to 82% of visible light transmission (VTL). While the panel 301 can block up to 82% of VTL, the panel 301 could block any other percentage lower than 82% according to some embodiments. The panel 301 also reduces heat from the sun by an average of 65% versus un-tinted tops or topless configurations according to some embodiments. According to some embodiments, the panel 301 is configured to block up to 46% of infrared radiation/light. While the panel 301 can block up to 46% of infrared radiation/light, the panel 301 could block any other percentage lower than 46% according to some embodiments. The panel 301 is also configured to be scratch-resistant. The panel 301 is also configured to have a fade-resistant finish.

As seen in at least FIGS. 32-35, the panel 301 includes a plurality of mounts 316. Each mount 316 can comprise an indentation in the top 310 of the panel 300 and a protrusion on the bottom 312 of the panel 301. Each mount 316 can serve to facilitate attachment of a component to be mounted on the bottom 312 of the panel 301. For example, while the embodiment shown in FIGS. 32-38 does not show any attachment mechanisms 700 or roof braces 400/404, any combination of attachment mechanisms 700 and/or roof braces 400/404 could be attached to the mounts 316 of the panel 301. For example, according to some embodiments, a roof brace 400/404 is mounted to the four mounts 316 arranged in a line closest to the front 306 of the panel 301 wherein four attachment mechanisms 700 are mounted on the roof brace 400/404, and an attachment mechanism 700 is mounted to each of the remaining seven mounts 316.

As seen in at least FIGS. 32, 34, 36, and 37, the panel 301 includes a plurality of projections 314. While the panel 301 of the embodiment of FIGS. 32-38 includes three projections 314 located on the generally flat middle portion 302 of the panel 301, according to some embodiments the panel 301 can include any number of projections 314 ranging from zero to N where N is any number greater than zero. The projections 314 can also be of any suitable size and/or arranged in any suitable formation. The projections 314 serve to make the assembly 300 more aerodynamic when attached to a vehicle.

Figure 38:
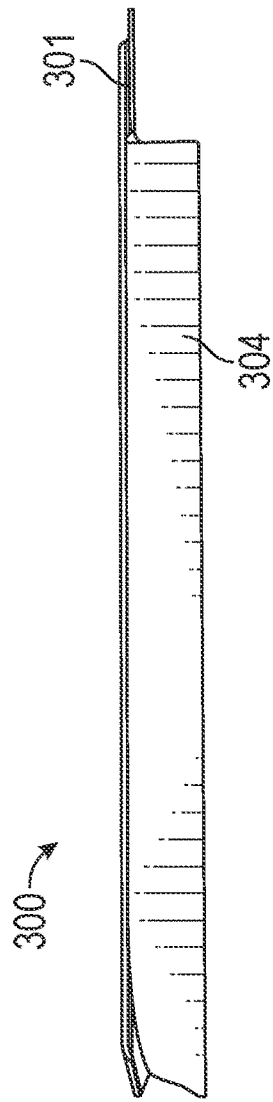
FIG. 38 shows a side elevation view of the vehicle roof assembly of FIGS. 32-37.

FIG. 38 shows a side view of the panel 301 wherein one of the curved outer portions 304 is visible. The curved outer portions 304 serve to emulate the curvature and/or shape of the vehicle to which the assembly 300 will be attached. Thus, the panel 301, including its curved outer portions 304, provides a snug, tight, and proper fitment of the assembly 300 to a vehicle.

The assembly 300 is configured to provide for the panel 301 to fit snugly, tightly, and properly to a vehicle such that the assembly 300 is weather-proof. The panel 301 can be attached to the front, top portion of the frame of the vehicle with the front 306 of the panel 301 facing forward and the rear 308 of the panel 301 facing rearward. The panel 301 can be configured to be larger in surface area than the panel 101 such that the panel 301 covers a larger portion of the top of the vehicle than the panel 101. The panel 301 is also configured to absorb sound. Thus, when attached to a vehicle, the assembly 300 is water-tight and can minimize road noise and/or wind noise. The assembly 300 is configured to withstand extreme weather conditions including, but not limited to, extreme temperatures and/or extreme wind.

For example, the assembly 300 is configured to withstand temperatures ranging from −200 degrees Fahrenheit to 150 degrees Fahrenheit. The assembly 300 is further configured to withstand hurricane-like wind speeds. When secured to a vehicle, the assembly 300 is configured to protect the vehicle, including its occupants and/or contents from weather and/or ambient conditions. The assembly 300 includes insulation such that it is capable of regulating temperature in any vehicle to which it is attached. For example, the assembly 300 keeps the vehicle warm when experiencing cold ambient temperatures and cool when experiencing hot ambient temperatures. Additionally, the assembly 300 allows for easy and quick installation on and/or uninstallation from a vehicle. Further, the assembly 300 increases visibility for occupants in the vehicle and allows for more natural light to enter the vehicle making it easier to navigate trails with reduced sun exposure and/or obstacles such as branches or debris versus using a topless vehicle.

Figure 39A:
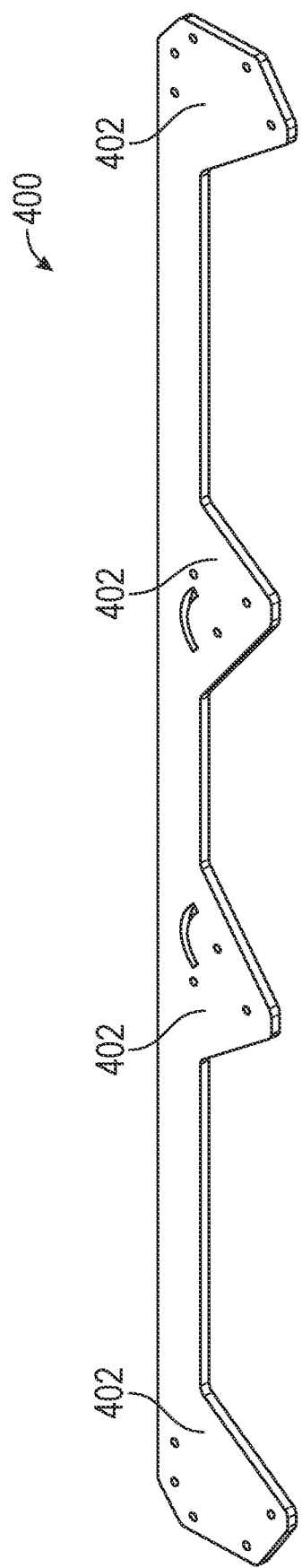
FIG. 39A shows a perspective view of a front roof brace according to some aspects.
Figure 39B:
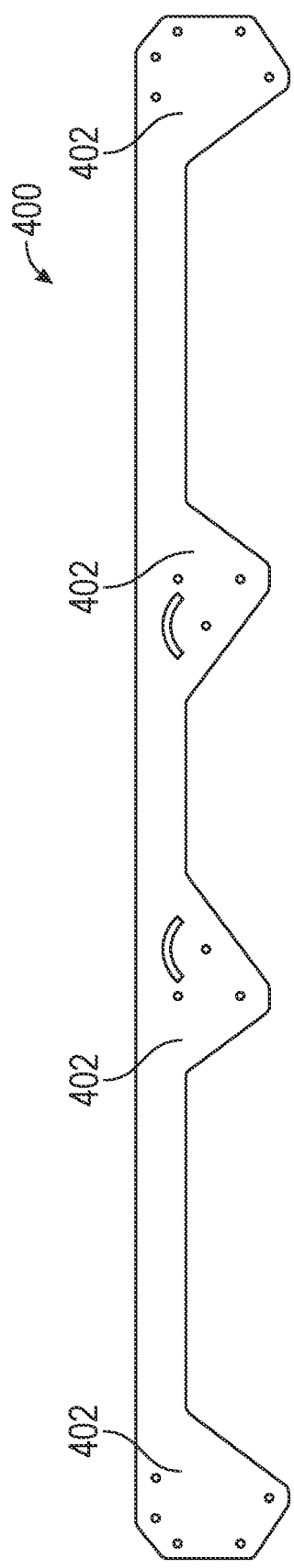
FIG. 39B shows an elevation view of the front roof brace of FIG. 39A.

FIGS. 39A and 39B show a first/front roof brace 400. The first/front roof brace 400 of FIGS. 39A and 39B has four attachment portions 402. According to some embodiments, the first/front roof brace 400 can have any number of attachment portions 402 ranging from zero to N where N is any number greater than zero. Each attachment portion 402 can include zero or more apertures wherein the apertures help facilitate attachment of the first/front roof brace 400 to a mount, to a roof panel, and/or to an attachment mechanism. The first/front roof brace 400 can be used with a variety of embodiments of roof panels described herein including, but not limited to, the panel 101 and the front panel 201.

Figure 40A:
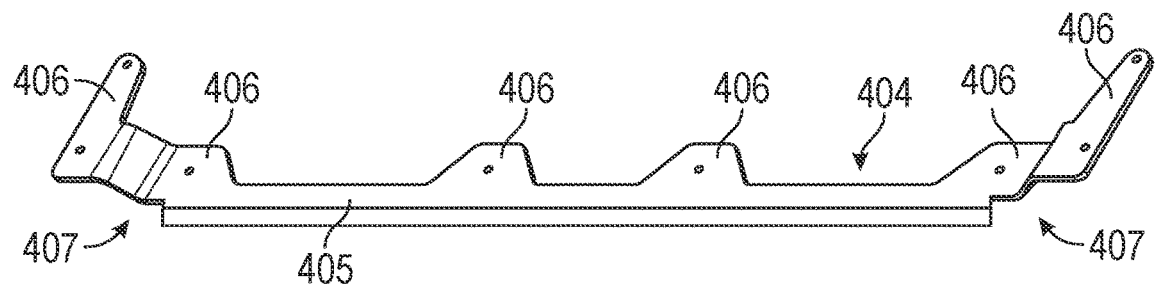
FIG. 40A shows a perspective view of a rear roof brace according to some aspects.
Figure 40B:
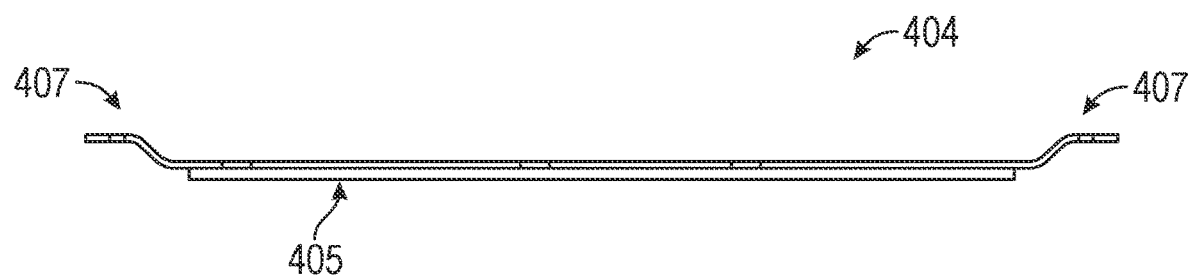
FIG. 40B shows a side elevation view of the rear roof brace of FIG. 40A.
Figure 40C:
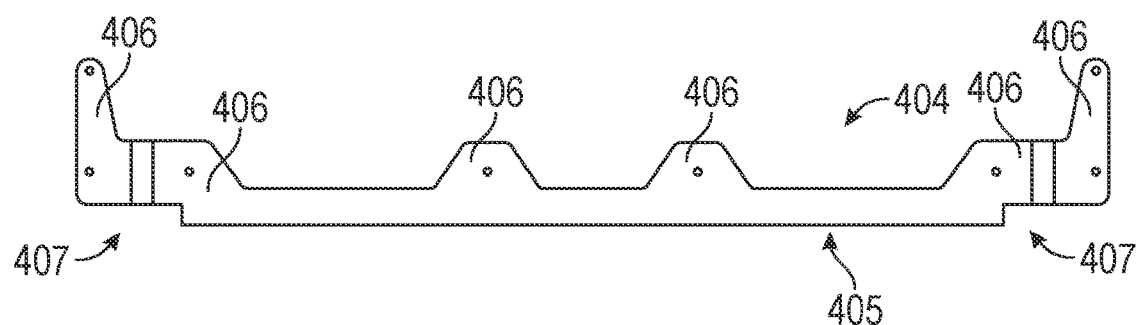
FIG. 40C shows a top elevation view of the rear roof brace of FIGS. 40A and 40B.
Figure 41A:
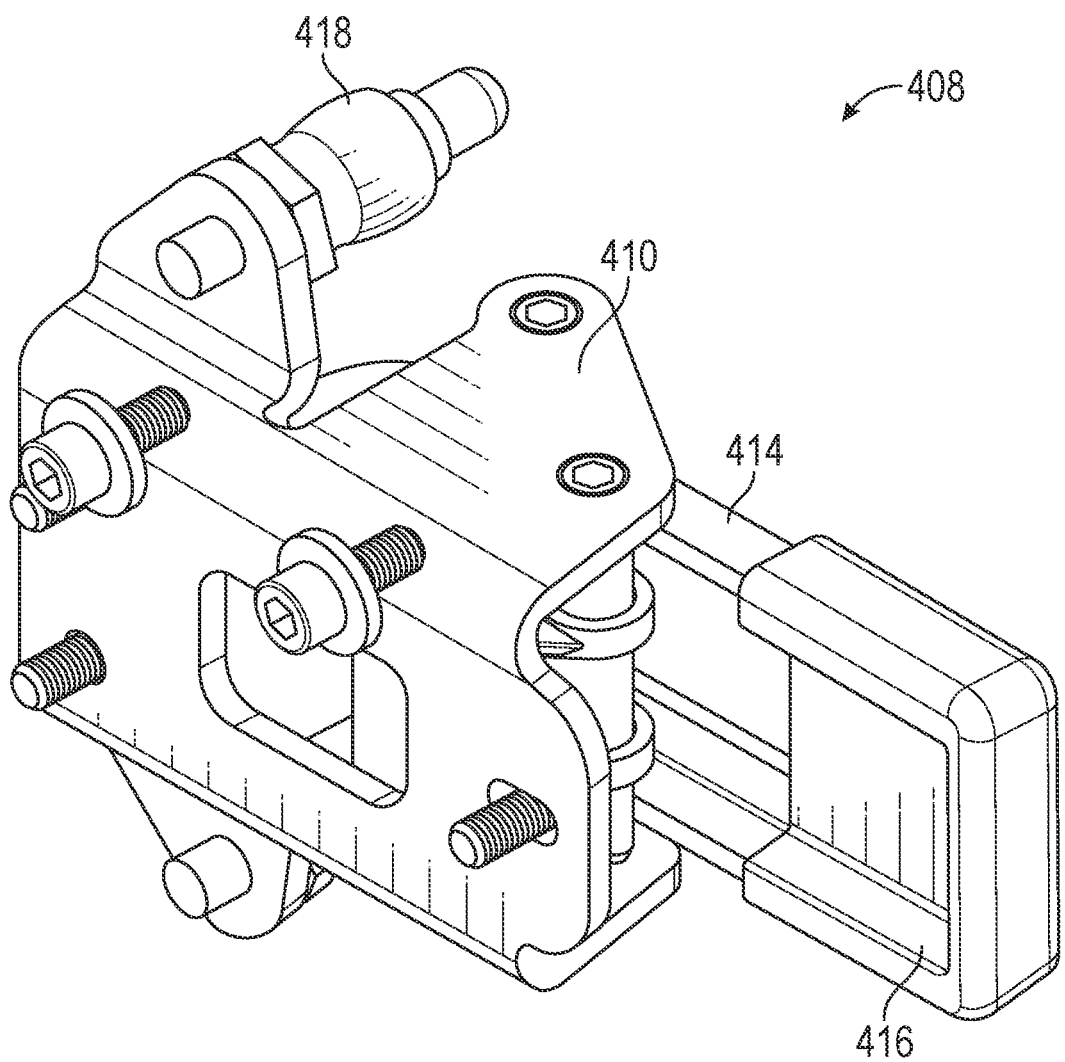
FIG. 41A shows a perspective view of a folding clamp according to some aspects.
Figure 41B:
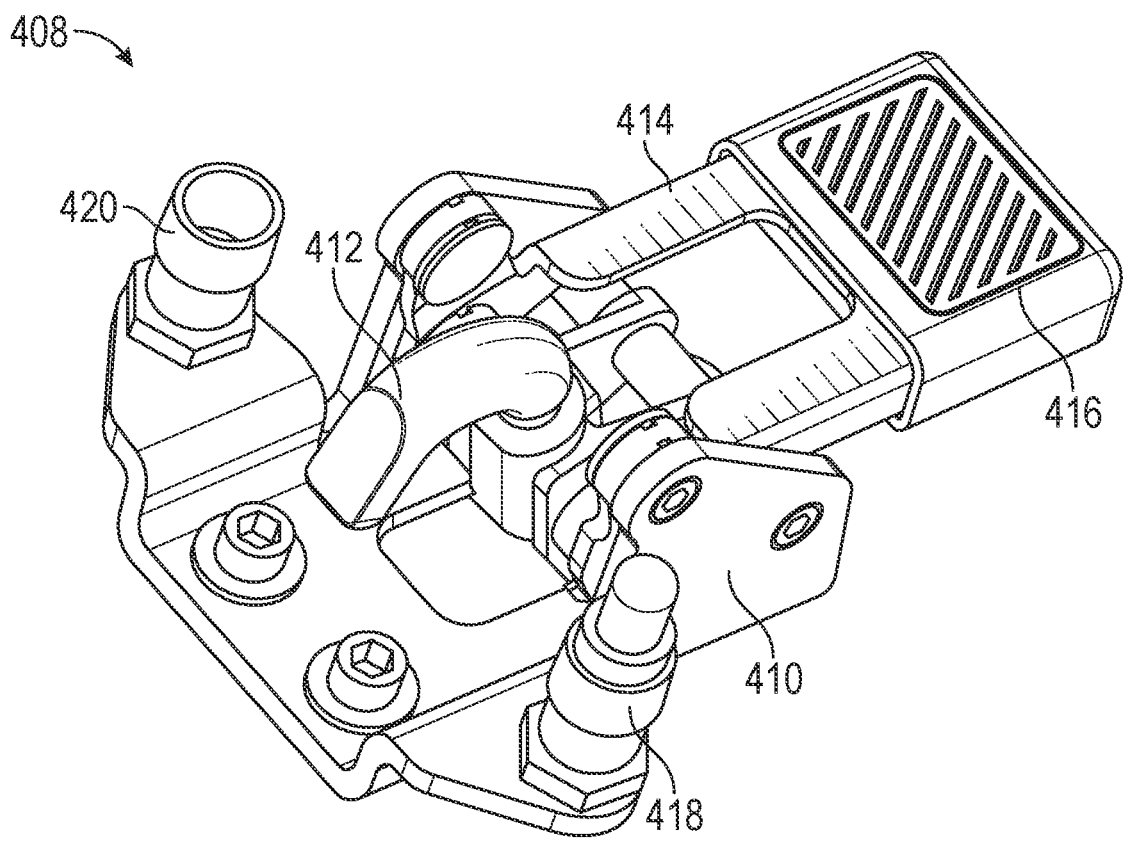
FIG. 41B shows another perspective view of the folding clamp of FIG. 41A.
Figure 41C:
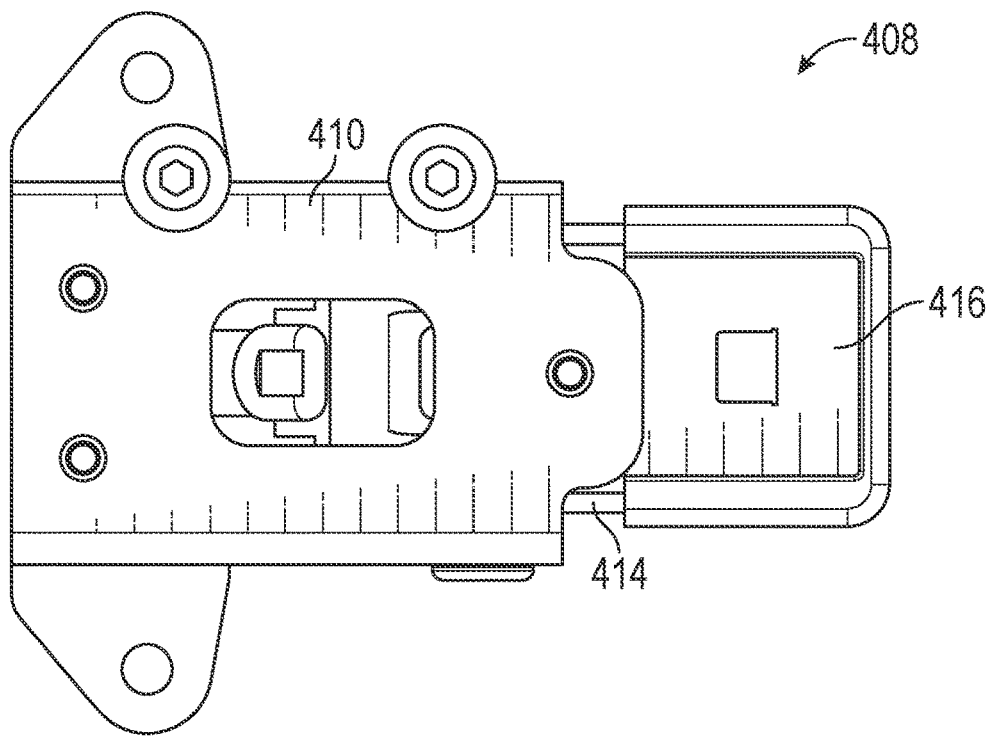
FIG. 41C shows an elevation view of the folding clamp of FIGS. 41A and 41B.
Figure 41D:
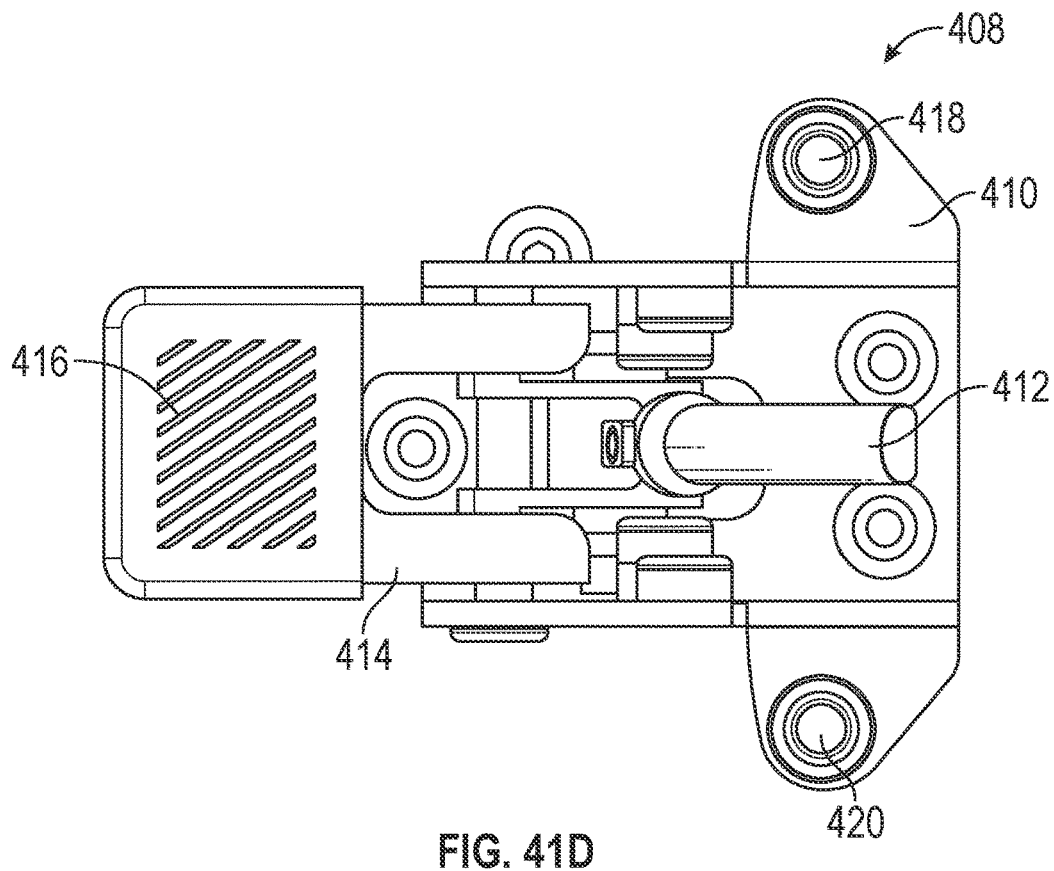
FIG. 41D shows another elevation view of the folding clamp of FIGS. 41A-41C.
Figure 41E:
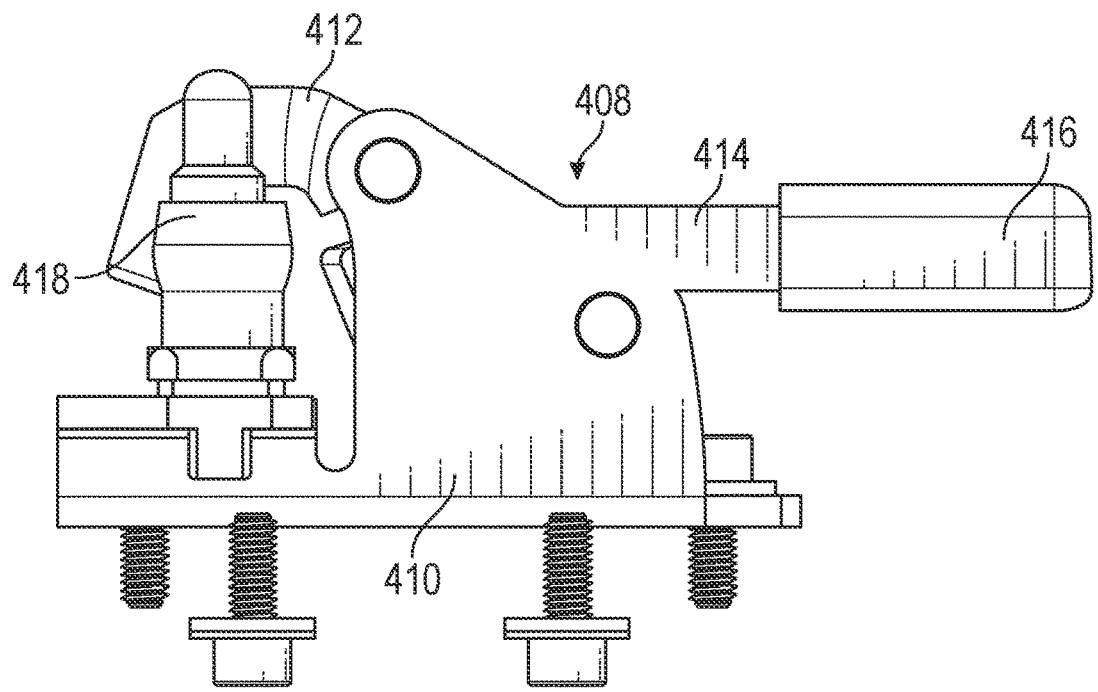
FIG. 41E shows a side elevation view of the folding clamp of FIGS. 41A-41D.
Figure 42A:
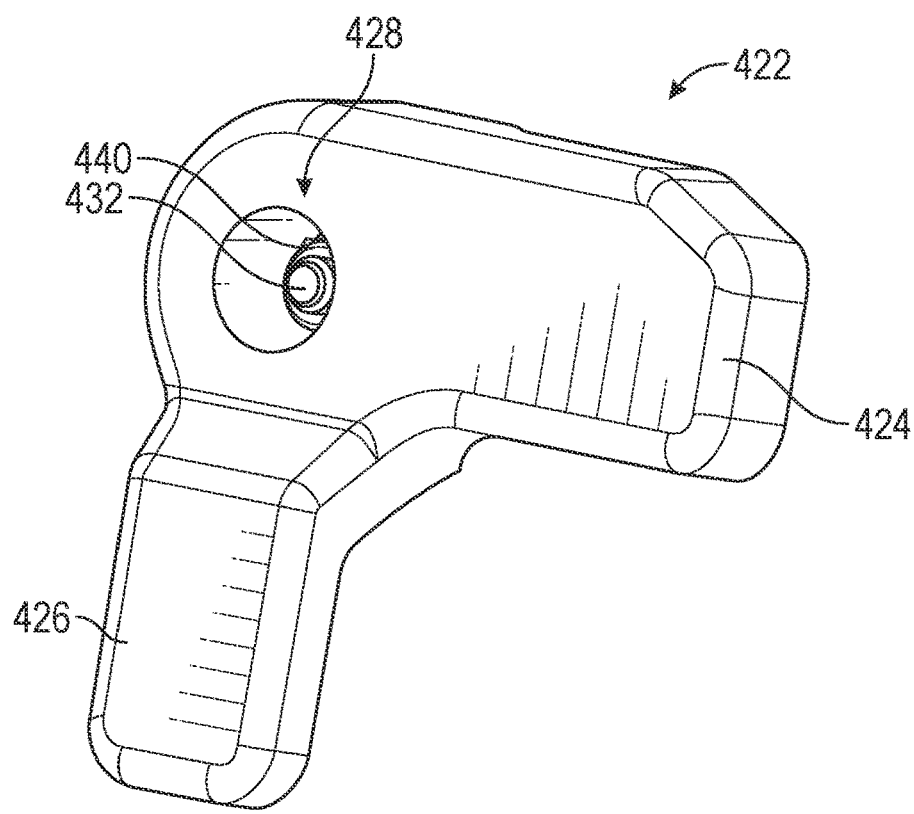
FIG. 42A shows a perspective view of a turn latch according to some aspects.
Figure 42B:
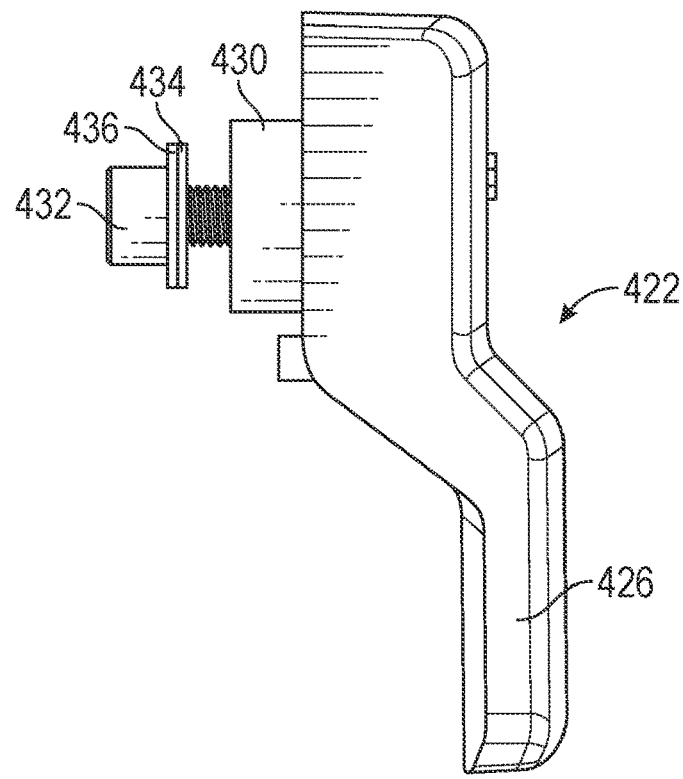
FIG. 42B shows a side elevation view of the turn latch of FIG. 42A.
Figure 42C:
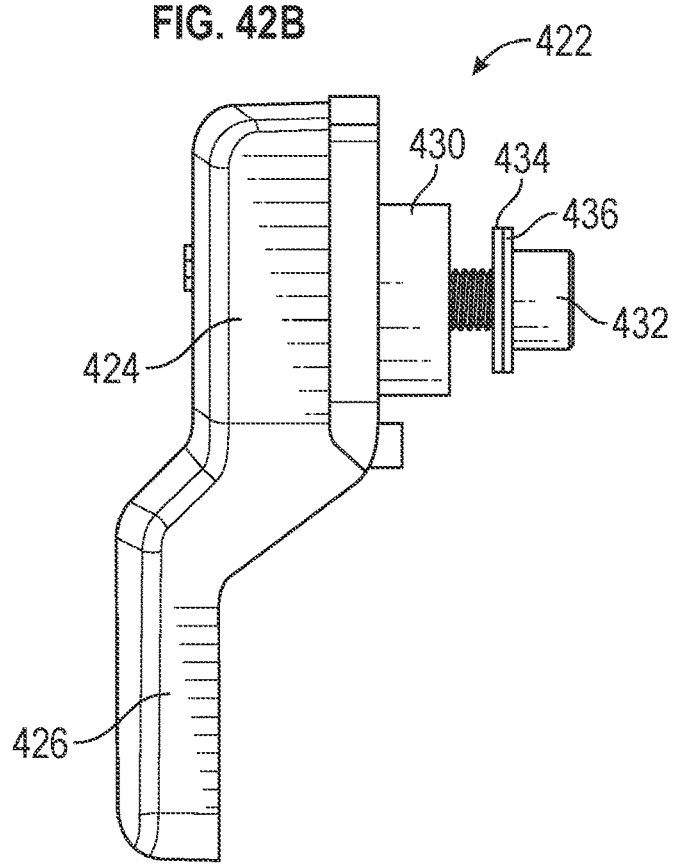
FIG. 42C shows another side elevation view of the turn latch of FIGS. 42A and 42B.
Figure 42D:
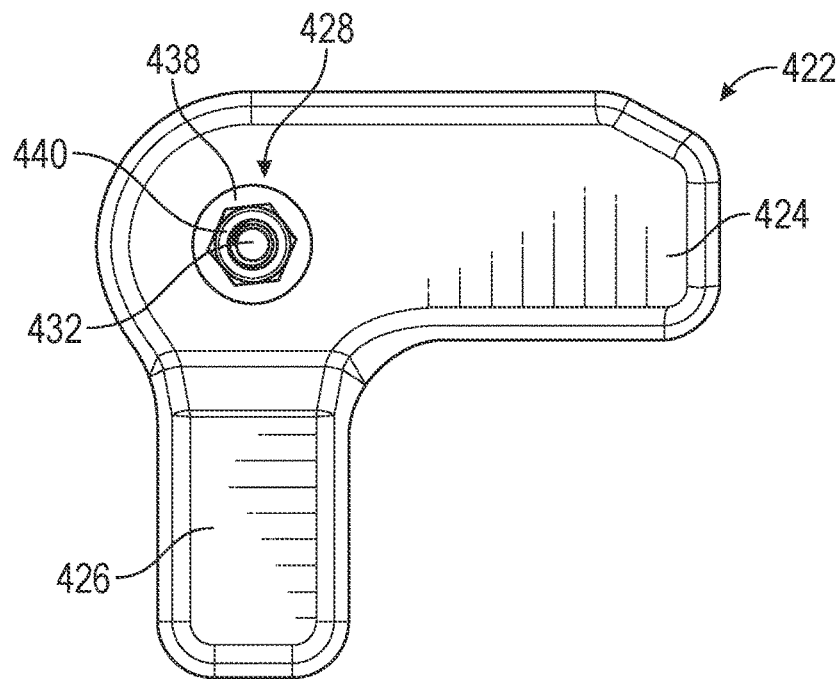
FIG. 42D shows a front elevation view of the turn latch of FIGS. 42A-42C.
Figure 42E:
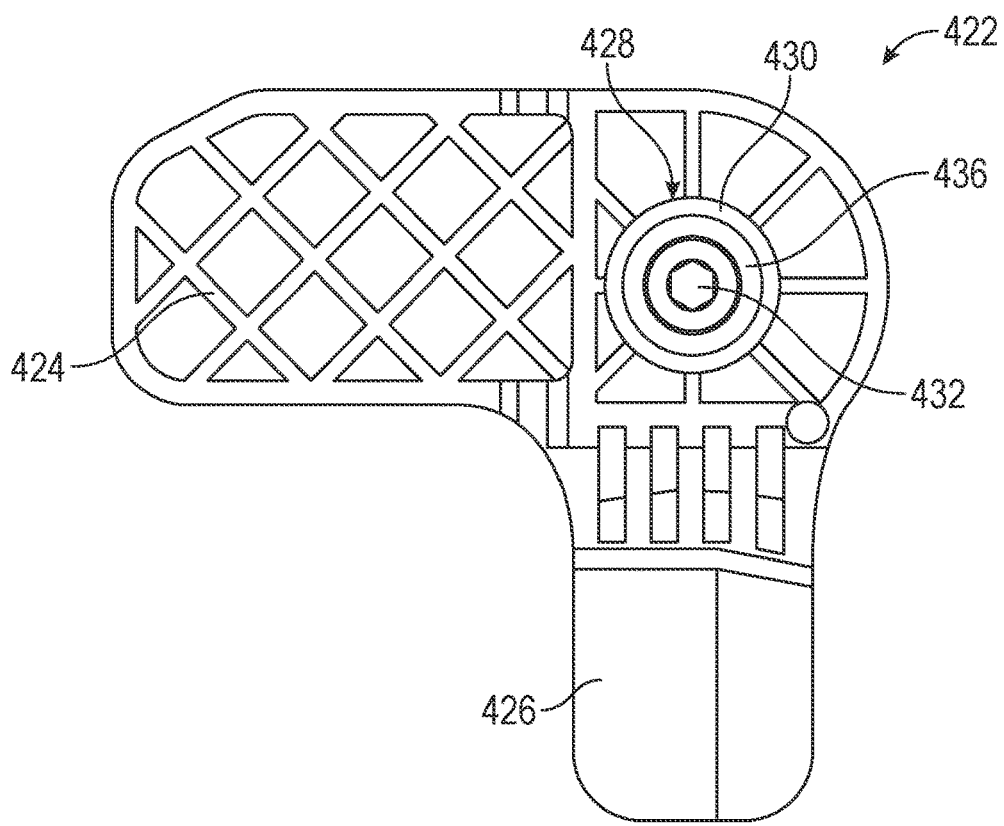
FIG. 42E shows a rear elevation view of the turn latch of FIGS. 42A-42D.

FIGS. 40A-40C show a second/rear roof brace 404. According to some embodiments, the second/rear roof brace 404 can comprise a middle portion 406, two ends 407, and a plurality of attachment portions 406. The second/rear roof brace 404 of FIGS. 40A-40C has six attachment portions 406. According to some embodiments, the second/rear roof brace 404 can have any number of attachment portions 406 ranging from zero to N where N is any number greater than zero. Each attachment portion 406 can include zero or more apertures wherein the apertures help facilitate attachment of the second/rear roof brace 404 to a mount, to a roof panel, and/or to an attachment mechanism. As can be seen in at least FIGS. 40A and 40B, each end 407 of the second/rear roof brace 404 can be offset from the middle portion 405 of the second/rear roof brace 404 such that the second/rear roof brace 404 is not flat. This offset nature of the ends 407 of the second/rear roof brace 404 can be seen in at least FIG. 40B. The second/rear roof brace 404 can be used with a variety of embodiments of roof panels described herein including, but not limited to, the rear panel 218.

FIGS. 41A-41E show an example of an attachment mechanism 700 in the form of a folding clamp 408. The folding clamp 408 of FIGS. 41A-E comprises a base plate 410, a hook 412, a handle 414, a handle cover 416, a pin 418, and a bumper 420. As shown in FIGS. 41A-E, the folding clamp 408 can also include several screws, nuts, bolts, and/or other attachment means to hold components of the folding clamp 408 together. The folding clamp 408 is configured to secure and/or hold in place a roof panel such as any of the panels 101, 201, 218, 301, 501 (described below), and/or 601 (described below) when the roof panel is attached to a vehicle. The various components of the folding clamp 408 can work together to secure a roof panel to a vehicle and/or to release a roof panel from a vehicle. For example, when a roof panel is properly positioned on a vehicle, a user can close the handle 414 to secure the roof panel to the vehicle. A user can then open the handle 414 to unsecure a roof panel from a vehicle wherein the roof panel can subsequently be removed from the vehicle. Opening and/or closing the handle 414 can manipulate the hook 412. Thus, when the handle 414 is closed, the hook 412 is manipulated such that it secures a roof panel to a vehicle. When the handle 414 is opened, the hook 412 is manipulated such that it releases a roof panel from a vehicle. The handle cover 416 covers at least a portion of the handle 414 and is configured to improve a user's grip on the handle 414.

FIGS. 42A-42E show an example of an attachment mechanism 700 in the form of a turn latch 422. The turn latch 422 of FIGS. 42A-E comprises a first protrusion 424, a second protrusion 426, an aperture 428, a spacer 430, a screw 432, a first washer 434, a second washer 436, a third washer 438, and a locknut 440. The screw 432 could be a socket head screw and/or any other suitable type of screw. The screw 432 can be inserted into the aperture 428 of the turn latch 422 and secured on one side by the first and second washers 434 and 436 and on the other side by the third washer 438 and the locknut 440. The spacer 430 can surround the screw 432 and be located between the first and second washers 434 and 436 and the aperture 428 of the turn latch 422. A user can turn the turn latch 422 by manipulating and/or turning either of the first or second protrusions 424/426 of the turn latch 422. The turn latch is configured to secure and release a roof panel from a vehicle such as any of the panels 101, 201, 218, 301, 501 (described below), and/or 601 (described below). For example, when a roof panel is properly placed on a vehicle, a user can turn the turn latch 422 one direction in order to secure the roof panel to the vehicle and can turn the turn latch 422 in the opposite direction in order to release the roof panel from the vehicle so that the roof panel can be removed and/or otherwise moved.

Figure 43:
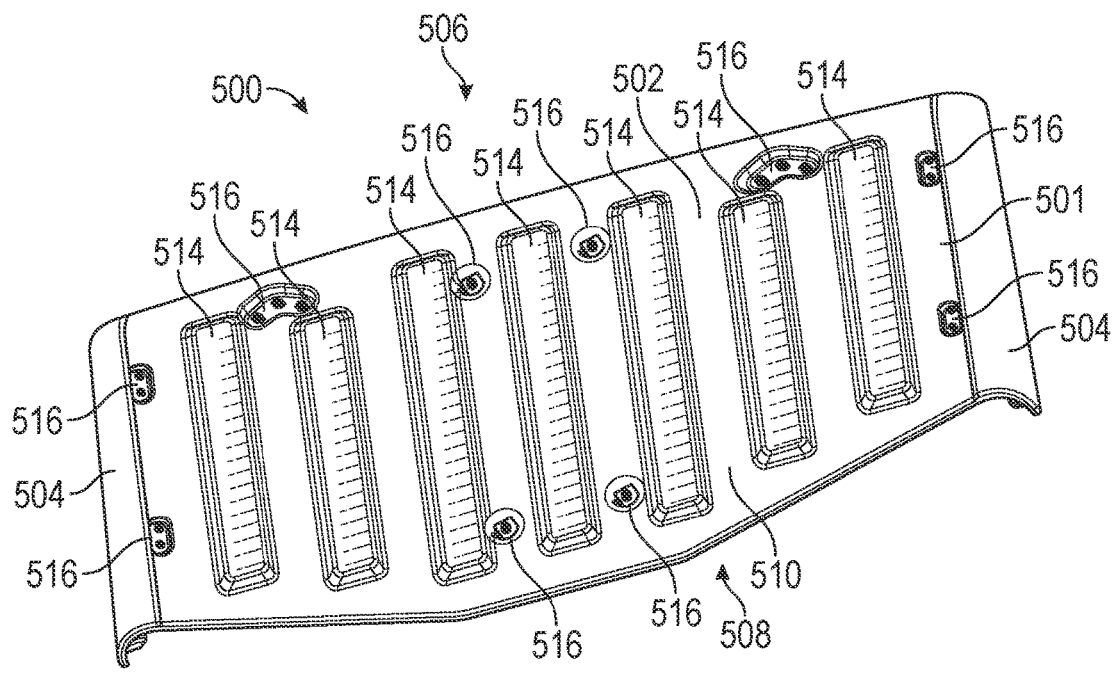
FIG. 43 shows a top perspective view of a vehicle roof assembly according to some aspects.

FIGS. 43-58B show another embodiment of a vehicle roof assembly 500, that includes a roof panel 501, and installation thereof. The roof assembly 500 can be an original equipment manufacturer (OEM) direct replacement part. According to some embodiments, the panel 501 can have the same characteristics and/or qualities as the panel 101, the front panel 201, the rear panel 218, and/or the panel 301. Additionally, some or all of the description included above regarding the panel 101, the front panel 201, the rear panel 218, and/or the panel 301 can apply to the panel 50, depending on the embodiment. FIG. 43 shows a top perspective view of the panel 501 that includes a generally flat middle portion 502 and two curved outer portions 504 on each side of the panel 501. While only two sides of the panel 501 of the embodiment of FIGS. 43-58B are curved, any number of sides and/or any portion of the panel 501 could be curved according to some embodiments. As seen in FIG. 43, the panel 501 also includes a front 506, a rear 508, and a top 510.

According to some embodiments, the panel 501 can be generally hard such that it is generally rigid and generally keeps its shape. The panel 501 can also be transparent such that the panel 501 has certain characteristics of a window in that a person can see through it. The panel 501 can include a tint according to some embodiments. For example, the embodiment of FIGS. 43-58B includes a panel 501 having a polycarbonate dark gray tint. While the panel 501 of the embodiment of FIGS. 43-58B includes a polycarbonate dark gray tint, the tint could be of any material and/or color. The panel 501 provides for vibrant and high-quality views when a person looks through the panel 501. The panel 501 also provides complete (100%) ultra-violet (UV) protection for occupants of the vehicle to which the panel 501 is attached. The panel 501 also blocks up to 82% of visible light transmission (VTL). While the panel 501 can block up to 82% of VTL, the panel 501 could block any other percentage lower than 82% according to some embodiments. The panel 501 also reduces heat from the sun by an average of 65% versus un-tinted tops or topless configurations according to some embodiments. According to some embodiments, the panel 501 is configured to block up to 46% of infrared radiation/light. While the panel 501 can block up to 46% of infrared radiation/light, the panel 501 could block any other percentage lower than 46% according to some embodiments. The panel 501 is also configured to be scratch-resistant. The panel 501 is also configured to have a fade-resistant finish.

Figure 44:
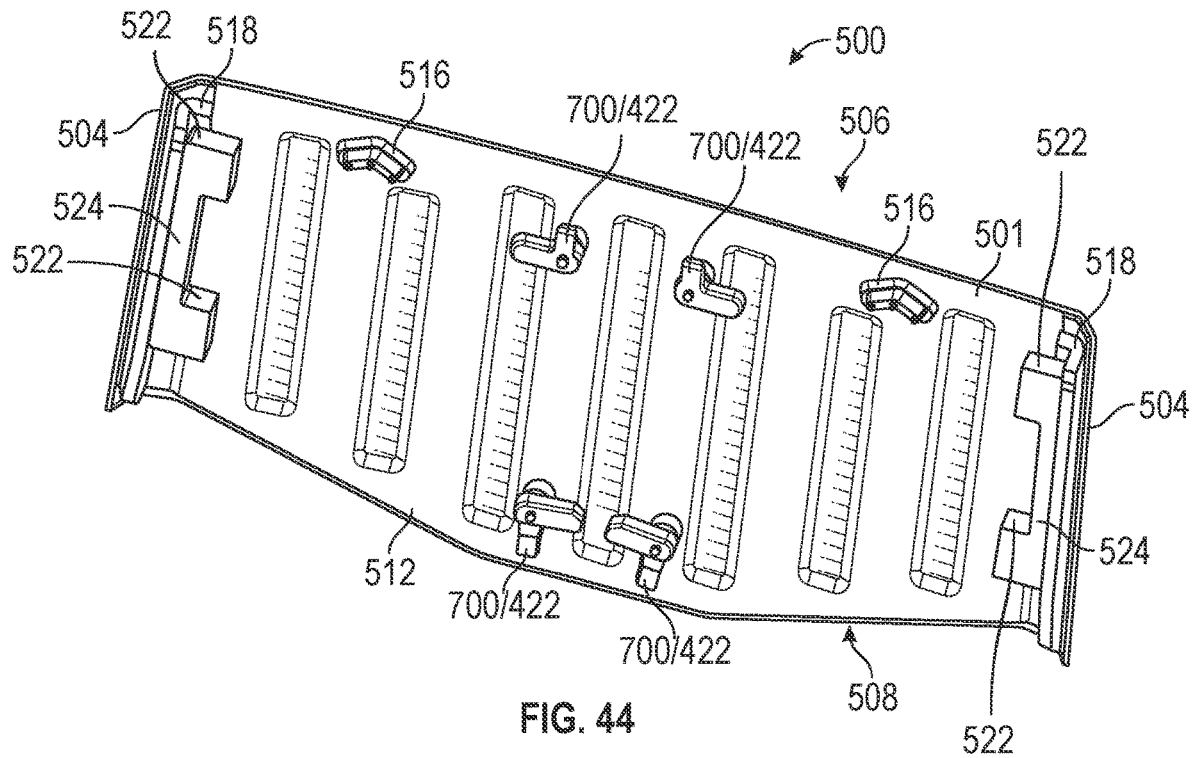
FIG. 44 shows a bottom perspective view of the vehicle roof assembly of FIG. 43.
Figure 45:
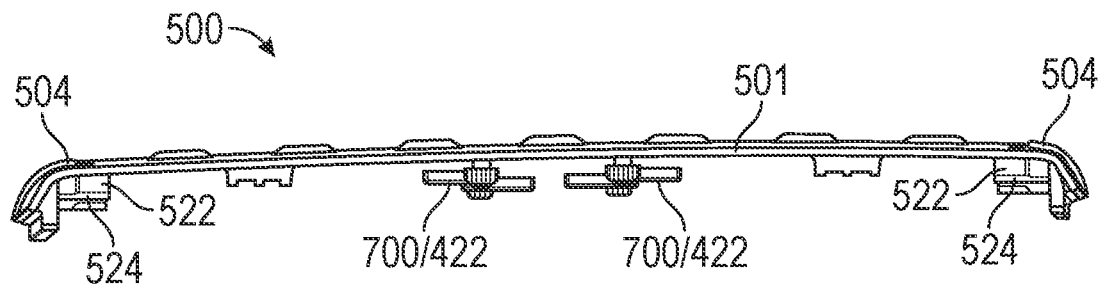
FIG. 45 shows a front elevation view of the vehicle roof assembly of FIGS. 43 and 44.
Figure 46:
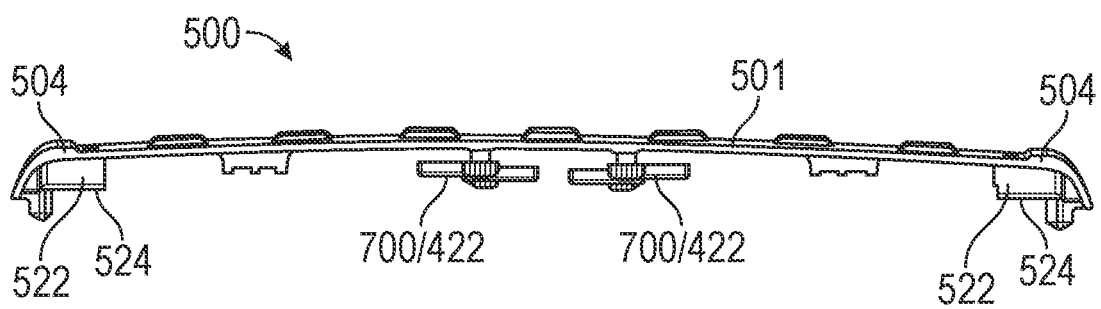
FIG. 46 shows a rear elevation view of the vehicle roof assembly of FIGS. 43-45.

As seen in at least FIG. 44, the bottom 512 of the panel 501 can comprise zero or more attachment mechanisms 700. While the embodiment of FIGS. 43-58B includes four attachment mechanisms 700 located on the bottom 512 of the front panel 501, according to some embodiments, the number and arrangement of the attachment mechanisms 700 can vary. For example, the number of attachment mechanisms 700 can range from zero to N where N is any number greater than zero. Additionally, any arrangement and/or formation of the attachment mechanisms 700 can be used including arranging the attachment mechanisms 700 in lines, in circular formation, in random formation, and/or in any other suitable formation. Additionally, while each of the attachment mechanisms 700 in the embodiment of FIGS. 43-58B are turn latches 422, any of the attachment mechanisms 700 could be turn latches 422, folding clamps 408, and/or any other type of attachment mechanism including, but not limited to, any kind of clamp, latch, cinch, bracket, grip, lock, hold, connector, screw, nut and bolt, and the like. Additionally, according to some embodiments, zero or more roof braces 400/404 could be mounted to the bottom 512 of the panel 501. According to some embodiments, any suitable number of attachment mechanisms 700 could be mounted to the roof braces 400/404. According to some embodiments, a folding clamp 408 can be mounted on each of the two naked mounts 516 shown in FIG. 44 on the bottom 512 of the panel 501. In such embodiments, the panel 501 comprises four turn latches 422 and two folding clamps 408 in addition to the seal(s) 518 and/or nut plate(s) 524.

As seen in at least FIG. 44, the panel 501 includes a plurality of mounts 516. Each mount 516 can comprise an indentation in the top 510 of the panel 501 and a protrusion on the bottom 512 of the panel 501. Each mount 516 can serve to facilitate attachment of a component to be mounted on the bottom 512 of the panel 501. For example, in the embodiment of FIGS. 43-58B the four turn latches 422 are mounted directly to the mounts 516. Two additional naked mounts 516 are shown on the bottom 512 of the panel 501 wherein nothing is mounted to them. Any attachment mechanism 700 could be mounted to these mounts 516 according to some embodiments. Additionally, as seen in FIG. 43, each side of the panel 501 includes two mounts 516 near each curved outer portion 504. These four side mounts 516 are used to mount the seals 518 (which include attachment portions 522) and/or nut plates 524 to the bottom 512 of the panel 501, and/or these side mounts 516 are used to facilitate attachment of the panel 501 to a vehicle via the seal(s) 518 and/or nut plate(s) 524. At least some of the seal(s) 518, attachment portion(s) 522, and/or nut plate(s) 524 can be seen in at least FIGS. 44, 45, and/or 46. According to some embodiments, any number and combination of attachment mechanisms 700 and/or roof braces 400/404 could be attached to the mounts 516 of the panel 501. Additionally, any suitable number of attachment mechanisms 700 could be mounted on a roof brace 400/404.

As seen in at least FIG. 43, the panel 501 includes a plurality of projections 514. While the panel 501 of the embodiment of FIGS. 43-58B includes seven projections 514 of varying size and located on the generally flat middle portion 502 of the panel 501, according to some embodiments the panel 501 can include any number of projections 514 ranging from zero to N where N is any number greater than zero. The projections 514 can also be of any suitable size and/or arranged in any suitable formation. The projections 514 serve to make the assembly 500 more aerodynamic when attached to a vehicle.

Figure 47:
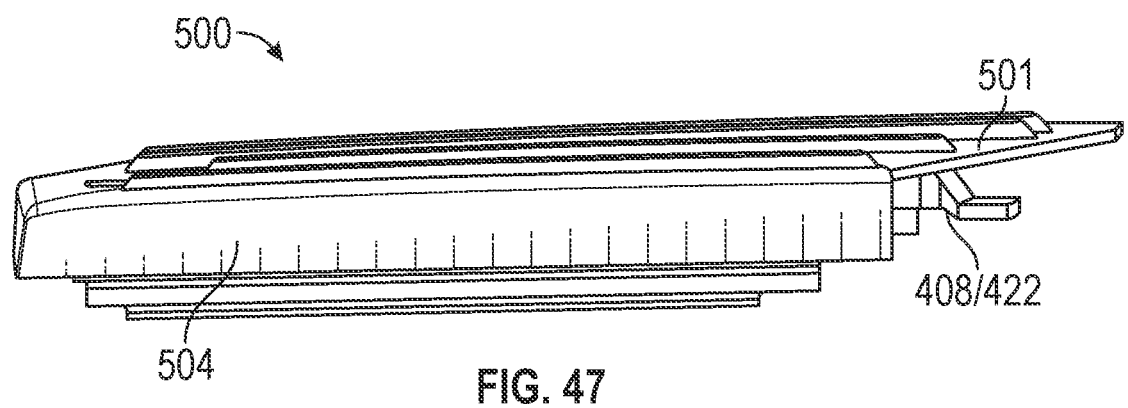
FIG. 47 shows a side elevation view of the vehicle roof assembly of FIGS. 43-46.

FIG. 47 shows a side view of the panel 501 wherein one of the curved outer portions 504 is visible. The curved outer portions 504 serve to emulate the curvature and/or shape of the vehicle to which the assembly 500 will be attached. Thus, the panel 501, including its curved outer portions 504, provides a snug, tight, and proper fitment of the assembly 500 to a vehicle.

Figure 48:
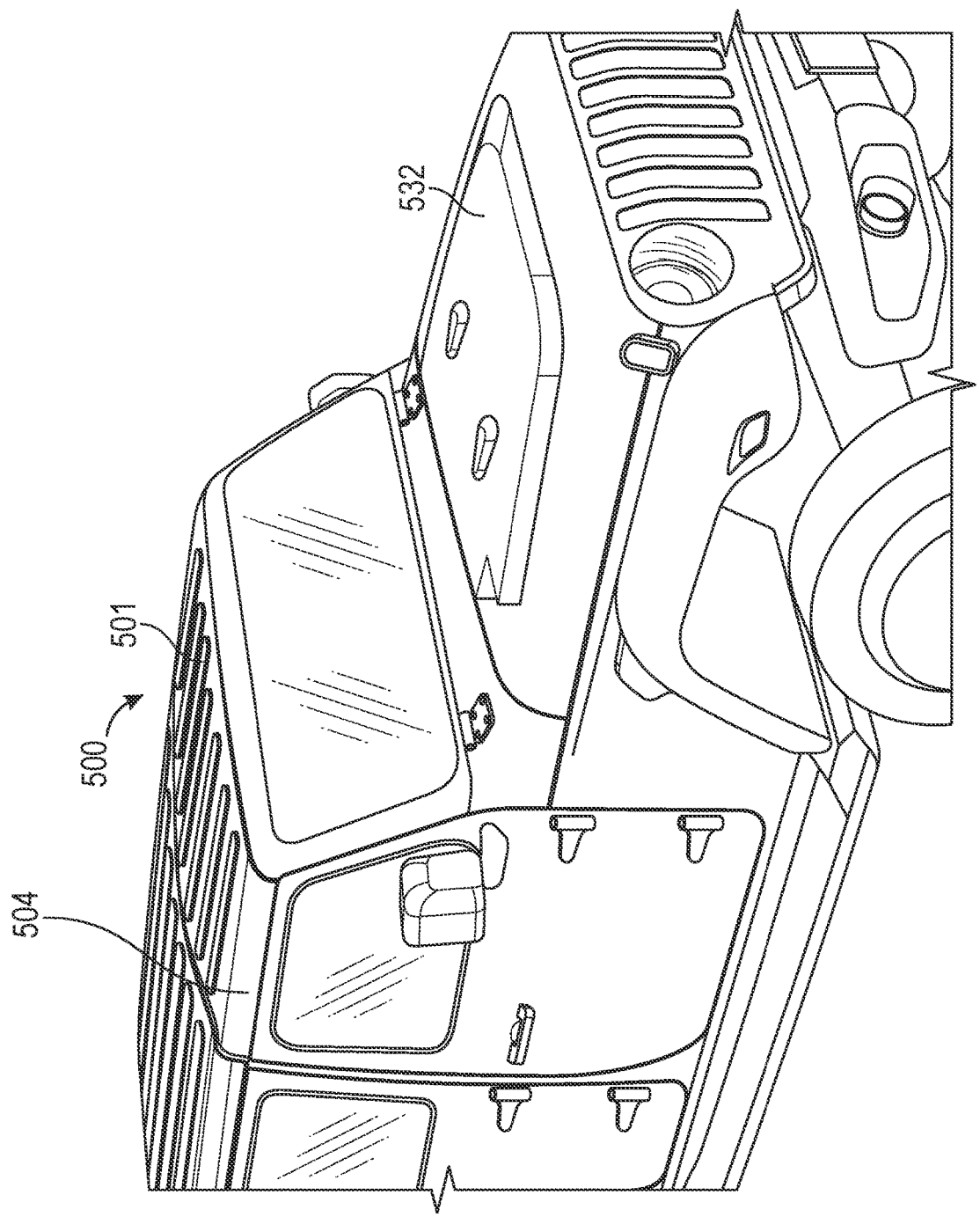
FIG. 48 shows a perspective view of a vehicle comprising the vehicle roof assembly of FIGS. 43-47.

FIG. 48 shows a perspective view of a vehicle 532 wherein the assembly 500 and/or panel 501 is attached to the vehicle 532. As shown in FIG. 48, the assembly 500 and/or panel 501 can be attached to the top of the vehicle 532 such that an occupant of the vehicle 532 can look up to see a sky view through the panel 501 and/or assembly 500.

Figure 49:
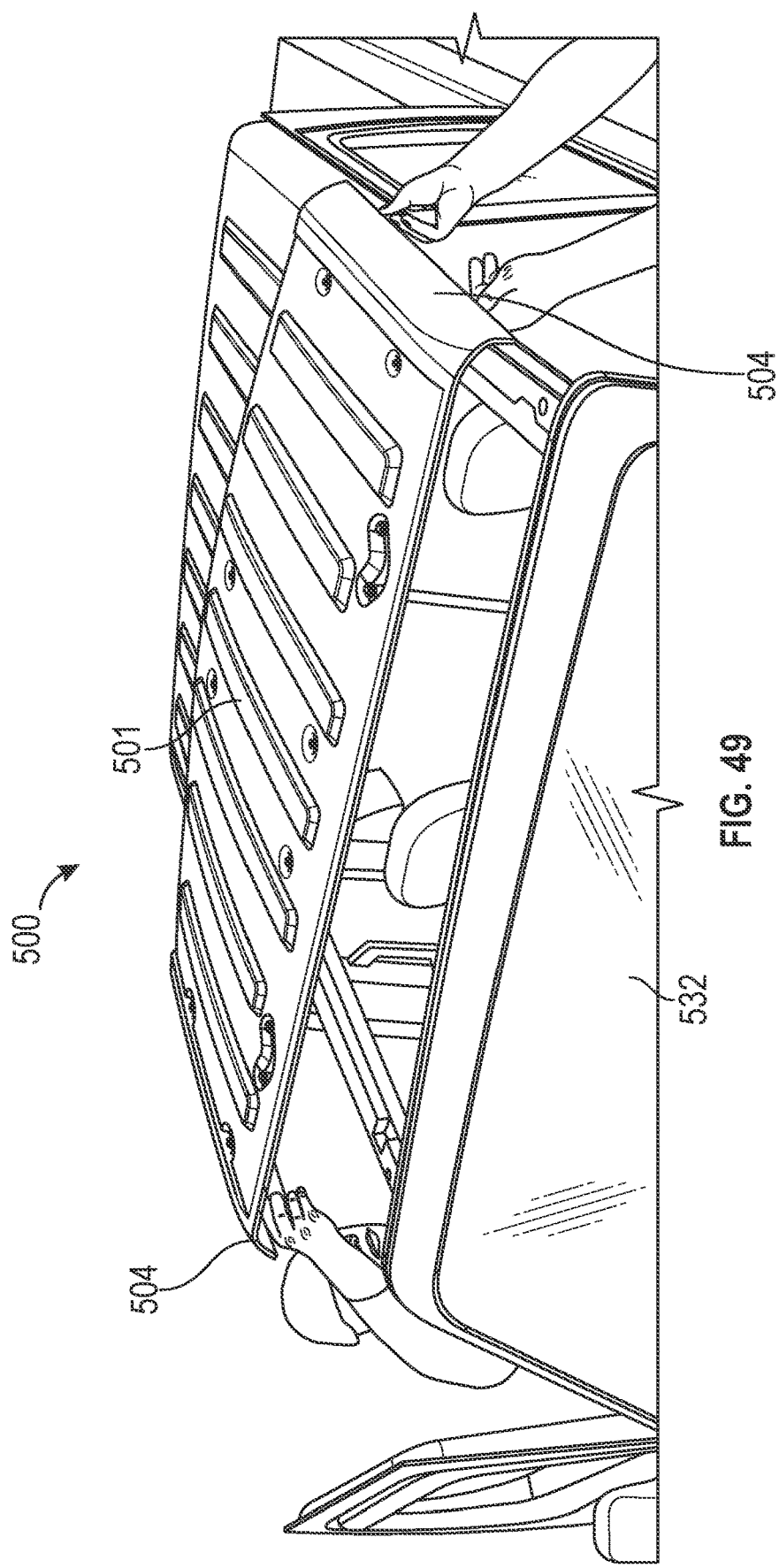
FIG. 49 shows a perspective view of the installation of a roof panel of the vehicle roof assembly of FIGS. 43-48 according to some embodiments.

FIGS. 49-53 illustrate installation of the assembly 500. As shown in FIG. 49, the panel 501 can be placed on the vehicle 532 such that each of the curved outer portions 504 of the panel 501 rest on a side, top portion of the frame of the vehicle 532.

Figure 50:
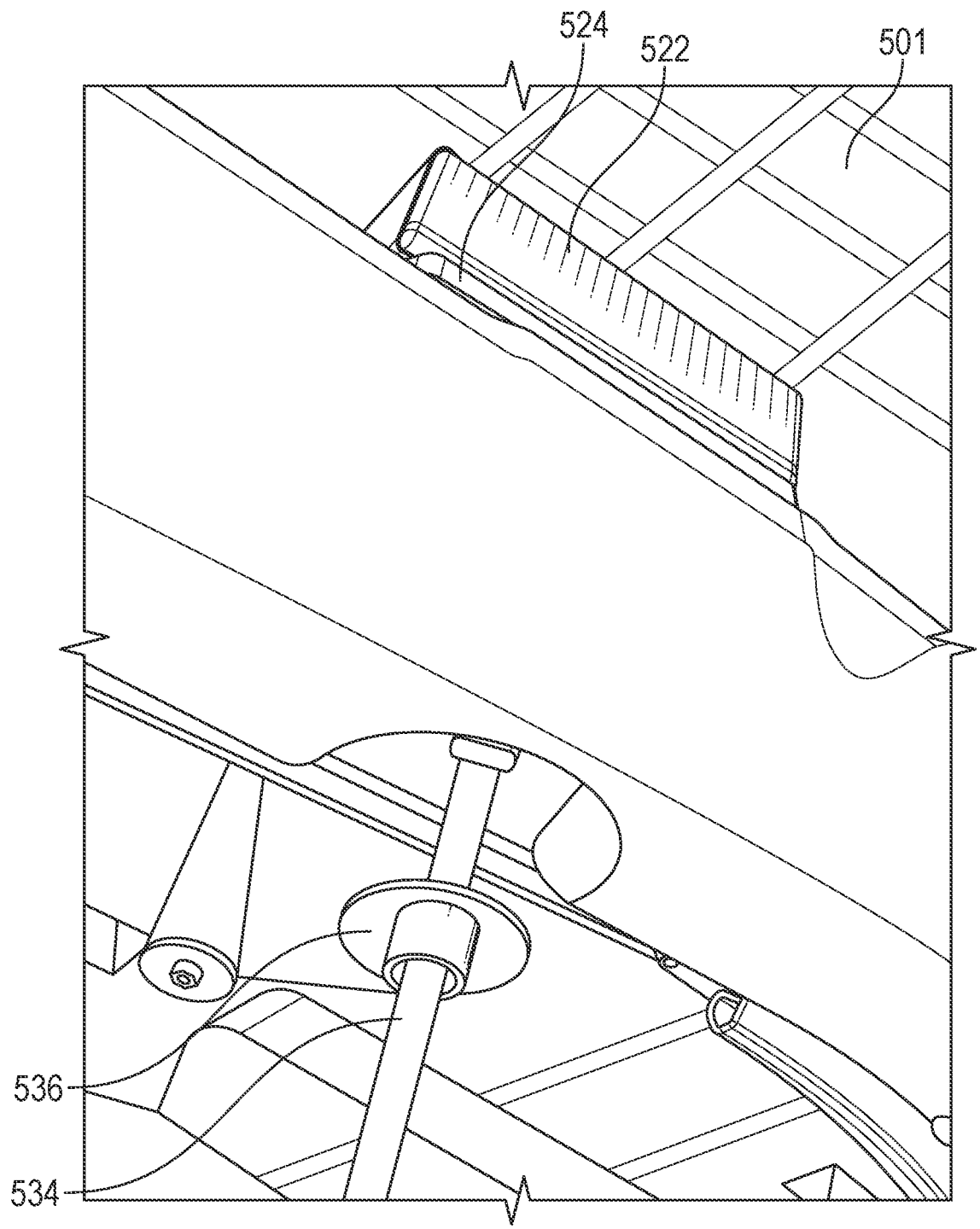
FIG. 50 shows another perspective view of the installation of the roof panel of FIG. 49 that includes the use of a bolt and washer.
Figure 51:
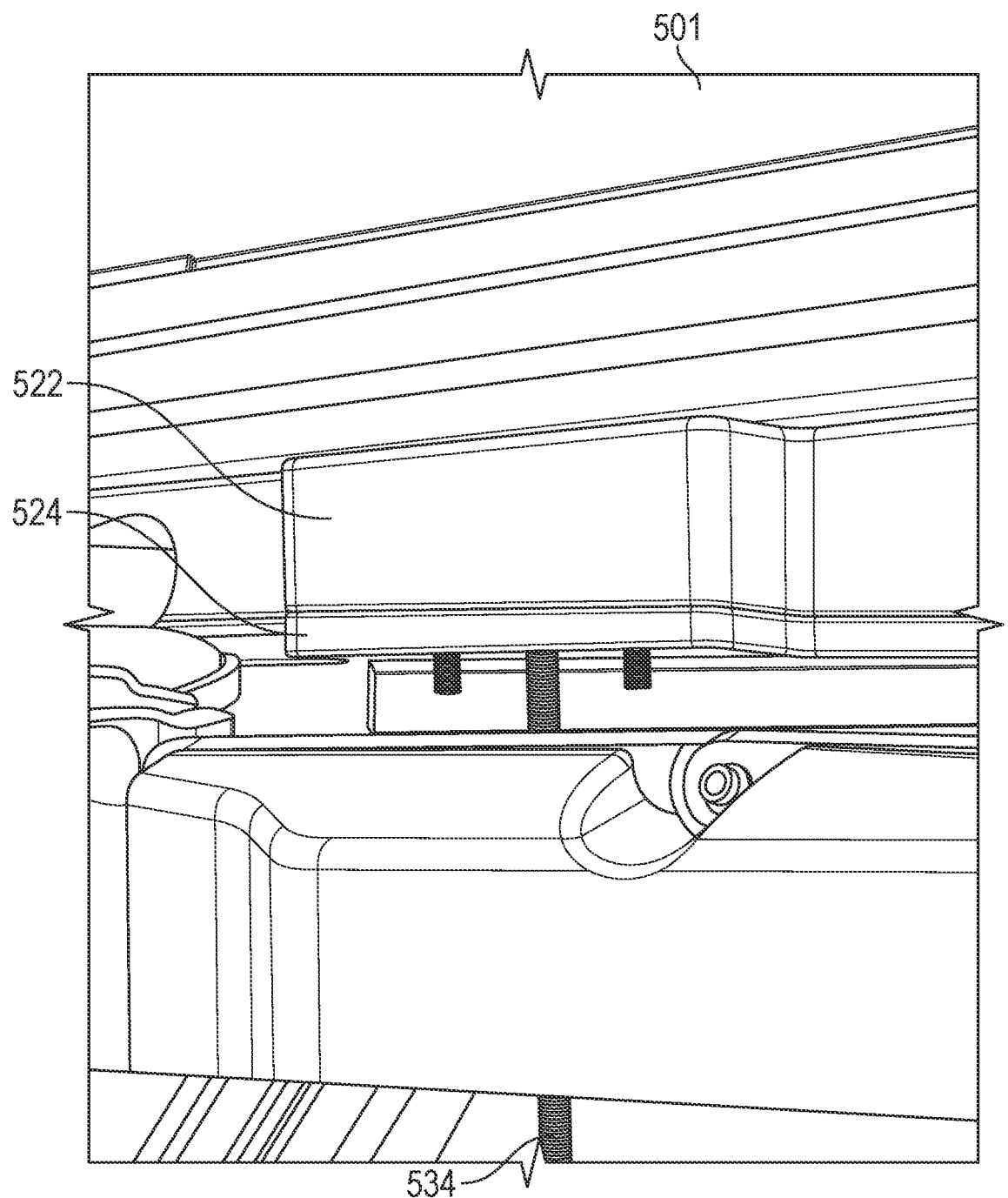
FIG. 51 shows another perspective view of the installation of the roof panel of FIGS. 49 and 50.

As shown in FIGS. 50 and 51, the assembly 500 can further comprise zero or more bolts 534 and zero or more washers 536. As shown in FIGS. 50 and 51, an aperture of an attachment portion 522 of a seal 518, an aperture of a nut plate 524, and an aperture on the frame of the vehicle 532 can be aligned, wherein a bolt 534 can be inserted through each aperture to secure the assembly 500 to the vehicle 532. A washer 536 can then be inserted onto the bolt and tightened to help secure the assembly 500 to the vehicle 532.

Figure 52:
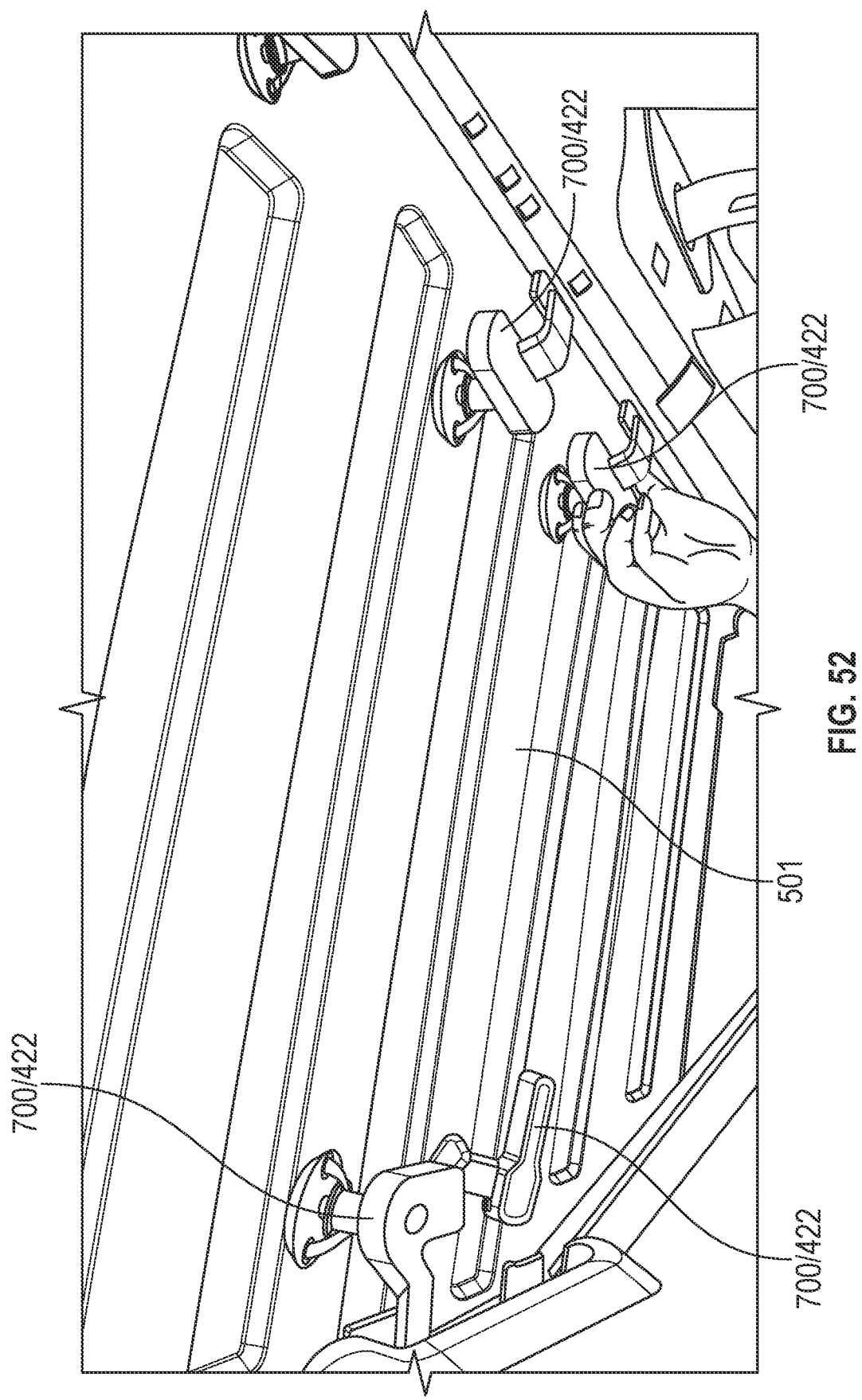
FIG. 52 shows another perspective view of the installation of the roof panel of FIGS. 49-51.

As shown in FIG. 52, the various attachment mechanisms 700 located on the panel 501 can then be clasped, closed, turned, latched, clamped, and/or otherwise manipulated to secure attachment of the panel 501 to the vehicle 532. According to embodiments that comprise the four turn latches 422 as shown in FIG. 44 as well as a folding clamp 408 on each of the two naked mounts 516 shown in FIG. 44, a user can close the two folding clamps 408, then turn/close the two front turn latches 422, and then turn/close the two rear turn latches 422. The various attachment mechanisms 700 can be closed/secured before or after the seal(s) 518 and/or nut plate(s) 524 are secured according to various embodiments.

Figure 53:
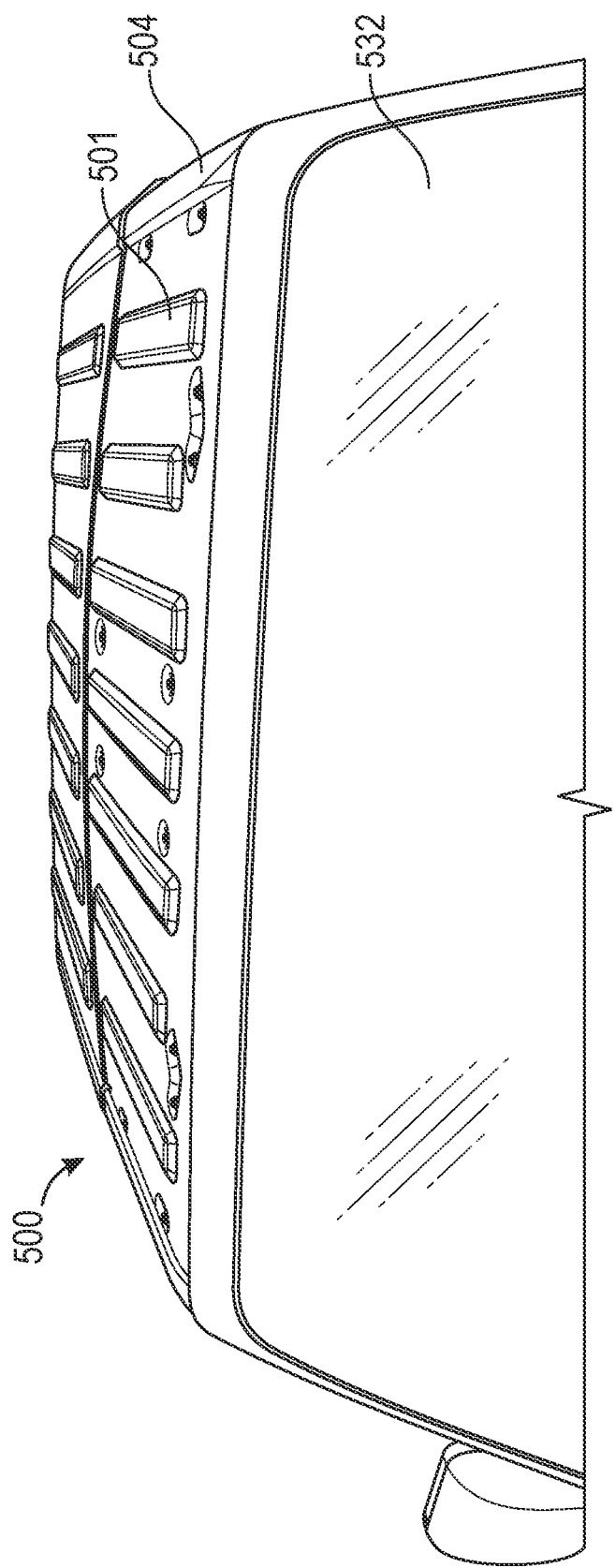
FIG. 53 shows a perspective view of the fully installed vehicle roof assembly of FIGS. 43-52.

FIG. 53 shows the fully installed panel 501/assembly 500 on the vehicle 532 wherein the panel 501/assembly 500 creates a weather-proof, aerodynamic, and structurally sound attachment with the vehicle 532. As shown in FIG. 53, the curvature of the panel 501/assembly 500 matches that of the vehicle 532 such that the vehicle retains its aerodynamic nature and retains its shape when the panel 501/assembly 500 is installed.

Figure 54:
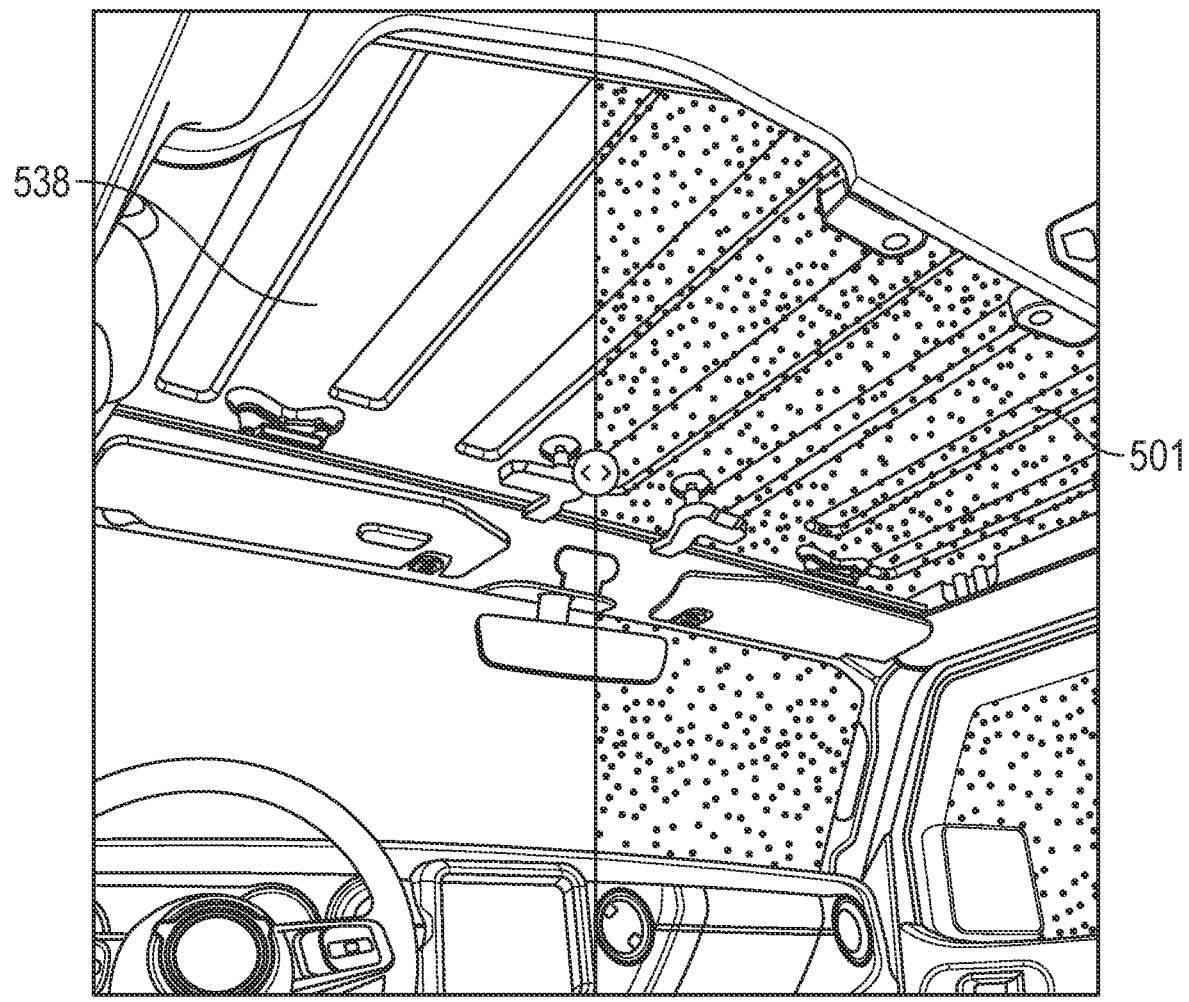
FIG. 54 shows a perspective view of the effect of the tinting of the roof panel of the roof assembly of FIGS. 43-53 versus an un-tinted roof.

FIG. 54 shows a side-by-side comparison of the panel 501 with tinting and an un-tinted panel 538. As shown in FIG. 54, the panel 501 provides complete (100%) ultra-violet (UV) protection for occupants of the vehicle to which the panel 501 is attached. The panel 501 also blocks up to 82% of visible light transmission (VTL). While the panel 501 can block up to 82% of VTL, the panel 501 could block any other percentage lower than 82% according to some embodiments. The panel 501 also reduces heat from the sun by an average of 65% versus un-tinted tops or topless configurations according to some embodiments. According to some embodiments, the panel 501 is configured to block up to 46% of infrared radiation/light. While the panel 501 can block up to 46% of infrared radiation/light, the panel 501 could block any other percentage lower than 46% according to some embodiments. The panel 501 is also configured to be scratch-resistant. The panel 501 is also configured to have a fade-resistant finish.

Figure 55:
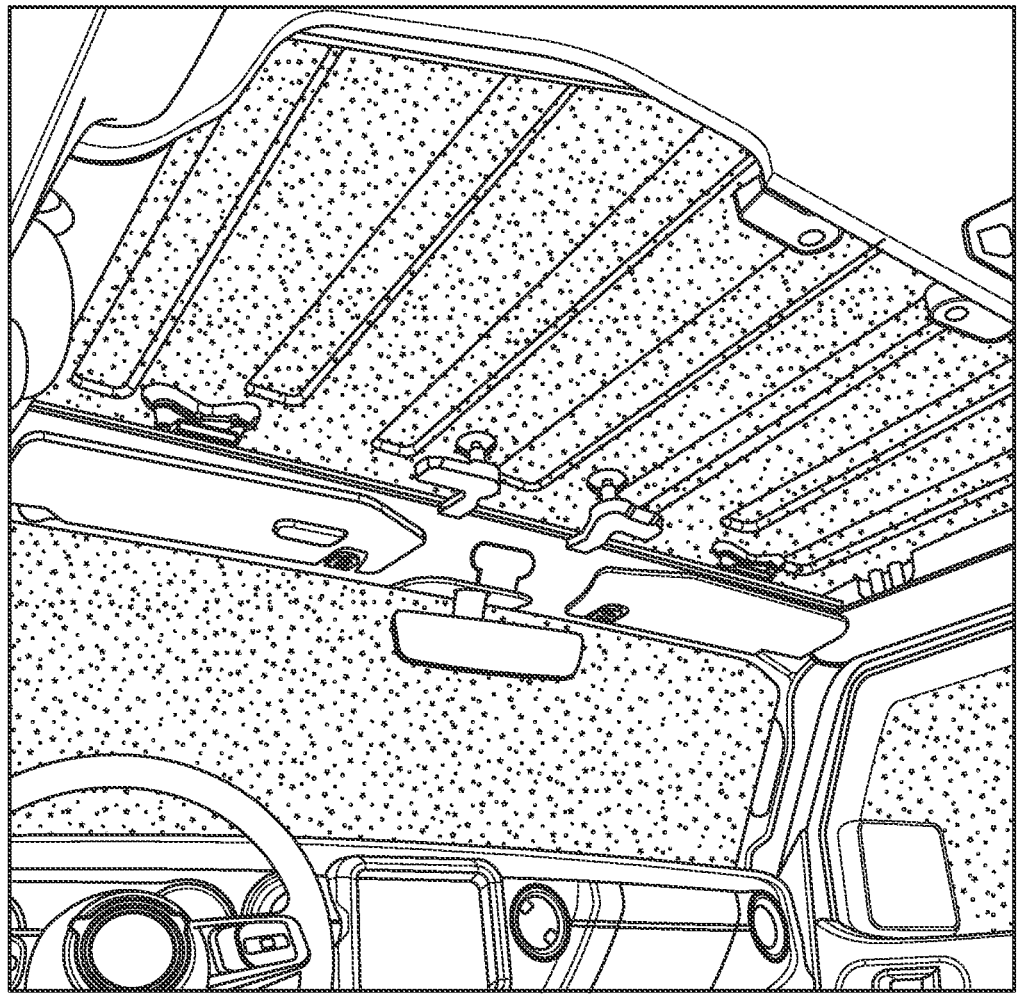
FIG. 55 shows a perspective view of the example of a nighttime view through the vehicle roof assembly of FIGS. 43-54.
Figure 56:
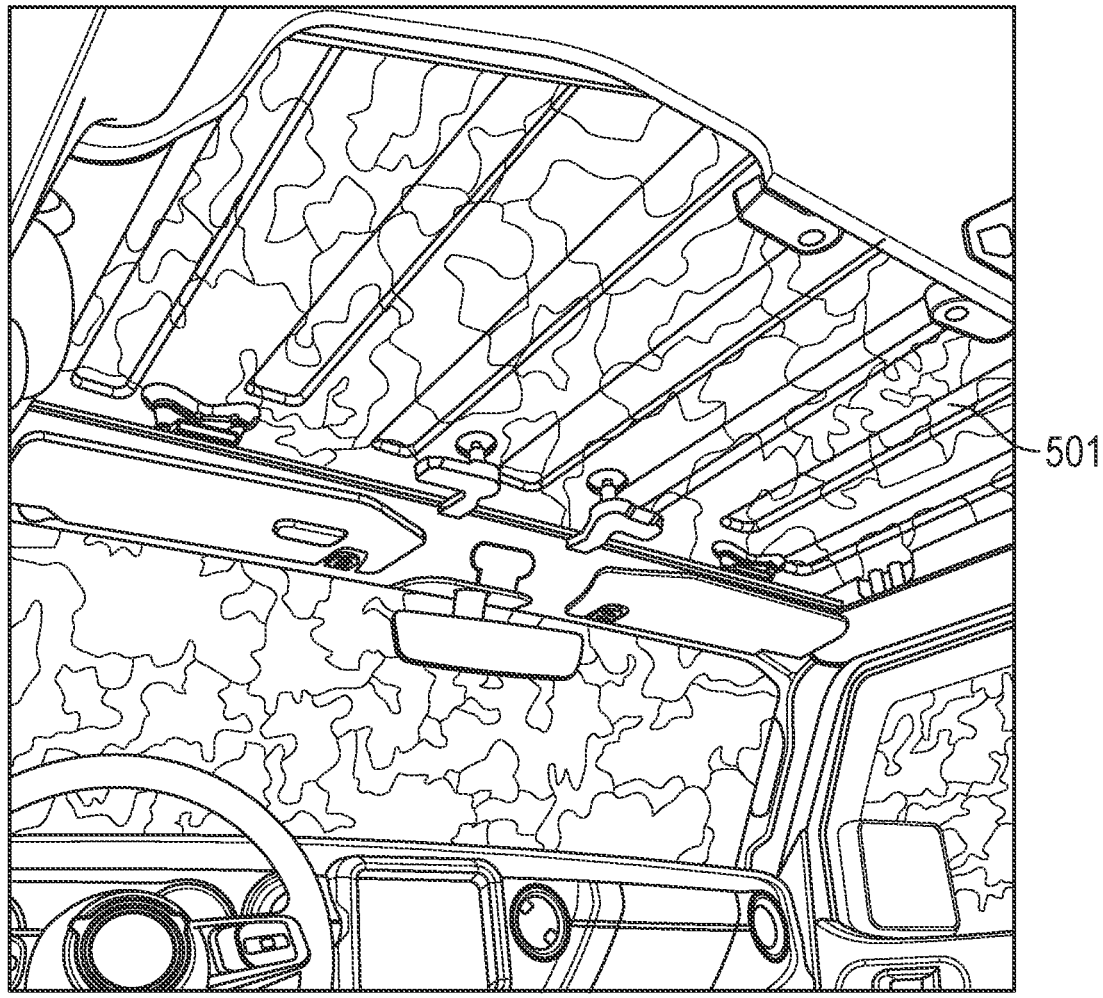
FIG. 56 shows a perspective view of the example of a daytime view through the vehicle roof assembly of FIGS. 43-55.
Figure 57A:
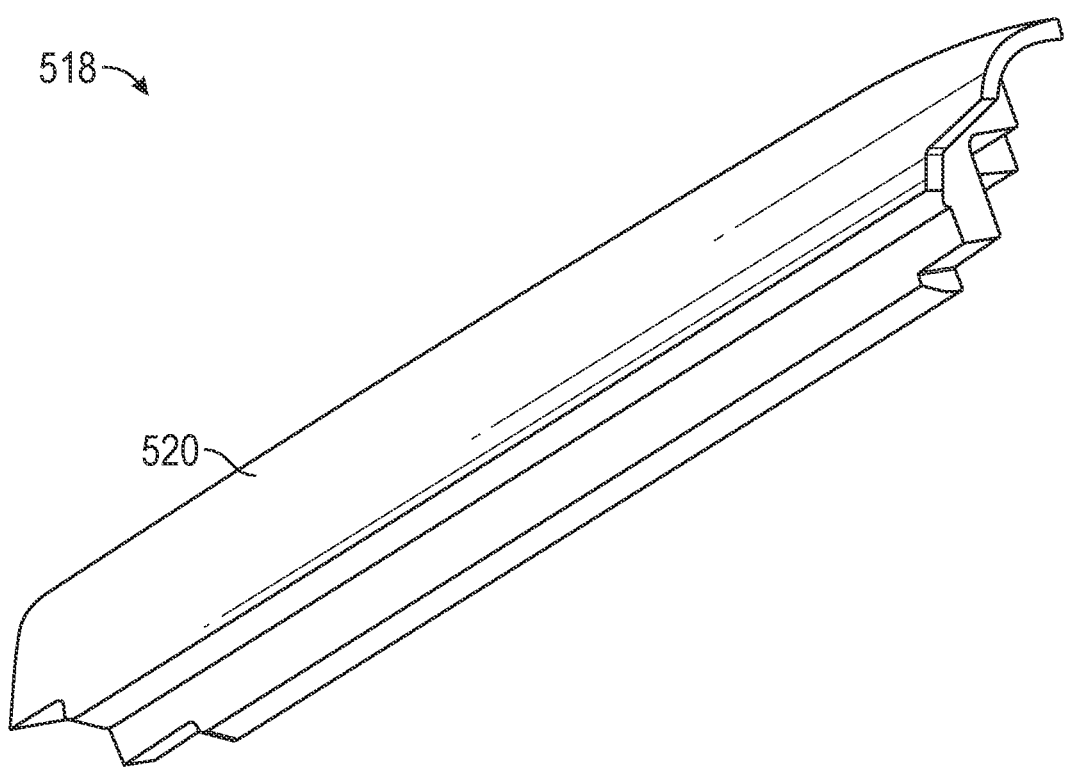
FIG. 57A shows a perspective view of a seal according to some aspects.
Figure 57B:
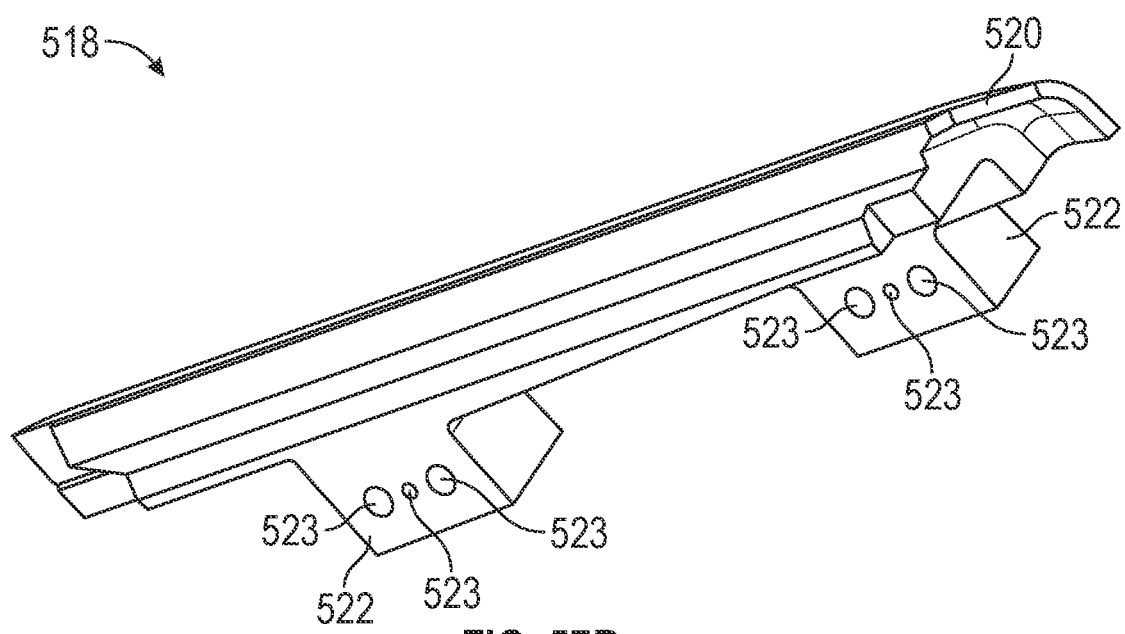
FIG. 57B shows another perspective view of the seal of FIG. 57A.
Figure 57C:
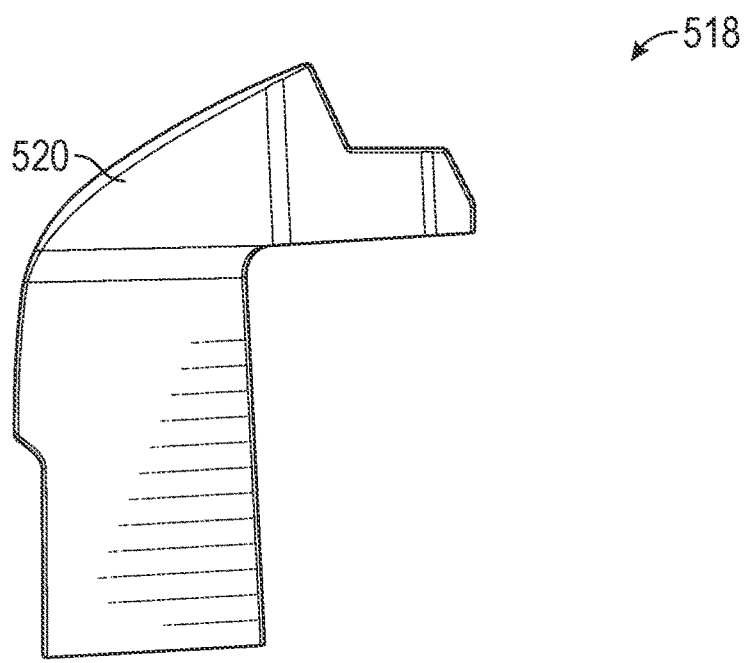
FIG. 57C shows a side elevation view of the seal of FIGS. 57A and 57B.
Figure 57D:
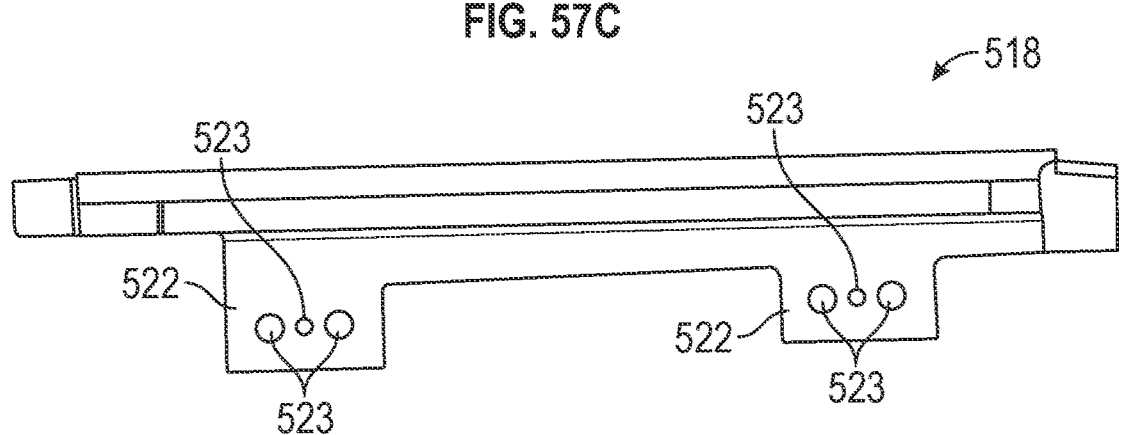
FIG. 57D shows a front elevation view of the seal of FIGS. 57A-57C.
Figure 57E:
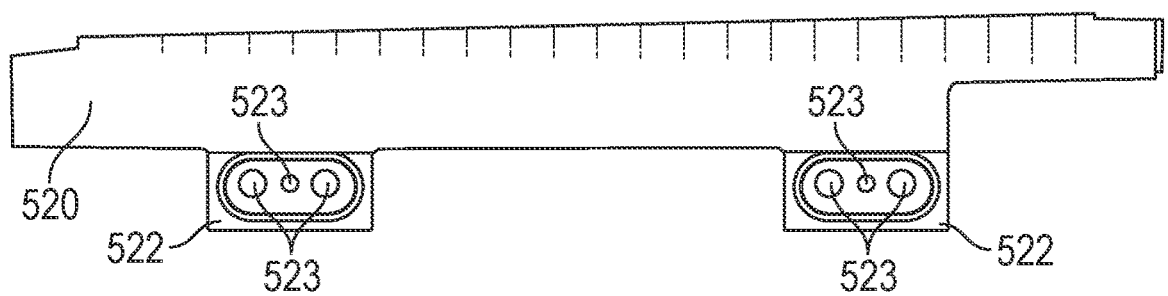
FIG. 57E shows a rear elevation view of the seal of FIGS. 57A-57D.

FIGS. 55 and 56 show views through the panel 501 when installed in a vehicle. FIG. 55 shows an example of a nighttime view through the panel 501. FIG. 56 shows an example of a daytime view through the panel 501. As seen in FIGS. 55 and 56, the panel 501 provides for vibrant and high-quality views when a person looks through the panel 501 day or night. An occupant of the vehicle would be able to see through the panel 501 as clearly as the windshield and/or any other window of the vehicle.

FIGS. 57A-57E show various views of a seal 518 to be used with the assembly 500. The embodiment of FIGS. 43-58B includes two seals 518, each located in, at least partially in, around, and/or near one of the curved outer portions 504 of the panel 501, as can be seen in at least FIG. 44. While two seals 518 are shown in the embodiment of FIGS. 43-58B, any suitable number of seals 518 could be used. According to some embodiments, and as shown in FIGS. 57A-E, each seal 518 comprises a curved portion 520, two attachment portions 522, and three apertures 523 located on each attachment portion 522. The curved portion 520 of the seal 518 is configured to fit snugly in the curved outer portion 504 of the panel 501. Each attachment portion 522 of the seal 518 is configured to rest on and/or near the bottom 512 of the panel 501. Any suitably shaped seal could be used. Each seal 518 can be a foam, weather-tight seal to ensure snug, weather-tight, and proper fitment between the assembly 500 and the vehicle 532.

Figure 58A:
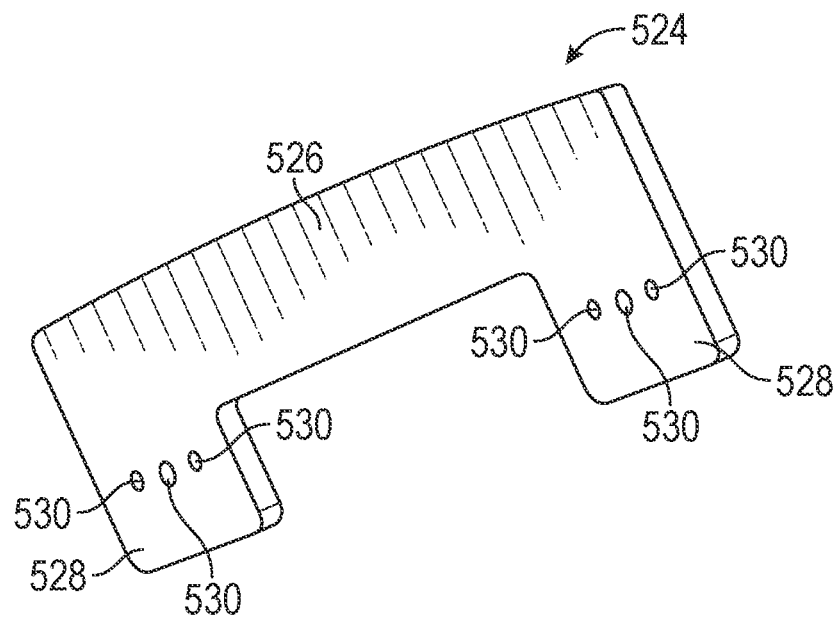
FIG. 58A shows a perspective view of a nut plate according to some aspects.
Figure 58B:
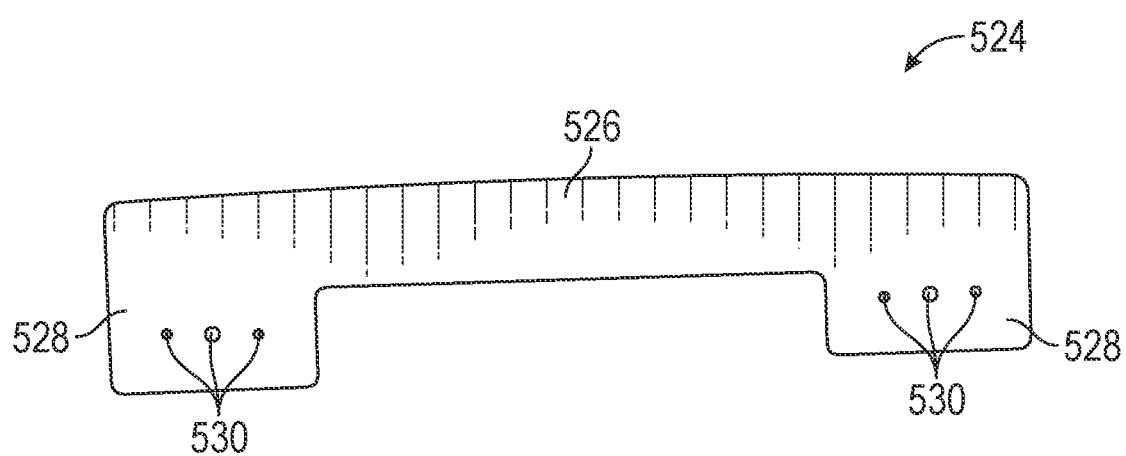
FIG. 58B shows a front elevation view of the nut plate of FIG. 58A.

The assembly 500 of FIGS. 43-58B also includes two nut plates 524. While the embodiment of FIGS. 43-58B includes two nut plates 524, any suitable number of nut plates 524 could be used. Each nut plate 524 is configured to be in contact with at least the attachment portions 522 of one of the seals 518. FIGS. 58A and 58B show views of the nut plate 524. The nut plate 524 shown in FIGS. 58A and 58B comprises a body 526, two attachment portions 528, and three apertures 530 on located on each attachment portion 528. Any suitably shaped nut plate could be used. When installing and/or securing the panel 501 and/or roof assembly 500 to a vehicle, the apertures 530 of each nut plate 524 can be in line with the apertures 523 of each seal 518 such that a screw, nut, bolt, and/or washer can be used to secure the nut plate 524 to the seal 518 and/or both the nut plate 524 and the seal 518 to the vehicle 532.

The assembly 500 is configured to provide for the panel 501 to fit snugly, tightly, and properly to a vehicle such that the assembly 500 is weather-proof. The panel 501 can be attached to the top portion of the frame of the vehicle such that the front 506 of the panel 501 faces forward and the rear 508 of the panel 501 faces rearward. The panel 501 is also configured to absorb sound. Thus, when attached to a vehicle, the assembly 500 is water-tight and can minimize road noise and/or wind noise. The assembly 500 is configured to withstand extreme weather conditions including, but not limited to, extreme temperatures and/or extreme wind. For example, the assembly 500 is configured to withstand temperatures ranging from −200 degrees Fahrenheit to 150 degrees Fahrenheit. The assembly 500 is further configured to withstand hurricane-like wind speeds. When secured to a vehicle, the assembly 500 is configured to protect the vehicle, including its occupants and/or contents from weather and/or ambient conditions. The assembly 500 includes insulation such that it is capable of regulating temperature in any vehicle to which it is attached. For example, the assembly 500 keeps the vehicle warm when experiencing cold ambient temperatures and cool when experiencing hot ambient temperatures. Additionally, the assembly 500 allows for easy and quick installation on and/or uninstallation from a vehicle. Further, the assembly 500 increases visibility for occupants in the vehicle and allows for more natural light to enter the vehicle making it easier to navigate trails with reduced sun exposure and/or obstacles such as branches or debris versus using a topless vehicle.

Figure 59:
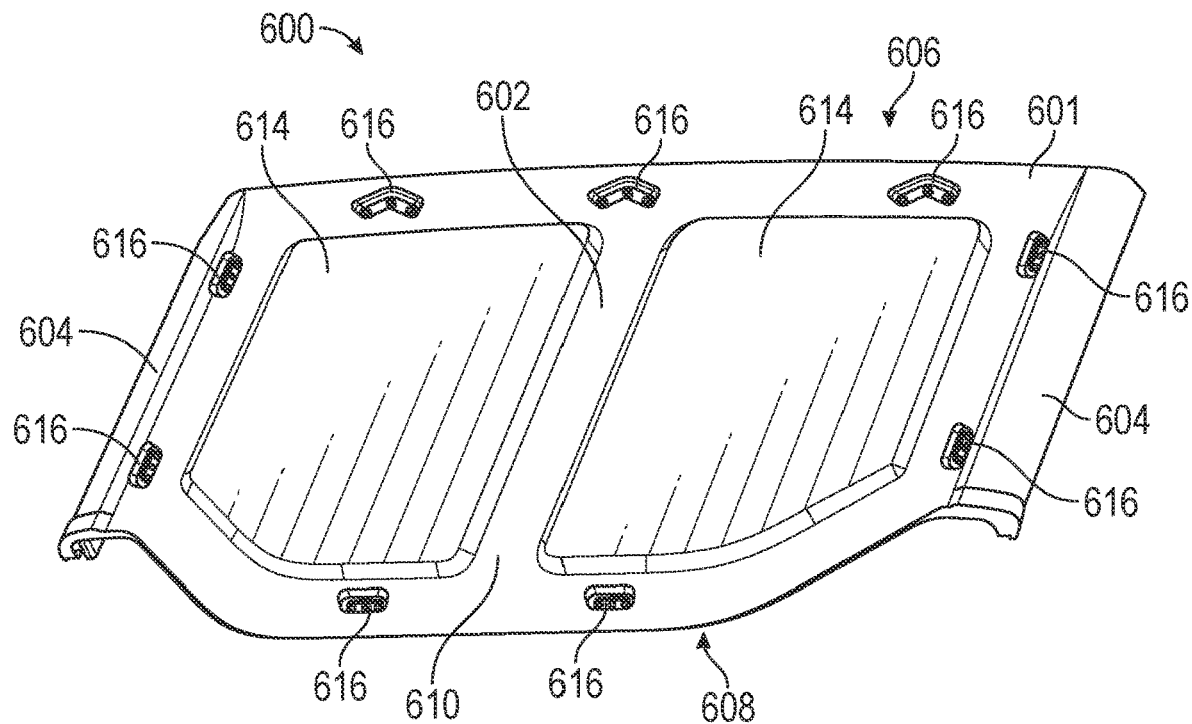
FIG. 59 shows a top perspective view of a vehicle roof assembly according to some aspects.

FIGS. 59-70 show another embodiment of a vehicle roof assembly 600, that includes a roof panel 601. The roof assembly 600 can be an original equipment manufacturer (OEM) direct replacement part. According to some embodiments, the panel 601 can have the same characteristics and/or qualities as the panel 101, the front panel 201, the rear panel 218, the panel 301, and/or the panel 501. Additionally, some or all of the description included above regarding the panel 101, the front panel 201, the rear panel 218, the panel 301, and/or the panel 501 can apply to the panel 601, depending on the embodiment. FIG. 59 shows a top perspective view of the panel 601 that includes a generally flat middle portion 602 and two curved outer portions 604 on each side of the panel 601. While only two sides of the panel 601 of the embodiment of FIGS. 59-70 are curved, any number of sides and/or any portion of the panel 601 could be curved according to some embodiments. As seen in FIG. 59, the panel 601 also includes a front 606, a rear 608, and a top 610.

According to some embodiments, the panel 601 can be generally hard such that it is generally rigid and generally keeps its shape. The panel 601 can also be transparent such that the panel 601 has certain characteristics of a window in that a person can see through it. The panel 601 can include a tint according to some embodiments. For example, the embodiment of 59-70 includes a panel 601 having a polycarbonate dark gray tint. While the panel 601 of the embodiment of FIGS. 59-70 includes a polycarbonate dark gray tint, the tint could be of any material and/or color. The panel 601 provides for vibrant and high-quality views when a person looks through the panel 601. The panel 601 also provides complete (100%) ultra-violet (UV) protection for occupants of the vehicle to which the panel 601 is attached. The panel 601 also blocks up to 82% of visible light transmission (VTL). While the panel 601 can block up to 82% of VTL, the panel 601 could block any other percentage lower than 82% according to some embodiments. The panel 601 also reduces heat from the sun by an average of 65% versus un-tinted tops or topless configurations according to some embodiments. According to some embodiments, the panel 601 is configured to block up to 46% of infrared radiation/light. While the panel 601 can block up to 46% of infrared radiation/light, the panel 601 could block any other percentage lower than 46% according to some embodiments. The panel 601 is also configured to be scratch-resistant. The panel 601 is also configured to have a fade-resistant finish.

Figure 60:
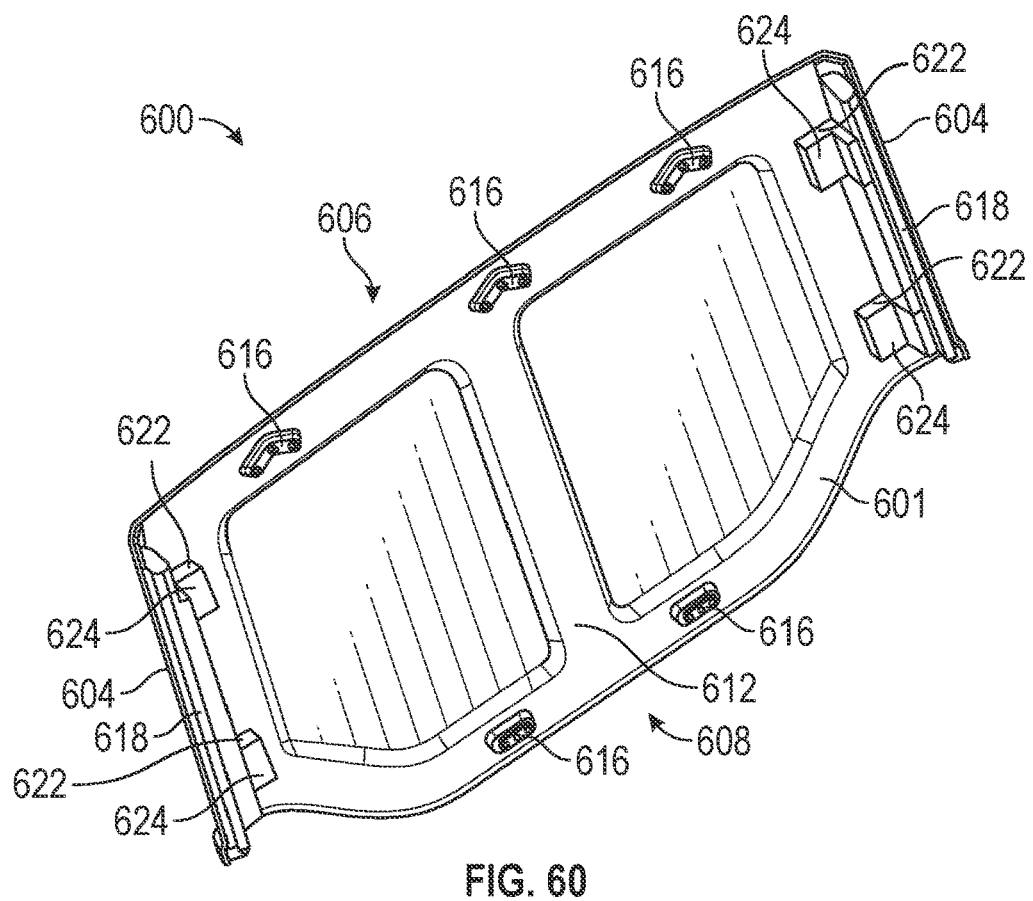
FIG. 60 shows a bottom perspective view of the vehicle roof assembly of FIG. 59.

As seen in at least FIGS. 59 and 60, the panel 601 includes a plurality of mounts 616. Each mount 616 can comprise an indentation in the top 610 of the panel 601 and a protrusion on the bottom 612 of the panel 601. Each mount 616 can serve to facilitate attachment of a component to be mounted on the bottom 612 of the panel 601.

While the bottom 612 of the panel 601 does not show any attachment mechanisms 700, each mount 616 can serve to facilitate attachment of a component to be mounted on the bottom 612 of the panel 601. For example, while the embodiment shown in FIGS. 59-70 does not show any attachment mechanisms 700 or roof braces 400/404, any combination of attachment mechanisms 700 or roof braces 400/404 could be attached to the mounts 616 of the panel 601. For example, according to some embodiments, an attachment mechanism 700 could be mounted to each of the mounts 616 shown on the bottom 612 of the panel 601. Additionally, as seen in FIG. 59, each side of the panel 601 includes two mounts 616 near each curved outer portion 604. These four side mounts 616 are used to mount the seals 618 (which include attachment portions 622) and/or nut plates 624 to the bottom 612 of the panel 601, and/or these side mounts 616 are used to facilitate attachment of the panel 601 to a vehicle via the seal(s) 618 and/or nut plate(s) 624. At least some of the seal(s) 618, attachment portion(s) 622, and/or nut plate(s) 624 can be seen in at least FIGS. 60, 62, and/or 63.

As seen in at least FIG. 59, the panel 601 includes a plurality of projections 614. While the panel 601 of the embodiment of FIGS. 59-70 includes two projections 614 located on the generally flat middle portion 602 of the panel 601, according to some embodiments the panel 601 can include any number of projections 614 ranging from zero to N where N is any number greater than zero. Additionally, while the projections 614 of the panel 601 appear generally wider than projections 514, the projections 614 can also be of any suitable size and/or arranged in any suitable formation. The projections 614 serve to make the assembly 600 more aerodynamic when attached to a vehicle.

Figure 61:
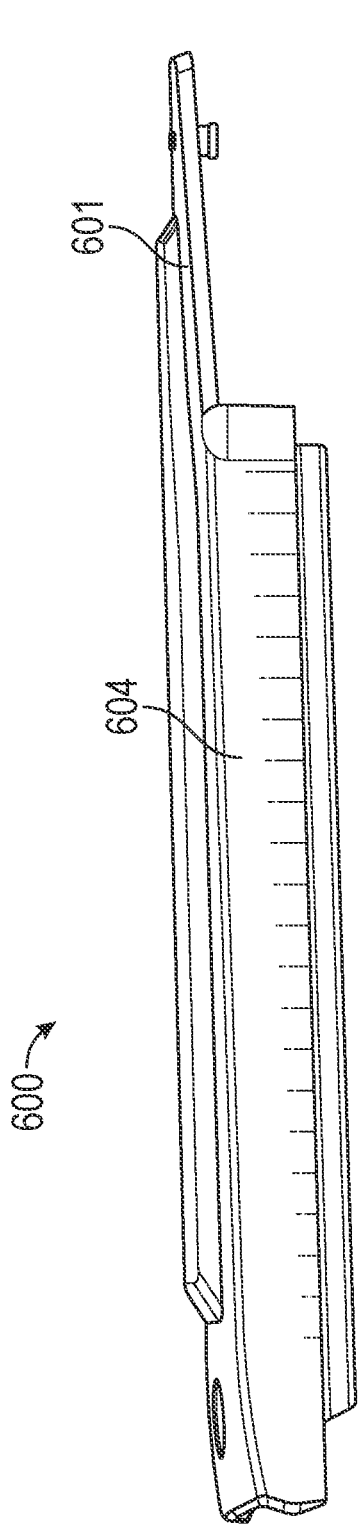
FIG. 61 shows a side elevation view of the vehicle roof assembly of FIGS. 59 and 60.
Figure 62:
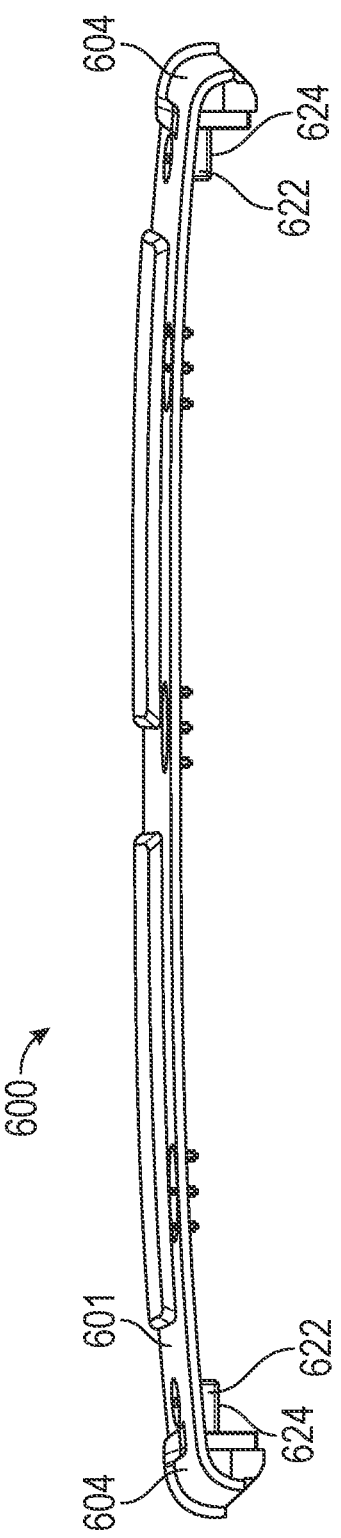
FIG. 62 shows a front elevation view of the vehicle roof assembly of FIGS. 59-61.
Figure 63:
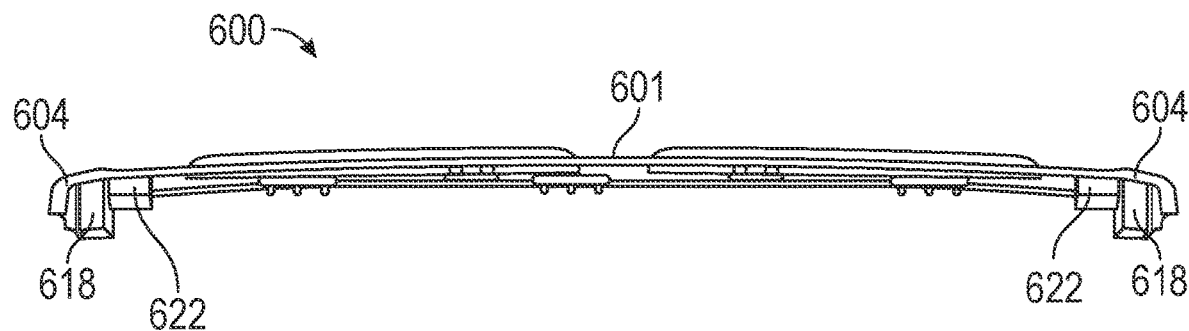
FIG. 63 shows a rear elevation view of the vehicle roof assembly of FIGS. 59-62.

FIG. 61 shows a side view of the panel 601 wherein one of the curved outer portions 604 is visible. The curved outer portions 604 serve to emulate the curvature and/or shape of the vehicle to which the assembly 600 will be attached. Thus, the panel 601, including its curved outer portions 604, provides a snug, tight, and proper fitment of the assembly 600 to a vehicle. FIGS. 62 and 63 show a front and rear view, respectively, of the panel 601 according to some embodiments.

Figure 64:
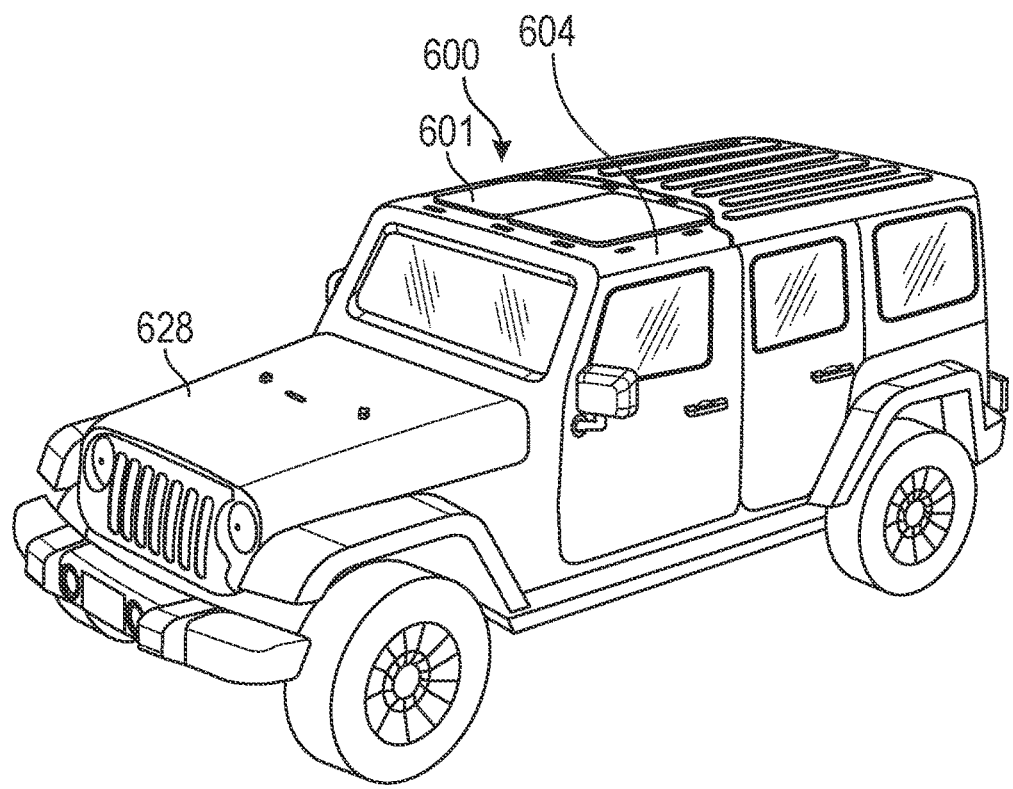
FIG. 64 shows a perspective view of a vehicle comprising the vehicle roof assembly of FIGS. 59-63.
Figure 65:
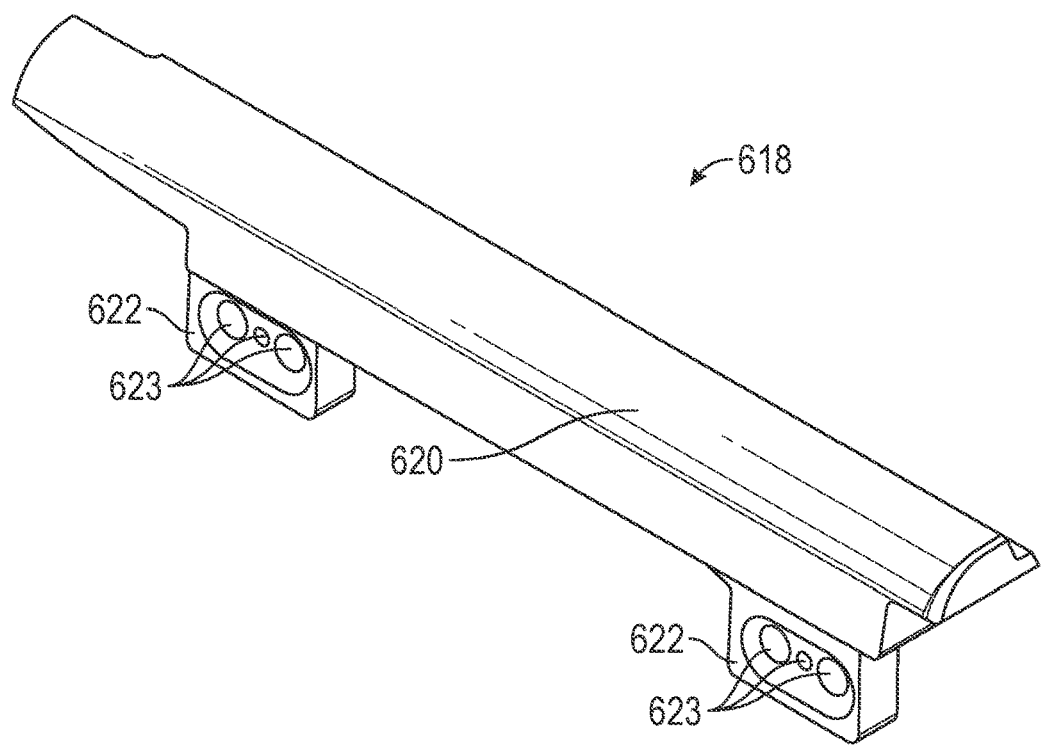
FIG. 65 is a perspective view of a seal according to some aspects.
Figure 66:
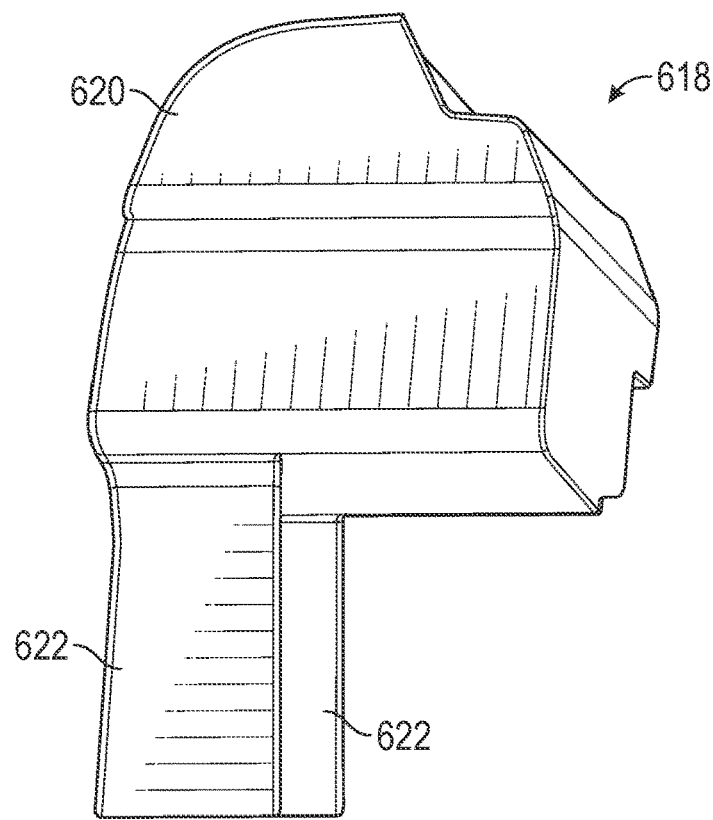
FIG. 66 is a side elevation view of the seal of FIG. 65.
Figure 67:
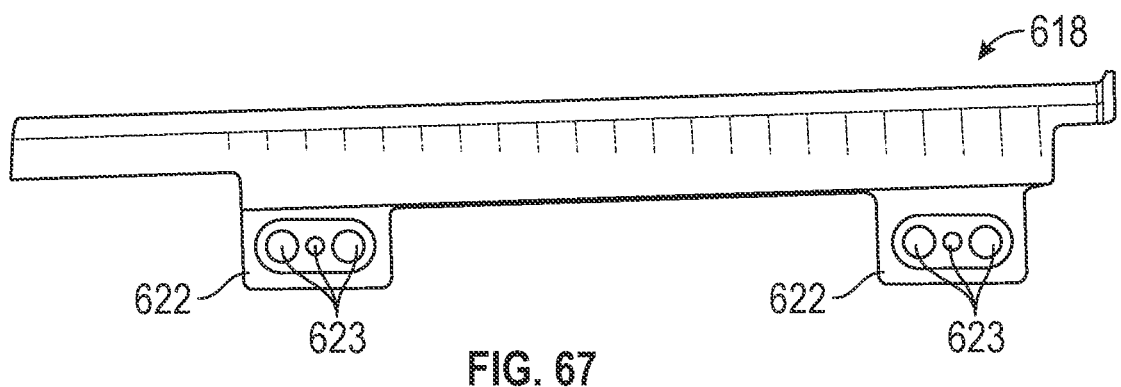
FIG. 67 is a rear elevation view of the seal of FIGS. 65 and 66.
Figure 68:
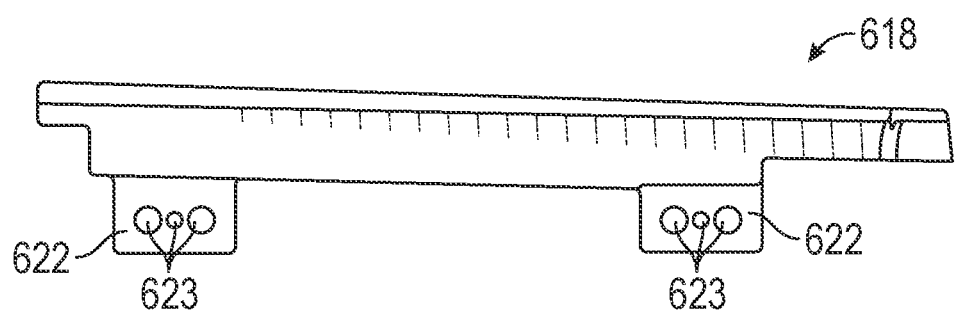
FIG. 68 is a front elevation view of the seal of FIGS. 65-67.

FIG. 64 shows a perspective view of a vehicle 628 wherein the assembly 600 and/or panel 601 is attached to the vehicle 628. As shown in FIG. 64, the assembly 600 and/or panel 601 can be attached to the top of the vehicle 628 such that an occupant of the vehicle 628 can look up to see a sky view through the panel 601 and/or assembly 600.

FIGS. 65-68 show various views of a seal 618 to be used with the panel 601. The assembly 600 can include zero or more seals. For example, the embodiment of FIGS. 59-70 includes two seals 618, each located in, at least partially in, around, and/or near one of the curved outer portions 604 of the panel 601. While two seals 618 are shown in the embodiment of FIGS. 59-70, any suitable number of seals 618 could be used. According to some embodiments, each seal 618 comprises a curved portion 620, two attachment portions 622, and three apertures 623 located on each attachment portion 622. The curved portion 620 of the seal 618 is configured to fit snugly in a curved outer portion 604 of the panel 601 according to some embodiments. Each attachment portion 622 of the seal 618 is configured to rest on and/or near the bottom 612 of the panel 601. Any suitably shaped seal could be used. Each seal 618 can be a foam, weather-tight seal to ensure snug, weather-tight, and proper fitment between the assembly 600 and the vehicle 628. According to some embodiments, the seals 618 can be identical to and/or have the same characteristics as the seals 518.

Figure 69:
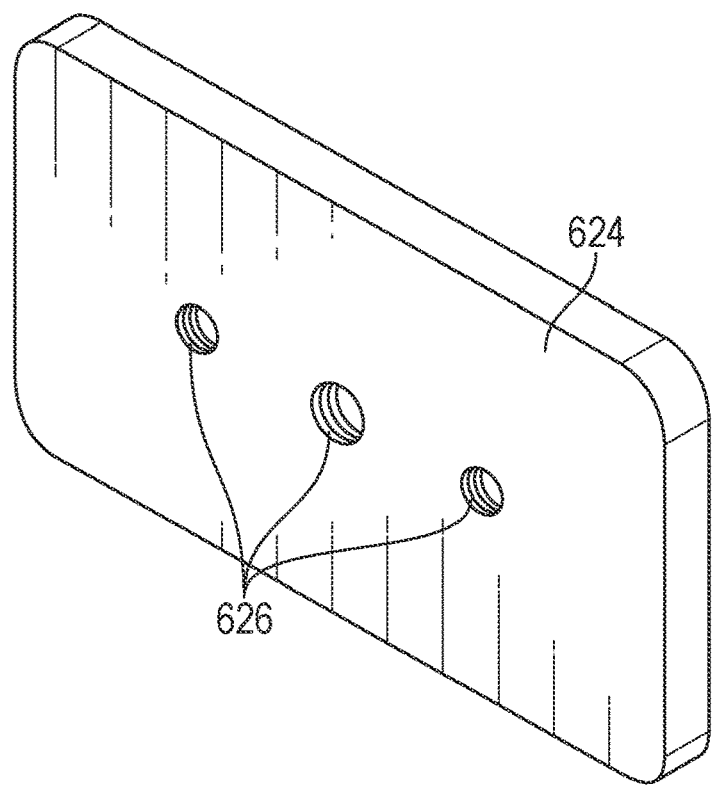
FIG. 69 is a perspective view of a nut plate according to some aspects.
Figure 70:
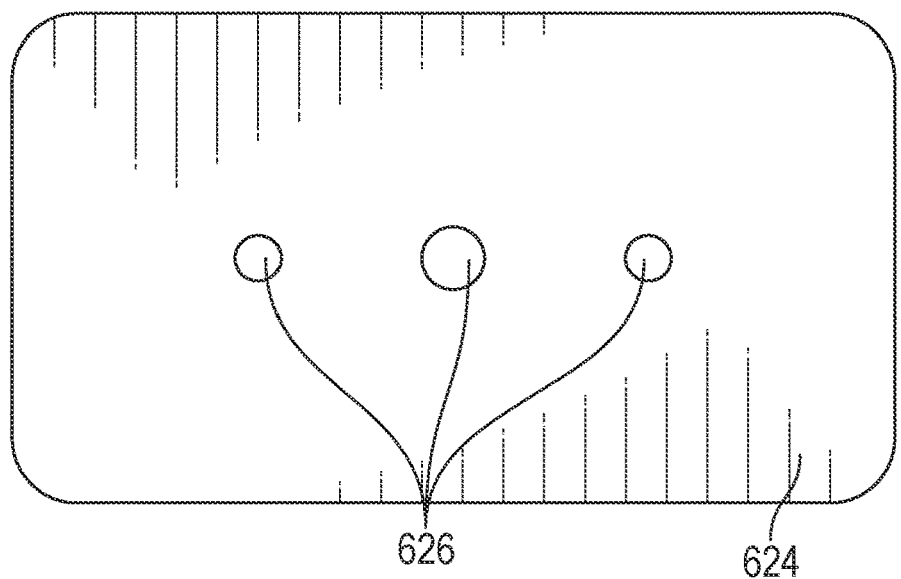
FIG. 70 is a front elevation view of the nut plate of FIG. 69.

The assembly 600 can include zero or more nut plates 624. While the embodiment of FIGS. 59-70 includes four nut plates 624, any suitable number of nut plates 624 could be used. Each nut plate 624 is configured to be in contact with, and/or nearly in contact with, an attachment portion 622 of one of the seals 618. FIGS. 69 and 70 show views of the nut plate 624. The nut plate 624 shown in FIGS. 69 and 70 comprises three apertures 626. Any suitably shaped nut plate could be used. When installing and/or securing the panel 601 and/or roof assembly 600 to a vehicle, the apertures 626 of each nut plate 624 can be in line with the apertures 623 of each seal 618 such that a screw, nut, bolt, and/or washer can be used to secure the nut plate 624 to the seal 618 and/or both the nut plate 624 and the seal 618 to the vehicle 628.

The assembly 600 is configured to provide for the panel 601 to fit snugly, tightly, and properly to a vehicle such that the assembly 600 is weather-proof. The panel 601 can be attached to the top portion of the frame of the vehicle such that the front 606 of the panel 601 faces forward and the rear 608 of the panel 601 faces rearward. The panel 601 is also configured to absorb sound. Thus, when attached to a vehicle, the assembly 600 is water-tight and can minimize road noise and/or wind noise. The assembly 600 is configured to withstand extreme weather conditions including, but not limited to, extreme temperatures and/or extreme wind. For example, the assembly 600 is configured to withstand temperatures ranging from −200 degrees Fahrenheit to 150 degrees Fahrenheit. The assembly 600 is further configured to withstand hurricane-like wind speeds. When secured to a vehicle, the assembly 600 is configured to protect the vehicle, including its occupants and/or contents from weather and/or ambient conditions. The assembly 600 includes insulation such that it is capable of regulating temperature in any vehicle to which it is attached. For example, the assembly 600 keeps the vehicle warm when experiencing cold ambient temperatures and cool when experiencing hot ambient temperatures. Additionally, the assembly 600 allows for easy and quick installation on and/or uninstallation from a vehicle. Further, the assembly 600 increases visibility for occupants in the vehicle and allows for more natural light to enter the vehicle making it easier to navigate trails with reduced sun exposure and/or obstacles such as branches or debris versus using a topless vehicle.

It is noted that each embodiment of a roof panel and/or roof assembly described herein can share the same characteristics and/or qualities. Additionally, some or all description and/or figures included above regarding any embodiment of a roof panel and/or roof assembly can apply to some or all embodiments described and/or shown herein.

Therefore, as understood from the present disclosure, a vehicle roof assembly is configured to provide a snug, proper, and tight fitment between the assembly and a vehicle to ensure that the apparatus is weather-proof. The vehicle roof assembly includes insulation to provide temperature regulation. For example, the replaceable vehicle roof can keep the vehicle warm when experiencing cold ambient temperature and cool when experiencing hot ambient temperature. The vehicle roof assembly is configured to provide complete UV protection, blockage of VTL, reduction of heat from the sun, and/or blockage of infrared radiation/light. The vehicle roof assembly is configured to minimize and/or eliminate road noise, wind noise, and/or water intrusion. The vehicle roof assembly is durable and scratch-resistant. The vehicle roof assembly is configured to withstand extreme weather conditions such as extreme temperatures and/or high wind speeds. The vehicle roof assembly is configured to provide a vibrant, high-clarity view through the assembly. The vehicle roof assembly is configured to provide for quick and easy installation and uninstallation.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 100 | vehicle roof assembly |
| 101 | roof panel |
| 102 | flat middle portion of panel |
| 104 | curved outer portion of panel |
| 106 | front of panel |
| 108 | rear of panel |
| 110 | top of panel |
| 112 | bottom of panel |
| 114 | projection |
| 115 | seal strip |
| 116 | mount |
| 118 | vehicle |
| 120 | connection strip |
| 122 | seal |
| 200 | vehicle roof assembly |
| 201 | front roof panel |
| 202 | flat middle portion of front panel |
| 204 | curved outer portion of front panel |
| 206 | front of front panel |
| 208 | rear of front panel |
| 210 | top of front panel |
| 212 | bottom of front panel |
| 214 | projection |
| 215 | seal strip |
| 216 | mount |
| 218 | rear roof panel |
| 220 | flat middle portion of rear panel |
| 222 | curved outer portion of rear panel |
| 224 | front of rear panel |
| 226 | rear of rear panel |
| 228 | top of rear panel |
| 230 | bottom of rear panel |
| 232 | projection |
| 234 | mount of rear panel |
| 300 | vehicle roof assembly |
| 301 | roof panel |
| 302 | flat middle portion of roof panel |
| 304 | curved outer portion of roof panel |
| 306 | front of roof panel |
| 308 | rear of roof panel |
| 310 | top of roof panel |
| 312 | bottom of roof panel |
| 314 | projection |
| 316 | mount |
| 400 | front roof brace |
| 402 | attachment portion of front brace |
| 404 | rear roof brace |
| 405 | middle portion of rear brace |

TABLE 1-continued

| List of Reference Characters | |
|---|---|
| 406 | attachment portion of rear brace |
| 407 | end of rear brace |
| 408 | folding clamp |
| 410 | base plate |
| 412 | hook |
| 414 | handle |
| 416 | handle cover |
| 418 | pin |
| 420 | bumper |
| 422 | turn latch |
| 424 | first protrusion |
| 426 | second protrusion |
| 428 | aperture |
| 430 | spacer |
| 432 | screw |
| 434 | first washer |
| 436 | second washer |
| 438 | third washer |
| 440 | locknut |
| 500 | vehicle roof assembly |
| 501 | roof panel |
| 502 | flat middle portion of roof panel |
| 504 | curved outer portion of roof panel |
| 506 | front of roof panel |
| 508 | rear of roof panel |
| 510 | top of roof panel |
| 512 | bottom of roof panel |
| 514 | projection |
| 516 | mount |
| 518 | seal |
| 520 | curved portion of seal |
| 522 | attachment portion of seal |
| 523 | aperture(s) of seal |
| 524 | nut plate |
| 526 | body of nut plate |
| 528 | attachment portion of nut plate |
| 530 | aperture(s) of nut plate |
| 532 | vehicle |
| 534 | bolt |
| 536 | washer |
| 538 | panel without tint (un-tinted panel) |
| 600 | vehicle roof assembly |
| 601 | roof panel |
| 602 | flat middle portion of roof panel |
| 604 | curved outer portion of roof panel |
| 606 | front of roof panel |
| 608 | rear of roof panel |
| 610 | top of roof panel |
| 612 | bottom of roof panel |
| 614 | projection |
| 616 | mount |
| 618 | seal |
| 620 | curved portion of seal |
| 622 | attachment portion of seal |
| 623 | aperture(s) of seal |
| 624 | nut plate |
| 626 | aperture of nut plate |
| 628 | vehicle |
| 700 | attachment mechanism |

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as "constructed", "arranged", "adapted", "manufactured", and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

As used herein, the term "exemplary" refers to an example, an instance, or an illustration, and does not indicate a most preferred embodiment unless otherwise stated.

As used herein, the term "attachment mechanism" denoted as reference numeral 700 encompasses a "turn latch" denoted as reference numeral 422, a "folding clamp" denoted as reference numeral 408, and/or any other type of attachment mechanism including, but not limited to, any kind of clamp, latch, cinch, bracket, grip, lock, hold, connector, screw, nut and bolt, and the like.

As used herein, the term "weather-resistant", "weather-proof", and "weather-tight" can be used interchangeably.

What is claimed is:

1. A roof top assembly for use with a vehicle comprising:
   a transparent panel having a generally flat middle portion and a plurality of curved outer portions;
   a plurality of seals located at the plurality of curved outer portions that dampens noise between an ambient environment surrounding the vehicle and an internal compartment of the vehicle, each of the plurality of seals comprising a plurality of attachment portions each having a plurality of collinear apertures,
   a plurality of removable nut plates each comprising a corresponding plurality of collinear apertures that align with the plurality of collinear apertures of the seals;
   a plurality of folding clamps located at or near a bottom of the panel configured to attach the panel to the vehicle, each of the plurality of folding clamps comprising a base plate, a hook, a handle, a handle cover, a pin, and a bumper; and
   a plurality of turn latches located between at least two of the plurality of the folding clamps with respect to a lateral direction of the transparent panel, each of the plurality of turn latches comprising a plurality of protrusions, a spacer, a screw, a plurality of washers, and a locknut.

2. The roof top assembly of claim 1, further comprising one or more connection strips to facilitate attachment and/or fitment of the panel to the vehicle.

3. The roof top assembly of claim 1, wherein the generally flat middle portion of the panel comprises one or more projections.

4. The roof top assembly of claim 1, wherein a polycarbonate tint is applied to the panel.

5. The roof top assembly of claim 1, wherein the panel further comprises a roof brace mounted to the bottom of the panel wherein at least one of the plurality of folding clamps and at least one of the plurality of turn latches are mounted on the roof brace.

6. The roof top assembly of claim 1, further comprising a rear panel that comprises a rear roof brace.

7. The roof top assembly of claim 6, wherein the rear roof brace provides support and stability for the rear panel.

8. A roof top assembly to serve as at least a partial roof of a vehicle comprising:
   a plurality of transparent panels, at least one of the plurality of transparent panels having a generally flat middle portion and one or more curved outer portions;
   a plurality of seals located at the plurality of curved outer portions that dampens noise between an ambient environment surrounding the vehicle and an internal compartment of the vehicle;
   a plurality of removable nut plates each comprising a corresponding plurality of collinear apertures that align with a plurality of collinear apertures of the seals;
   a plurality of folding clamps mounted at or near a bottom of the panel configured to attach the panel to the vehicle, each of the plurality of folding clamps comprising a base plate, a hook, a handle, a handle cover, a pin, and a bumper; and
   a plurality of turn latches located between at least two of the plurality of the folding clamps with respect to a lateral direction of the transparent panel, each of the plurality of turn latches comprising a plurality of protrusions, a spacer, a screw, a plurality of washers, and a locknut.

9. The roof top assembly of claim 8, wherein the generally flat middle portion of the panel comprises one or more projections.

10. The roof top assembly of claim 8, further comprising at least one bolt and at least one washer to facilitate attachment and fitment of the panel to the vehicle.

11. A method of attaching a roof top assembly to a vehicle, comprising:
    attaching one or more connection strips to the vehicle;
    fitting one or more weather-proof seals on each of the one or more connection strips, each of the plurality of weather-proof seals comprising a plurality of attachment portions each having a plurality of collinear apertures;
    snugly fitting and later securing a transparent panel onto the vehicle such that it is in contact, or nearly in contact, with the one or more weather-proof seals, by utilizing:
       one or more removable nut plates each comprising a corresponding plurality of collinear apertures that align with the plurality of collinear apertures of the weather-proof seals;
       one or more folding clamps, each of the one or more folding clamps comprising a base plate, a hook, a handle, a handle cover, a pin, and a bumper; and
       one or more turn latches located between at least two of the plurality of the folding clamps with respect to a lateral direction of the transparent panel, each of the plurality of turn latches comprising a plurality of protrusions, a spacer, a screw, a plurality of washers, and a locknut.

12. The method of claim 11, further comprising arranging the panel such that it is supported by a roof brace.

13. The method of claim 11, further comprising mounting at least one of the one or more attachment mechanisms on a roof brace.

14. The method of claim 11, wherein when the panel is snugly fit onto the vehicle, the roof top assembly is rendered weather-resistant.

15. The roof top assembly of claim 1, wherein the seals form a watertight seal.

16. The roof top assembly of claim 1, wherein the assembly is configured to provide ultra-violet (UV) protection from at least UV(a) and UV(b) and to provide for a visible light transmission of less than 100%.

17. The roof top assembly of claim 8, wherein the seals form a watertight seal.

18. The roof top assembly of claim 8, wherein the assembly is configured to provide ultra-violet (UV) protection from at least UV(a) and UV(b) and to provide for a visible light transmission of less than 100%.

19. A method of operating a vehicle after attached a roof top assembly thereto according to the method of claim 11, comprising:
   driving the vehicle; and
   dampening noise between an ambient environment surrounding the vehicle and an internal compartment of the vehicle with the weather-proof seals.

20. The method of claim 19, further comprising operating the vehicle such that the temperature of the transparent panel is between −200 degrees Fahrenheit to 150 degrees Fahrenheit and in high wind conditions.

* * * * *